United States Patent [19]
Tomonaga

[11] Patent Number: 6,073,080
[45] Date of Patent: Jun. 6, 2000

[54] COMPUTER SYSTEM AND METHOD FOR PRODUCTION OF MOLECULAR STRUCTURE DIAGRAM

[75] Inventor: Atsushi Tomonaga, Musashino, Japan

[73] Assignee: Kureha Kagaku Kogyo Kabushiki Kaisha, Tokyo, Japan

[21] Appl. No.: 08/981,311

[22] PCT Filed: May 24, 1996

[86] PCT No.: PCT/JP96/01393

§ 371 Date: Dec. 12, 1997

§ 102(e) Date: Dec. 12, 1997

[87] PCT Pub. No.: WO97/01144

PCT Pub. Date: Jan. 9, 1997

[30]      Foreign Application Priority Data

| Jun. 22, 1995 | [JP] | Japan | 7-156159 |
| Jun. 22, 1995 | [JP] | Japan | 7-156162 |
| Nov. 15, 1995 | [JP] | Japan | 7-296861 |
| Nov. 15, 1995 | [JP] | Japan | 7-296874 |
| Mar. 6, 1996 | [JP] | Japan | 8-49365 |
| Mar. 6, 1996 | [JP] | Japan | 8-49366 |

[51] Int. Cl.[7] .................................................. G06F 19/00
[52] U.S. Cl. ........................ 702/27; 702/22; 364/528.01
[58] Field of Search ................................ 702/27, 30, 22, 702/32; 364/528.01

[56]              References Cited

FOREIGN PATENT DOCUMENTS

| 0 322 182 A2 | 6/1989 | European Pat. Off. ................ 453/2 |
| 0 339 834 A2 | 11/1989 | European Pat. Off. ................ 471/8 |

OTHER PUBLICATIONS

Kazuo HATA, Naming of Organic Compound, Jan. 30, 1987.

BULL JAPC vol. 10, No. 2 (1988), pp. 60–82, Shokichi Abe "Making a molecular Stereostructure by computers (3D–Molmaster) vol. 5 Making substitutent data".

BULL JAPC vol. 10, No. 1 (1988), pp. 47–72, Shokichi Abe "Making a molecular Stereostructure by computers (3D–Molmaster) vol. 3 Condenced polycyclic compound".

BULL JAPC vol. 9, No. 2 (1987), pp. 29–41, Shokichi Abe "Method of determining three–dimensional configuration of intramolecular atoms (TDAMA) vol. 1 Claim compound and substitution".

W. Todd Wipke and Thomas M. Dyott, Department of Chemistry, Princeton University, Jounal of Chemical Information and Computer Sciences. "Use of Ring Assemblies in a Ring Perception Algorithm", vol. 15, No. 3, pp. 140–147, 1975.

*Primary Examiner*—Marc S. Hoff
*Assistant Examiner*—Hien Vo
*Attorney, Agent, or Firm*—Beyer Weaver Thomas & Nguyen, LLP

[57]              ABSTRACT

The present invention provides a computer system configured to produce molecular structure diagrams. The computer system accepts input of bonding atom pair data indicating the bond relation of each atom constituting a compound and has a storage medium for storing the bonding atom pair data that produces a molecular structural diagram of the compound, based on the bonding atom pair data. An atom pair data extraction process section, a classification process section for classifying each atom constituting the compound into either a cyclic portion and a chain portion, a two-dimensional coordinates arithmetic process section for obtaining two-dimensional coordinates of each atom, and a structural diagram production process section provides the molecular structural diagram, based on the two-dimensional coordinates of each atom.

42 Claims, 28 Drawing Sheets

Fig. 2A

BOND TABLE 3 2

ATOM TABLE  3 2 a

| NUMBER OF ATOM | X-COORDINATE | Y-COORDINATE | NAME OF ELEMENT | ATTRIBUTE |
|---|---|---|---|---|
| 1 | 3.0386 | -2.4082 | C | |
| 2 | 3.0386 | -0.9082 | C | |
| 3 | 1.7396 | -0.1582 | C | |
| 4 | 0.4405 | -0.9082 | N | |
| 5 | 0.4405 | -2.4082 | C | |
| 6 | 1.7396 | -3.1582 | C | |
| 7 | 4.3376 | -3.1582 | C | |

Fig. 2B

ATOM PAIR TABLE  3 2 b

| BONDING ATOM PAIR | | TYPE OF BOND | STRUCTURE |
|---|---|---|---|
| 1 | 2 | 2 | CYCLIC |
| 2 | 3 | 1 | CYCLIC |
| 3 | 4 | 2 | CYCLIC |
| 4 | 5 | 1 | CYCLIC |
| 5 | 6 | 2 | CYCLIC |
| 6 | 1 | 1 | CYCLIC |
| 1 | 7 | 1 | CHAIN |

CYCLIC PORTION

CHAIN PORTION

STRUCTURAL DIAGRAM PRODUCTION PROCESS ROUTINE 105

COMPUTER SYSTEM AND METHOD FOR PRODUCTION OF MOLECULAR STRUCTURE DIAGRAM

TECHNICAL FIELD

The present invention relates to a producing apparatus, producing method and storage medium for production, of molecular structural diagram, for automatically and quickly producing molecular structural diagrams easy to grasp the structure visually and excellent in an aesthetic sense by arithmetic.

BACKGROUND ART

For indicating a molecular structural diagram of a compound on a display or outputting it through a printer, it was common practice heretofore to use the molecular structural diagram hand-written with a mouse or the like by a man. For molecular structural diagrams simple in structure, it was also possible to automatically produce the molecular structural diagrams by arithmetic based on bond information of each atom. The minimization method was invented as a producing technique thereof. The minimization method is suitable for producing molecular structural diagrams of compounds of the monocyclic structure including the relatively small number of ring-constituting members.

The minimization method will be explained. For example, in the case of a compound being a single six-membered ring, the molecular structural diagram thereof is of a hexagon. Letting the sides of this hexagon be r1 to r6 and θ1 to θ6 be the vertices thereof, the arithmetic is carried out so as to minimize $$\sum_{i=1,6} k_r(r_i - r_0)^2 + \sum_{i=1,6} k_\theta(\theta_i - \theta_0)^2,$$

thereby obtaining the values (r1 to r6 and θ1 to θ6). Here, $r_0$, $\theta_0$ are standard values, for example, $r_0=1.5$ and $\theta_0=120°$. Further, $k_r$, $k_\theta$ each are weights, which are positive constants.

This arithmetic will result in obtaining r1=r2= . . . =r6=$r_0$ and θ1=θ2= . . . =θ6=$\theta_0$. This means that the minimization method produces a generally regular hexagon as a molecular structural diagram of six-membered ring.

Neither of the conventional methods as described above, however, was suitable for producing complex molecular structural diagrams of single rings with many ring-constituting members and fused rings.

Namely, when complex molecular structural diagrams were produced by hand-writing, configurations thereof often became distorted, which was a problem. When the complex molecular structural diagrams were produced by the minimization method, a lot of processing time was necessitated, which was a problem.

It is thus an object of the present invention to provide a producing apparatus, producing method and storage medium for production, of molecular structural diagram, that can automatically and quickly produce a molecular structural diagram easy to grasp the structure visually, excellent in an aesthetic sense, and of common use.

DISCLOSURE OF INVENTION

First explained is the molecular structural diagram producing apparatus according to the present invention.

A molecular structural diagram producing apparatus of the present invention comprises:

input means for accepting input of bonding atom pair data indicating the bond relation of each atom constituting a compound, storage means for storing at least said bonding atom pair data, and molecular structural diagram producing means for producing a molecular structural diagram of said compound, based on said bonding atom pair data extracted from said storage means;

wherein said molecular structural diagram producing means comprises:

an atom pair data extraction process section for extracting said bonding atom pair data from said storage means, a classification process section for classifying each atom constituting said compound into either of a cyclic portion and a chain portion, based on said bonding atom pair data extracted in said atom pair data extraction process section, a two-dimensional coordinates arithmetic process section for obtaining two-dimensional coordinates of each atom classified into said cyclic portion and/or into said chain portion in said classification process section, and a structural diagram production process section for producing a molecular structural diagram, based on said two-dimensional coordinates of each atom obtained in said two-dimensional coordinates arithmetic process section.

In the molecular structural diagram producing apparatus of the present invention, first, the atom pair data extraction process section extracts the bonding atom pair data indicating the bond relation of each atom constituting the compound. Next, the classification process section classifies each atom into either of the cyclic portion and the chain portion. This classification is carried out based on the bonding atom pair data extracted in the atom pair data extraction process section. Further, the two-dimensional coordinates arithmetic process section obtains the two-dimensional coordinates of each atom classified into the cyclic portion and also obtains the two-dimensional coordinates of each atom classified into the chain portion. Then the structural diagram production process section produces the molecular structural diagram based on the two-dimensional coordinates of each atom obtained in this manner.

The above molecular structural diagram producing apparatus of the present invention is preferably arranged so that said two-dimensional coordinates arithmetic process section comprises:

a first process section for, in the case where a ring comprised of atoms classified into said cyclic portion is a fused ring, separating said fused ring into a plurality of single rings, a second process section for selecting a predetermined single ring out of the single rings separated in said first process section and for, in the case of said single ring being an m-membered ring (m is a natural number not less than 3), obtaining two-dimensional coordinates of each atom as assuming said m-membered ring is a regular m-polygon, a third process section for selecting a single ring fused with a specific single ring for which two-dimensional coordinates of atoms were already obtained, out of the single rings separated in said first process section and for, in the case of said single ring being an n-membered ring (n is a natural number not less than 3), obtaining two-dimensional coordinates of each atom as assuming said n-membered ring is an n-polygon sharing k sides (k edges) (k is a natural number) with said specific single ring, and a fourth process section for repeating said third process section until two-dimensional coordinates of all atoms in each single ring separated in said first process section have been obtained.

In this case, in said second process section, preferably, the predetermined single ring is selected in accordance with a priority order assigned to each single ring depending upon a number of atoms in each single ring separated in said first process section.

In addition, in said third process section, preferably, the two-dimensional coordinates of each atom are obtained as follows:

among sides (edges) of said n-polygon the k sides shared with said specific single ring are regarded as shared sides (shared edges) and the other sides as non-shared sides (non-shared edges), a length of an auxiliary straight line connecting two ends of a line comprised of all said shared sides is let to be L (L is a known value), and a length of each side other than said shared sides is let to be r (r is a predetermined value), among internal angles of an (n−k+1) polygon comprised of said auxiliary straight line and all said non-shared sides internal angles between said auxiliary straight line and said non-shared sides are let to be α (radian) and internal angles between said non-shared sides are let to be β (radian), β to satisfy $$r \cdot \cos\{((n-k-1)\Pi-(n-k)\beta)/2\}=L \cdot \cos(\beta/2)$$

is calculated, and $$\alpha=(n-k-1)(\Pi-\beta)/2$$

is also calculated (where Π is the circle ratio (ratio of the circumference of a circle to its diameter)), thereby obtaining the two-dimensional coordinates of each atom from values of these calculations.

Further, in the above molecular structural diagram producing apparatus of the present invention, preferably, said two-dimensional coordinates arithmetic process section comprises:

a fifth process section for extracting all terminal atoms becoming ends of chain structure out of the atoms classified into said chain portion and for selecting out of pairs of said terminal atoms extracted a pair of said terminal atoms having a largest number of bonds contained between the pair of said terminal atoms, a sixth process section for obtaining two-dimensional coordinates of each atom between said pair of terminal atoms selected in said fifth process section, a seventh process section for selecting out of said terminal atoms two-dimensional coordinates of which are not obtained yet, one said terminal atom having a largest number of bonds contained between said terminal atom and an atom two-dimensional coordinates of which were already obtained, and an eighth process section for obtaining two-dimensional coordinates of each atom between said terminal atom selected in said seventh process section and the atom two-dimensional coordinates of which were already obtained.

In this case, preferably, in said sixth process section and said eighth process section, while keeping a length between atoms constant and changing a bond angle depending upon a number of atoms bonded to each atom, two-dimensional coordinates of each atom are obtained in order from one end.

Also, said molecular structural diagram producing apparatus of the present invention may further comprise a display and comprise a pointing device as said input means, and in this case, in said atom pair data extraction process section, said bonding atom pair data is extracted based on a molecular structural diagram drawn on said display using said pointing device, preferably.

Further, in the above molecular structural diagram producing apparatus of the present invention, said storage means may store a bond table file in which a table of said bonding atom pair data is recorded, and in this case, in said atom pair data extraction process section, said bonding atom pair data is extracted by reading predetermined said bonding atom pair data out of said bond table file, preferably.

The molecular structural diagram producing apparatus of the present invention may be the following one. Namely, the apparatus may be a molecular structural diagram producing apparatus comprising:

input means for accepting input of bonding atom pair data indicating the bond relation of each atom constituting a compound, storage means for storing at least said bonding atom pair data, and molecular structural diagram producing means for producing a molecular structural diagram of said compound, based on said bonding atom pair data extracted from said storage means;

wherein in said molecular structural diagram producing means, when said bonding atom pair data extracted from said storage means is data of a compound comprised of only a fused ring, when the smallest set of smallest rings necessary and minimum to express all atoms and bonds constituting said fused ring is comprised of only one five-membered ring and one six-membered ring, and when said five-membered ring and said six-membered ring are fused as sharing three atoms, a molecular structural diagram of said compound is produced so that lengths of all bonds become equal.

In such molecular structural diagram producing apparatus of the present invention, the input means accepts the bonding atom pair data indicating the bond relation of each atom constituting the compound. This bonding atom pair data is extracted from the storage means, and the molecular structural diagram of the compound is produced based on the bonding atom pair data in the molecular structural diagram producing means. Especially, when the bonding atom pair data is data of a compound comprised of only a fused ring, when the smallest set of smallest rings necessary and minimum to express all atoms and bonds constituting the fused ring is comprised of only one five-membered ring and one six-membered ring, and when the five-membered ring and the six-membered ring are fused as sharing three atoms, the diagram is produced so that the lengths of all bonds become equal.

Also, the molecular structural diagram producing apparatus of the present invention may be the following one. Namely, the apparatus may be a molecular structural diagram producing apparatus comprising:

input means for accepting input of bonding atom pair data indicating the bond relation of each atom constituting a compound, storage means for storing at least said bonding atom pair data, and molecular structural diagram producing means for producing a molecular structural diagram of said compound, based on said bonding atom pair data extracted from said storage means;

wherein in said molecular structural diagram producing means, when said bonding atom pair data extracted from said storage means is data about a fused ring in which a number of bonds attaching to any atom therein is not more than 3, a molecular structural diagram of said compound is produced so that lengths of all bonds become equal.

In such molecular structural diagram producing apparatus of the present invention, the input means accepts the bonding atom pair data indicating the bond relation of each atom constituting the compound. This bonding atom pair data is extracted from the storage means, and the molecular structural diagram of the compound is produced based on the bonding atom pair data in the molecular structural diagram producing means. Especially, when the bonding atom pair data is data about a fused ring in which either of the numbers of bonds attaching to the respective atoms is not more than 3, the diagram is produced so that the lengths of all bonds become equal.

The number of bonds attaching to each atom constituting the fused ring, counted about the fused ring herein, is the number of bonds forming an annulus or ring, which does not include the number of bonds not constituting a ring, such as those in a side chain. Degrees of identity of the lengths of bonds and the angles between bonds may be well determined in the level of resolution of the output device such as a display or a printing device.

Further, the molecular structural diagram producing apparatus of the present invention may be the following one. Namely, the apparatus may be a molecular structural diagram producing apparatus comprising:

input means for accepting input of bonding atom pair data indicating the bond relation of each atom constituting a compound, storage means for storing at least said bonding atom pair data, and molecular structural diagram producing means for producing a molecular structural diagram of said compound, based on said bonding atom pair data extracted from said storage means;

wherein in said molecular structural diagram producing means, when said bonding atom pair data extracted from said storage means is data of a compound comprised of only a fused ring and when, in combinations of rings contained in the smallest set of smallest rings necessary and minimum to express all atoms and bonds constituting said fused ring, an arbitrary pair of rings are fused with each other as sharing three or more atoms, a molecular structural diagram of said compound is produced so that, separating bonds in said pair of rings into bonds A atoms of which are shared by the pair of rings and bonds B atoms of which are not shared thereby, lengths of the bonds B and angles between the bonds B become equal respectively in each ring.

In such molecular structural diagram producing apparatus of the present invention, the input means accepts the bonding atom pair data indicating the bond relation of each atom constituting the compound. This bonding atom pair data is extracted from the storage means, and the molecular structural diagram of the compound is produced based on the bonding atom pair data in the molecular structural diagram producing means. Especially, when the bonding atom pair data is data of a compound comprised of only a fused ring and when, in combinations of rings contained in the smallest set of smallest rings necessary and minimum to express all atoms and bonds constituting the fused ring, an arbitrary pair of rings are fused with each other as sharing three or more atoms, the molecular structural diagram is produced so that, separating bonds in the pair of rings into bonds A atoms of which are shared in the pair of rings and bonds B atoms of which are not shared therein, the lengths of the bonds B and the angles between the bonds B become equal respectively in each ring.

Yet further, the molecular structural diagram producing apparatus of the present invention may be the following one. Namely, the apparatus may be a molecular structural diagram producing apparatus comprising:

input means for accepting input of bonding atom pair data indicating the bond relation of each atom constituting a compound, storage means for storing at least said bonding atom pair data, and molecular structural diagram producing means for producing a molecular structural diagram of said compound, based on said bonding atom pair data extracted from said storage means;

wherein in said molecular structural diagram producing means, when said bonding atom pair data extracted from said storage means is data of a compound which is comprised of only a chain structure, in which bonds between atoms are comprised of only single bonds and/or double bonds without designation of cis-configuration, and in which two double bonds are not adjacent, a molecular structural diagram of said compound is produced so that, defining as a principal chain a bond chain between a terminal atom pair including a largest number of bonds between two terminal atoms thereof out of all combinations of two terminal atoms of said compound, lengths of respective bonds constituting said principal chain and bond angles between the bonds both become equal and a line connecting middle points of the bonds becomes a straight line.

In such molecular structural diagram producing apparatus of the present invention, the input means accepts the bonding atom pair data indicating the bond relation of each atom constituting the compound and the molecular structural diagram producing means produces the molecular structural diagram of the compound, based on this bonding atom pair data. Especially, when the bonding atom pair data is data of a compound which is comprised of only the chain structure, in which the bonds between atoms are comprised of only single bonds and/or double bonds without designation of cis-configuration, and in which two double bonds are not adjacent, the molecular structural diagram of the compound is produced so that, defining as a principal chain the bond chain between a pair of terminal atoms having the largest number of bonds between them out of all combinations of two terminal atoms in the compound, the lengths of the respective bonds constituting the principal chain and the bond angles between the bonds both become equal and the line connecting the middle points of the bonds becomes a straight line.

In this case, in said molecular structural diagram producing means, preferably, when there is a side chain being a bond chain branched from said principal chain, the molecular structural diagram of said compound is produced so as to locate said side chain in an external-angle-side region out of two regions defined by two bonds in said principal chain adjacent to an atom at a branch point between said principal chain and said side chain.

Also, the above molecular structural diagram producing apparatus of the present invention may further comprise a display and indication control means for making the molecular structural diagram of said compound produced in said molecular structural diagram producing means, indicated on said display, and in this case in said indication control means, said molecular structural diagram is indicated on said display so that said straight line connecting the middle points of the bonds extends in parallel with a horizontal frame of a screen of said display, preferably.

Next explained is the molecular structural diagram producing method of the present invention.

The molecular structural diagram producing method of the present invention is a molecular structural diagram producing method for producing a molecular structural diagram, using an apparatus having input means, storage means, and molecular structural diagram producing means, comprising:

an input step for accepting input of bonding atom pair data indicating the bond relation of each atom constituting a compound by said input means, a storage step for storing at least said bonding atom pair data in said storage means, and a molecular structural diagram producing step for producing a molecular structural diagram of said compound, based on said bonding atom pair data extracted from said storage means, by said molecular structural diagram producing means;

wherein said molecular structural diagram producing step comprises:

an atom pair data extraction step for extracting said bonding atom pair data from said storage means, a classification step for classifying each atom constituting said compound into either of a cyclic portion and a chain portion, based on said bonding atom pair data extracted in said atom pair data extraction step, a two-dimensional coordinates arithmetic step for obtaining two-dimensional coordinates of each atom classified into said cyclic portion and/or into said chain portion in said classification step, and a structural diagram production process step for producing a molecular structural diagram, based on said two-dimensional coordinates of each atom obtained in said two-dimensional coordinates arithmetic step.

By the molecular structural diagram producing method of the present invention, first, the atom pair data extraction process step extracts the bonding atom pair data indicating the bond relation of each atom constituting the compound. Next, the classification step classifies each atom into either of the cyclic portion and the chain portion. This classification is carried out based on the bonding atom pair data extracted in the atom pair data extraction process step. Further, the two-dimensional coordinates arithmetic step obtains the two-dimensional coordinates of each atom classified into the cyclic portion and also obtains the two-dimensional coordinates of each atom classified into the chain portion. Then the structural diagram production process step produces the molecular structural diagram, based on the two-dimensional coordinates of each atom obtained in this manner.

In the above molecular structural diagram producing method of the present invention, preferably, said two-dimensional coordinates arithmetic step comprises:

a first step for, in the case where a ring comprised of atoms classified into said cyclic portion is a fused ring, separating said fused ring into a plurality of single rings, a second step for selecting a predetermined single ring out of the single rings separated in said first step and for, in the case of said single ring being an m-membered ring (m is a natural number not less than 3), obtaining two-dimensional coordinates of each atom as assuming said m-membered ring is a regular m-polygon, a third step for selecting a single ring fused with a specific single ring for which two-dimensional coordinates of atoms were already obtained, out of the single rings separated in said first step and for, in the case of said single ring being an n-membered ring (n is a natural number not less than 3), obtaining two-dimensional coordinates of each atom as assuming said n-membered ring is an n-polygon sharing k sides (k edges) (k is a natural number) with said specific single ring, and a fourth step for repeating said third step until two-dimensional coordinates of all atoms in each single ring separated in said first step have been obtained.

In this case, preferably, in said second step, the predetermined single ring is selected in accordance with a priority order assigned to each single ring depending upon a number of atoms in each single ring separated in said first step.

Also, preferably, in said third step, the two-dimensional coordinates of each atom are obtained as follows:

among sides (edges) of said n-polygon the k sides shared with said specific single ring are regarded as shared sides (shared edges) and the other sides as non-shared sides (non-shared edges), a length of an auxiliary straight line connecting two ends of a line comprised of all said shared sides is let to be L (L is a known value), and a length of each side other than said shared sides is let to be r (r is a predetermined value), among internal angles of an (n−k+1) polygon comprised of said auxiliary straight line and all said non-shared sides internal angles between said auxiliary straight line and said non-shared sides are let to be α (radian) and internal angles between said non-shared sides are let to be β (radian), β to satisfy $$r\cos\{((n-k-1)\Pi-(n-k)\beta)/2\}=L\cos(\beta/2)$$

is calculated, and $$\alpha=(n-k-1)(\Pi-\beta)/2$$

is also calculated (where Π is the circle ratio (ratio of the circumference of a circle to its diameter)), thereby obtaining the two-dimensional coordinates of each atom from values of these calculations.

Further, in the above molecular structural diagram producing method of the present invention, preferably, said two-dimensional coordinates arithmetic step comprises:

a fifth step for extracting all terminal atoms becoming ends of chain structure out of the atoms classified into said chain portion and for selecting out of pairs of said terminal atoms extracted a pair of said terminal atoms having a largest number of bonds contained between the pair of said terminal atoms, a sixth step for obtaining two-dimensional coordinates of each atom between said pair of terminal atoms selected in said fifth step, a seventh step for selecting out of said terminal atoms two-dimensional coordinates of which are not obtained yet, one said terminal atom having a largest number of bonds contained between said terminal atom and an atom two-dimensional coordinates of which were already obtained, and an eighth step for obtaining two-dimensional coordinates of each atom between said terminal atom selected in said seventh step and the atom two-dimensional coordinates of which were already obtained.

In this case, preferably, in said sixth step and said eighth step, while keeping a length between atoms constant and changing a bond angle depending upon a number of atoms bonded to each atom, two-dimensional coordinates of each atom are obtained in order from one end.

Also, in the above molecular structural diagram producing method of the present invention, said apparatus may further comprise a display and comprise a pointing device as said input means, and in this case, in said atom pair data extraction step, said bonding atom pair data is extracted based on a molecular structural diagram drawn on said display using said pointing device, preferably.

Further, in the above molecular structural diagram producing method of the present invention, said storage means may store a bond table file in which a table of said bonding atom pair data is recorded, and in this case, in said atom pair data extraction step, said bonding atom pair data is extracted by reading predetermined said bonding atom pair data out of said bond table file, preferably.

The molecular structural diagram producing method of the present invention may be the following one. Namely, the method may be a molecular structural diagram producing method for producing a molecular structural diagram, using an apparatus having input means, storage means, and molecular structural diagram producing means, comprising:

an input step for accepting input of bonding atom pair data indicating the bond relation of each atom constituting a compound by said input means, a storage step for storing at least said bonding atom pair data in said storage means, and a molecular structural diagram producing step for producing a molecular structural diagram of said compound, based on said bonding atom pair data extracted from said storage means, by said molecular structural diagram producing means;

wherein in said molecular structural diagram producing step, when said bonding atom pair data extracted from said storage means is data of a compound comprised of only a fused ring, when the smallest set of smallest rings necessary and minimum to express all atoms and bonds constituting said fused ring is comprised of only one five-membered ring and one six-membered ring, and when said five-membered ring and said six-membered ring are fused as sharing three atoms, a molecular structural diagram of said compound is produced so that lengths of all bonds become equal.

In such molecular structural diagram producing method of the present invention, the input means accepts the bonding atom pair data indicating the bond relation of each atom constituting the compound. This bonding atom pair data is extracted from the storage means, and the molecular structural diagram of the compound is produced based on the bonding atom pair data in the molecular structural diagram producing step. Especially, when the bonding atom pair data is data of a compound comprised of only a fused ring, when the smallest set of smallest rings necessary and minimum to express all atoms and bonds constituting the fused ring is comprised of only one five-membered ring and one six-membered ring, and when the five-membered ring and the six-membered ring are fused as sharing three atoms, the diagram is produced so that the lengths of all bonds become equal.

The molecular structural diagram producing method of the present invention may be the following one. Namely, the method may be a molecular structural diagram producing method for producing a molecular structural diagram, using an apparatus having input means, storage means, and molecular structural diagram producing means, comprising:

an input step for accepting input of bonding atom pair data indicating the bond relation of each atom constituting a compound by said input means, a storage step for storing at least said bonding atom pair data in said storage means, and a molecular structural diagram producing step for producing a molecular structural diagram of said compound, based on said bonding atom pair data extracted from said storage means, by said molecular structural diagram producing means;

wherein in said molecular structural diagram producing step, when said bonding atom pair data extracted from said storage means is data about a fused ring in which a number of bonds attaching to any atom therein is not more than 3, a molecular structural diagram of said compound is produced so that lengths of all bonds become equal.

In such molecular structural diagram producing method of the present invention, the input means accepts the bonding atom pair data indicating the bond relation of each atom constituting the compound. This bonding atom pair data is extracted from the storage means, and the molecular structural diagram of the compound is produced based on the bonding atom pair data in the molecular structural diagram producing step. Especially, when the bonding atom pair data is data about a fused ring in which either of the numbers of bonds attaching to from the respective atoms is not more than 3, the diagram is produced so that the lengths of all bonds become equal.

Further, the molecular structural diagram producing method of the present invention may be the following one. Namely, the method may be a molecular structural diagram producing method for producing a molecular structural diagram, using an apparatus having input means, storage means, and molecular structural diagram producing means, comprising:

an input step for accepting input of bonding atom pair data indicating the bond relation of each atom constituting a compound by said input means, a storage step for storing at least said bonding atom pair data in said storage means, and a molecular structural diagram producing step for producing a molecular structural diagram of said compound, based on said bonding atom pair data extracted from said storage means, by said molecular structural diagram producing means;

wherein in said molecular structural diagram producing step, when said bonding atom pair data extracted from said storage means is data of a compound comprised of only a fused ring and when, in combinations of rings contained in the smallest set of smallest rings necessary and minimum to express all atoms and bonds constituting said fused ring, an arbitrary pair of rings are fused with each other as sharing three or more atoms, a molecular structural diagram of said compound is produced so that, separating bonds in said pair of rings into bonds A atoms of which are shared by the pair of rings and bonds B atoms of which are not shared thereby, lengths of the bonds B and angles between the bonds B become equal respectively in each ring.

In such molecular structural diagram producing method of the present invention, the input means accepts the bonding atom pair data indicating the bond relation of each atom constituting the compound. This bonding atom pair data is extracted from the storage means, and the molecular structural diagram of the compound is produced based on the bonding atom pair data in the molecular structural diagram producing step. Especially, when the bonding atom pair data is data of a compound comprised of only a fused ring and when, in combinations of rings contained in the smallest set of smallest rings necessary and minimum to express all atoms and bonds constituting the fused ring, an arbitrary pair of rings are fused with each other as sharing three or more atoms, the molecular structural diagram is produced so that, separating bonds in the pair of rings into bonds A atoms of which are shared in the pair of rings and bonds B atoms of which are not shared therein, the lengths of the bonds B and the angles between the bonds B become equal respectively in each ring.

Yet further, the molecular structural diagram producing method of the present invention may be the following one. Namely, the method may be a molecular structural diagram producing method for producing a molecular structural diagram, using an apparatus having input means, storage means, and molecular structural diagram producing means, comprising:

an input step for accepting input of bonding atom pair data indicating the bond relation of each atom constituting a compound by said input means, a storage step for storing at least said bonding atom pair data in said storage means, and a molecular structural diagram producing step for producing a molecular structural diagram of said compound, based on said bonding atom pair data extracted from said storage means, by said molecular structural diagram producing means;

wherein in said molecular structural diagram producing step, when said bonding atom pair data extracted from said storage means is data of a compound which is comprised of only a chain structure, in which bonds between atoms are comprised of only single bonds and/or double bonds without designation of cis-configuration, and in which two double bonds are not adjacent, a molecular structural diagram of said compound is produced so that, defining as a principal chain a bond chain between a terminal atom pair including a largest number of bonds between two terminal atoms thereof out of all combinations of two terminal atoms of said compound, lengths of respective bonds constituting said principal chain and bond angles between the bonds both become equal and a line connecting middle points of the bonds become a straight line.

In such molecular structural diagram producing method of the present invention, the input means accepts the bonding atom pair data indicating the bond relation of each atom constituting the compound and the molecular structural diagram producing step produces the molecular structural diagram of the compound, based on this bonding atom pair data. Especially, when the bonding atom pair data is data of a compound which is comprised of only the chain structure, in which the bonds between atoms are comprised of only single bonds and/or double bonds without designation of cis-configuration, and in which two double bonds are not adjacent, the molecular structural diagram of the compound is produced so that, defining as a principal chain the bond chain between a pair of terminal atoms having the largest number of bonds between them out of all combinations of two terminal atoms in the compound, the lengths of the respective bonds constituting the principal chain and the bond angles between the bonds both become equal and the line connecting the middle points of the bonds becomes a straight line.

In this case, preferably, in said molecular structural diagram producing step, when there is a side chain being a bond chain branched from said principal chain, the molecular structural diagram of said compound is produced so as to locate said side chain in an external-angle-side region out of two regions defined by two bonds in said principal chain adjacent to an atom at a branch point between said principal chain and said side chain.

Also, in the above molecular structural diagram producing method of the present invention, said apparatus may further comprise a display and indication control means for making the molecular structural diagram of said compound produced in said molecular structural diagram producing step, indicated on said display, and in this case, said method further comprises an indication step for indicating said molecular structural diagram on said display by said indication control means so that said straight line connecting the middle points of the bonds extends in parallel with a horizontal frame of a screen of said display, preferably.

Next explained is the computer program product for production of molecular structural diagram (storage medium for production of molecular structural diagram) according to the present invention.

The computer program product for production of molecular structural diagram of the present invention is a computer program product for production of molecular structural diagram used together with an information processing apparatus comprising input means for accepting input of bonding atom pair data indicating the bond relation of each atom constituting a compound, storage means for storing at least said bonding atom pair data, and reading means for reading information out of a computer-usable medium;

said computer program product comprising a computer-usable medium having a program area for storing a program and having a computer-readable program embodied in said medium for efficiently producing a molecular structural diagram of said compound, based on said bonding atom pair data extracted from said storage means;

said computer program product having a computer-readable molecular structural diagram producing program for producing the molecular structural diagram of said compound, based on said bonding atom pair data extracted from said storage means, in said program area;

wherein said molecular structural diagram producing program comprises:

a computer-readable atom pair data extraction routine for extracting said bonding atom pair data from said storage means, a computer-readable classification routine for classifying each atom constituting said compound into either of a cyclic portion and a chain portion, based on said bonding atom pair data extracted in said atom pair data extraction routine, a computer-readable two-dimensional coordinates arithmetic routine for obtaining two-dimensional coordinates of each atom classified into said cyclic portion and/or into said chain portion in said classification routine, and a computer-readable structural diagram production process routine for producing a molecular structural diagram, based on said two-dimensional coordinates of each atom obtained in said two-dimensional coordinates arithmetic routine.

When the computer program product for production of molecular structural diagram of the present invention is installed in the predetermined information processing apparatus and the molecular structural diagram production program stored in the program area is read, the molecular structural diagram production program can be carried out in the information processing apparatus. Namely, first, the atom pair data extraction routine is executed to extract the bonding atom pair data indicating the bond relation of each atom constituting the compound. Next, the classification routine is executed to classify each atom into either of the cyclic portion and the chain portion. This classification is carried out based on the bonding atom pair data extracted in the atom pair data extraction routine. Further, the two-dimensional coordinates arithmetic routine is executed to obtain the two-dimensional coordinates of each atom classified into the cyclic portion and also to obtain the two-dimensional coordinates of each atom classified into the chain portion. Then the structural diagram production process routine is executed to produce the molecular structural diagram based on the two-dimensional coordinates of each atom obtained in this manner.

In the above computer program product for production of molecular structural diagram of the present invention, preferably, said two-dimensional coordinates arithmetic routine comprises:

a first step for, in the case where a ring comprised of atoms classified into said cyclic portion is a fused ring, separating said fused ring into a plurality of single rings, a second step for selecting a predetermined single ring out of the single rings separated in said first step and for, in the case of said single ring being an m-membered ring (m is a natural number not less than 3), obtaining two-dimensional coordinates of each atom as assuming said m-membered ring is a regular m-polygon, a third step for selecting a single ring fused with a specific single ring for which two-dimensional coordinates of atoms were already obtained, out of the single rings separated in said first step and for, in the case of said single ring being an n-membered ring (n is a natural number not less than 3), obtaining two-dimensional coordinates of each atom as assuming said n-membered ring is an n-polygon sharing k sides (k edges) (k is a natural number) with said specific single ring, and a fourth step for repeating said third step until two-dimensional coordinates of all atoms in each single ring separated in said first step have been obtained.

In this case, preferably, in said second step, the predetermined single ring is selected in accordance with a priority order assigned to each single ring depending upon a number of atoms in each single ring separated in said first step.

Also, preferably, in said third step, the two-dimensional coordinates of each atom are obtained as follows:

among sides (edges) of said n-polygon the k sides shared with said specific single ring are regarded as shared sides (shared edges) and the other sides as non-shared sides (non-shared edges), a length of an auxiliary straight line connecting two ends of a line comprised of all said shared sides is let to be L (L is a known value), and a length of each side other than said shared sides is let to be r (r is a predetermined value), among internal angles of an (n−k+1) polygon comprised of said auxiliary straight line and all said non-shared sides internal angles between said auxiliary straight line and said non-shared sides are let to be α (radian) and internal angles between said non-shared sides are let to be β (radian), β to satisfy $$r \cdot \cos\{((n-k-1)\Pi-(n-k)\beta/2\} = L \cdot \cos(\beta/2)$$

is calculated, and $$\alpha = (n-k-1)(\Pi-\beta)/2$$

is also calculated (where $\Pi$ is the circle ratio (ratio of the circumference of a circle to its diameter)), thereby obtaining the two-dimensional coordinates of each atom from values of these calculations.

Further, in the above computer program product for production of molecular structural diagram of the present invention, preferably, said two-dimensional coordinates arithmetic routine comprises:

a fifth step for extracting all terminal atoms becoming ends of chain structure out of the atoms classified into said chain portion and for selecting out of pairs of said terminal atoms extracted a pair of said terminal atoms having a largest number of bonds contained between the pair of said terminal atoms, a sixth step for obtaining two-dimensional coordinates of each atom between said pair of terminal atoms selected in said fifth step, a seventh step for selecting out of said terminal atoms two-dimensional coordinates of which are not obtained yet, one said terminal atom having a largest number of bonds contained between said terminal atom and an atom two-dimensional coordinates of which were already obtained, and an eighth step for obtaining two-dimensional coordinates of each atom between said terminal atom selected in said seventh step and the atom two-dimensional coordinates of which were already obtained.

In this case, preferably, in said sixth step and said eighth step, while keeping a length between atoms constant and changing a bond angle depending upon a number of atoms bonded to each atom, two-dimensional coordinates of each atom are obtained in order from one end.

Also, in the above computer program product for production of molecular structural diagram of the present invention, said information processing apparatus may further comprise a display and comprise a pointing device as said input means, and in this case, in said atom pair data extraction routine, said bonding atom pair data is extracted based on a molecular structural diagram drawn on said display using said pointing device, preferably.

Further, in the above computer program product for production of molecular structural diagram of the present invention, said storage means may store a bond table file in which a table of said bonding atom pair data is recorded, and in this case, in said atom pair data extraction routine, said bonding atom pair data is extracted by reading predetermined said bonding atom pair data out of said bond table file, preferably.

The computer program product for production of molecular structural diagram of the present invention may be the following one. Namely, the product may be a computer program product for production of molecular structural diagram used together with an information processing apparatus comprising input means for accepting input of bonding atom pair data indicating the bond relation of each atom constituting a compound, storage means for storing at least said bonding atom pair data, and reading means for reading information out of a computer-usable medium;

said computer program product comprising a computer-usable medium having a program area for storing a program and having a computer-readable program embodied in said medium for efficiently producing a molecular structural diagram of said compound, based on said bonding atom pair data extracted from said storage means;

said computer program product having a computer-readable molecular structural diagram producing program for producing the molecular structural diagram of said compound, based on said bonding atom pair data extracted from said storage means, in said program area;

wherein in said molecular structural diagram producing program, when said bonding atom pair data extracted from said storage means is data of a compound comprised of only a fused ring, when the smallest set of smallest rings necessary and minimum to express all atoms and bonds constituting said fused ring is comprised of only one five-membered ring and one six-membered ring, and when said five-membered ring and said six-membered ring are fused as sharing three atoms, a molecular structural diagram of said compound is produced so that lengths of all bonds become equal.

By such computer program product for production of molecular structural diagram of the present invention, the bonding atom pair data indicating the bond relation of each atom constituting the compound is extracted from the storage means, and, based on this bonding atom pair data, the molecular structural diagram of the compound is produced by the molecular structural diagram producing program. Especially, when the bonding atom pair data is data of a compound comprised of only a fused ring, when the smallest set of smallest rings necessary and minimum to express all atoms and bonds constituting the fused ring is comprised of only one five-membered ring and one six-membered ring, and when the five-membered ring and the six-membered ring are fused as sharing three atoms, the molecular structural diagram is produced so that the lengths of all bonds become equal.

Also, the computer program product for production of molecular structural diagram of the present invention may be the following one. Namely, the product may be a computer program product for production of molecular structural diagram used together with an information processing apparatus comprising input means for accepting input of bonding atom pair data indicating the bond relation of each atom constituting a compound, storage means for storing at least said bonding atom pair data, and reading means for reading information out of a computer-usable medium;

said computer program product comprising a computer-usable medium having a program area for storing a program and having a computer-readable program embodied in said medium for efficiently producing a molecular structural diagram of said compound, based on said bonding atom pair data extracted from said storage means;

said computer program product having a computer-readable molecular structural diagram producing program for producing the molecular structural diagram of said compound, based on said bonding atom pair data extracted from said storage means, in said program area;

wherein in said molecular structural diagram producing program, when said bonding atom pair data extracted from said storage means is data about a fused ring in which a number of bonds attaching to any atom therein is not more than 3, a molecular structural diagram of said compound is produced so that lengths of all bonds become equal.

By such computer program product for production of molecular structural diagram of the present invention, the bonding atom pair data indicating the bond relation of each atom constituting the compound is extracted from the storage medium, and, based on this bonding atom pair data, the molecular structural diagram of the compound is produced by the molecular structural diagram producing program. Especially, when the bonding atom pair data is data about a fused ring in which either of the numbers of bonds attaching to the respective atoms is not more than 3, the molecular structural diagram is produced so that the lengths of all bonds become identical.

Further, the computer program product for production of molecular structural diagram of the present invention may be the following one. Namely, the product may be a computer program product for production of molecular structural diagram used together with an information processing apparatus comprising input means for accepting input of bonding atom pair data indicating the bond relation of each atom constituting a compound, storage means for storing at least said bonding atom pair data, and reading means for reading information out of a computer-usable medium;

said computer program product comprising a computer-usable medium having a program area for storing a program and having a computer-readable program embodied in said medium for efficiently producing a molecular structural diagram of said compound, based on said bonding atom pair data extracted from said storage means;

said computer program product having a computer-readable molecular structural diagram producing program for producing the molecular structural diagram of said compound, based on said bonding atom pair data extracted from said storage means, in said program area;

wherein in said molecular structural diagram producing program, when said bonding atom pair data extracted from said storage means is data of a compound comprised of only a fused ring and when, in combinations of rings contained in the smallest set of smallest rings necessary and minimum to express all atoms and bonds constituting said fused ring, an arbitrary pair of rings are fused with each other as sharing three or more atoms, a molecular structural diagram of said compound is produced so that, separating bonds in said pair of rings into bonds A atoms of which are shared by the pair of rings and bonds B atoms of which are not shared thereby, lengths of the bonds B and angles between the bonds B become equal respectively in each ring.

By such computer program product for production of molecular structural diagram of the present invention, the bonding atom pair data indicating the bond relation of each atom constituting the compound is extracted from the storage means, and, based on this bonding atom pair data, the molecular structural diagram of the compound is produced by the molecular structural diagram producing program. Especially, when the bonding atom pair data is data of a compound comprised of only a fused ring and when, in combinations of rings contained in the smallest set of smallest rings necessary and minimum to express all atoms and bonds constituting the fused ring, an arbitrary pair of rings are fused with each other as sharing three or more atoms, the molecular structural diagram is produced so that, separating bonds in the pair of rings into bonds A atoms of which are shared in the pair of rings and bonds B atoms of which are not shared therein, the lengths of the bonds B and the angles between the bonds B become equal respectively in each ring.

Yet further, the computer program product for production of molecular structural diagram of the present invention may be the following one. Namely, the product may be a computer program product for production of molecular structural diagram used together with an information processing apparatus comprising input means for accepting input of bonding atom pair data indicating the bond relation of each atom constituting a compound, storage means for storing at least said bonding atom pair data, and reading means for reading information out of a computer-usable medium;

said computer program product comprising a computer-usable medium having a program area for storing a program and having a computer-readable program embodied in said medium for efficiently producing a molecular structural diagram of said compound, based on said bonding atom pair data extracted from said storage means;

said computer program product having a computer-readable molecular structural diagram producing program for producing the molecular structural diagram of said compound, based on said bonding atom pair data extracted from said storage means, in said program area;

wherein in said molecular structural diagram producing program, when said bonding atom pair data extracted from said storage means is data of a compound which is comprised of only a chain structure, in which bonds between atoms are comprised of only single bonds and/or double bonds without designation of cis-configuration, and in which two double bonds are not adjacent, a molecular structural diagram of said compound is produced so that, defining as a principal chain a bond chain between a terminal atom pair including a largest number of bonds between two terminal atoms thereof out of all combinations of two terminal atoms of said compound, lengths of respective bonds constituting said principal chain and bond angles between the bonds both become equal and a line connecting middle points of the bonds become a straight line.

By such computer program product for production of molecular structural diagram of the present invention, the bonding atom pair data indicating the bond relation of each atom constituting the compound is extracted from the storage means, and, based on this bonding atom pair data, the molecular structural diagram of the compound is produced by the molecular structural diagram producing program. Especially, when the bonding atom pair data is data of a compound which is comprised of only the chain structure, in which the bonds between atoms are comprised of only single bonds and/or double bonds without designation of cis-configuration, and in which two double bonds are not adjacent, the molecular structural diagram of the compound is produced so that, defining as a principal chain the bond chain between a pair of terminal atoms having the largest number of bonds between them out of all combinations of two terminal atoms in the compound, the lengths of the respective bonds constituting the principal chain and the bond angles between the bonds both become equal and the line connecting the middle points of the bonds becomes a straight line.

In this case, preferably, in said molecular structural diagram producing program, when there is a side chain being a bond chain branched from said principal chain, the molecular structural diagram of said compound is produced so as to locate said side chain in an external-angle-side region out of two regions defined by two bonds in said principal chain adjacent to an atom at a branch point between said principal chain and said side chain.

Also, in the above computer program product for production of molecular structural diagram of the present invention, said information processing apparatus may further comprise a display and said computer program product may further have a computer-readable molecular structural diagram indication routine for making the molecular structural diagram of said compound produced in said molecular structural diagram producing program, indicated on said display, in said program area and in this case, in said molecular structural diagram indication routine, said molecular structural diagram is indicated on said display so that said straight line connecting the middle points of bonds extends in parallel with a horizontal frame of a screen of said display, preferably.

BRIEF DESCRIPTION OF DRAWINGS

FIG. 2A and FIG. 2B are diagrammatic tables each to show the structure of an example of bond table.

BEST MODE FOR CARRYING OUT THE INVENTION

The preferred embodiments of the present invention will be described with reference to the accompanying drawings.

Figure 1:
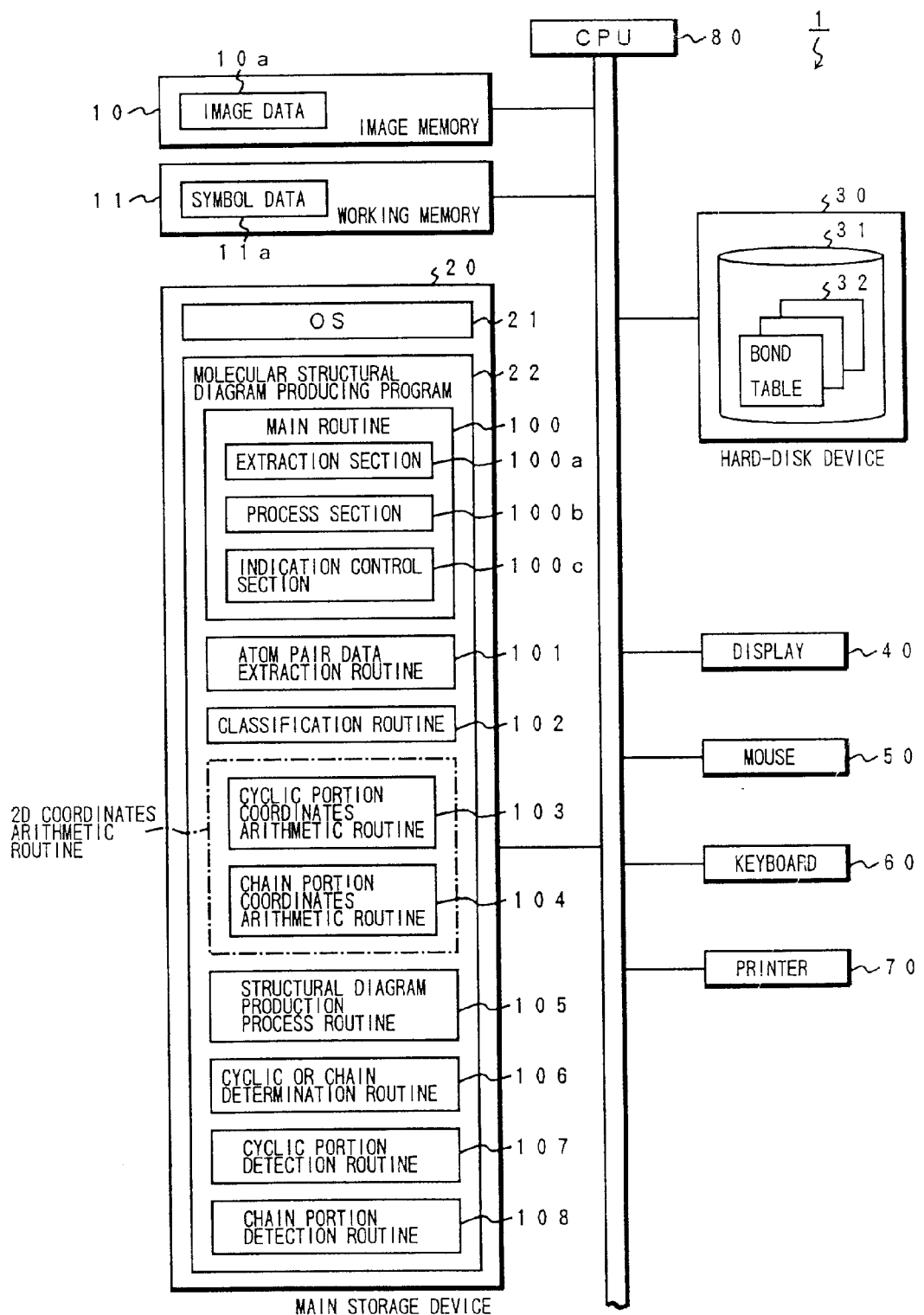
FIG. 1 is a block diagram to show the structure of an example of the producing apparatus of molecular structural diagram according to the present invention.

FIG. 1 is a block diagram to show the structure of the molecular structural diagram producing apparatus (information processing apparatus) 1 according to an embodiment of the present invention. As shown in FIG. 1, the molecular structural diagram producing apparatus 1 comprises an image memory 10 for storing image data 10a of molecular structural diagram, a working memory 11 for temporarily storing symbol data 11a or the like, a main storage device 20 for storing an operating system (OS) 21 and a molecular structural diagram producing program 22, and a hard disk device 30 for storing a bond table file 31.

The apparatus also comprises a display 40 for indicating a molecular structural diagram, a mouse 50 as a pointing device for accepting input of hand-written graphics, a keyboard 60 for accepting input of symbol data such as a chemical formula or the like, a printer 70 for outputting a molecular structural diagram, and a CPU 80 for controlling execution of the molecular structural diagram producing program 22 or the like. The pointing devices include a tablet, a digitizer, and a light-pen in addition to the mouse 50, and either of these devices may replace the mouse 50.

The molecular structural diagram producing program 22 in the present embodiment is a program for obtaining two-dimensional coordinates data of respective atoms constituting a compound from atom pair data (each data including bonding atom pair data, bond type data, and element name data) indicating the relation of bond between atoms constituting a compound, for producing a molecular structural diagram from these two-dimensional coordinates data, and for indicating the molecular structural diagram thus obtained on the display 40. This molecular structural diagram producing program 22 comprises a main routine 100 (having an extraction section 100a, a process section 100b, and an indication control section 100c) for systematically controlling the processing, an atom pair data extraction routine 101 for extracting the atom pair data indicating the relation of bond between atoms constituting a compound, and a classification routine 102 for classifying each atom constituting a compound into cyclic and chain portions. The molecular structural diagram producing program 22 also comprises a cyclic portion coordinates arithmetic routine 103 for obtaining two-dimensional coordinates data of respective atoms classified into a cyclic portion, a chain portion coordinates arithmetic routine 104 for obtaining two-dimensional coordinates data of respective atoms classified into a chain portion, and a structural diagram production process routine 105 for producing a molecular structural diagram.

In the present embodiment the atom pair data extraction routine 101 is arranged to extract the bonding atom pair data, bond type data and element name data, but the minimum requirement is that at least extraction of the bonding atom pair data is carried out for preparation of molecular structural diagram.

Further, the molecular structural diagram producing program 22 comprises a cyclic or chain determination routine 106 for determining whether each atom pair data belongs to a cyclic portion or to a chain portion, a cyclic portion detection routine 107 for detecting a cyclic portion, and a chain portion detection routine 108 for detecting a chain portion.

The hard-disk device 30 stores the bond table file 31 in which a plurality of bond tables 32 can be recorded. As shown in FIG. 2A and FIG. 2B, the bond table 32 comprises an atom table 32a and an atom pair table 32b. The atom table 32a comprises columns for numbers of atoms, two-dimensional coordinates of atoms (for example, orthogonal X-Y coordinates), element names (which are normally element symbols, but may be numerals of element numbers or the like), and attributes to be written therein (see FIG. 2A), and the atom pair table 32b comprises columns for bonding atom pair data, types of bond (1 for single bond, 2 for double bond, 3 for triple bond, and 4 for aromatic bond, for example), and structure to be written therein (see FIG. 2B). Here, the numbers of atoms are numbers for identifying the respective atoms constituting a compound by computer, which are numerals in the example of FIG. 2A, but may be symbols. Further, the bonding atom pair data can be better expressed as a combination of numbers of atoms.

The present embodiment is arranged to use the hard-disk device 30 as a storage means, but the storage means according to the present invention may be replaced by the main storage device, or by another writable storage device such as a floppy disk.

Figure 3:
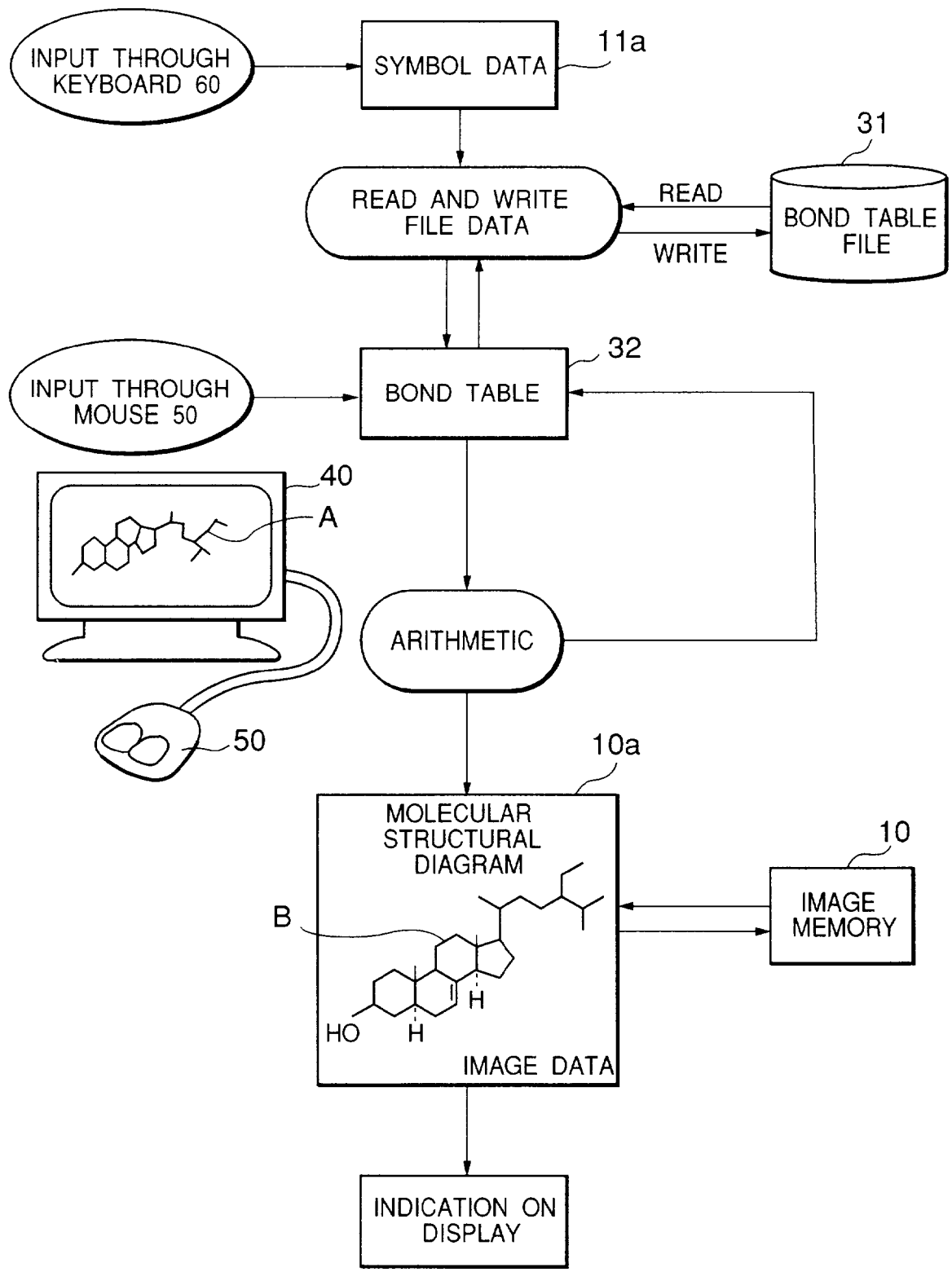
FIG. 3 is a schematic drawing to show an example of the producing method of molecular structural diagram according to the present invention.

Next described briefly is the producing method of molecular structural diagram using the molecular structural diagram producing apparatus 1 according to the present embodiment. As shown in FIG. 3, an operator manipulates the mouse 50 or keyboard 60, being an input means, to give input of information of a molecular structural diagram, and then a bond table 32 of a compound, which is a producing object of the molecular structural diagram, is produced in the storage device 30.

Input with the mouse 50 is hand-writing input of a molecular structural diagram of a compound on the display 40 using the mouse 50, and numbers of respective atoms in the molecular structural diagram A hand-written are written in the column of number of atom in the bond table 32 prepared in the main storage device 20. Further, the bonding atom pair data indicating the relation of bond between the atoms in this molecular structural diagram A is written in the column of bonding atom pair in the bond table 32. In this way, in the case of the input with the mouse 50, the bond table 32 for specifying the compound is prepared from the atom structural diagram A hand-written. At this stage the atom pair data (each data including the bonding atom pair data, bond type data, and element name data) indicating bond states of atoms is extracted from the hand-written molecular structural diagram A and is written in the bond table 32, but nothing is written in the columns of two-dimensional coordinates in the bond table 32 yet. Input with the keyboard 60 is input of a symbol string for specifying a name of a bond table corresponding to a selected compound using the keyboard 60. Based on the symbol data 11a input, a bond table 32 specified by the name of this bond table is read out of the bond table file 31 to extract the atom pair data.

As described, the bond table 32 can be obtained using either the mouse 50 or the keyboard 60, and the arithmetic as detailed below (the arithmetic by the cyclic portion coordinates arithmetic routine 103, the chain portion coordinates arithmetic routine 104, and so on) is carried out based on each data of this bond table 32. As detailed hereinafter, the above arithmetic to obtain the two-dimensional coordinates of atoms is carried out based on the bonding atom pair data, while the bond type and element name data is mainly used upon production of image data of molecular structural diagram.

Then the two-dimensional coordinates data obtained by this arithmetic is written in the columns of two-dimensional coordinates in the bond table 32, and, based on the two-dimensional coordinates data thus written, a molecular structural diagram B excellent in an aesthetic sense is produced. The molecular structural diagram B thus produced can be indicated on the display 40 in accordance with an instruction from the CPU 80 or can be output from the printer 70.

The bond table 32 obtained in this manner is written and preserved with the name of the bond table specified in the bond table file 31 in the hard-disk device 30 as occasion demands. The input with the keyboard 60 may be effected by directly writing the aforementioned atom pair data indicating the bond states of atoms into the bond table prepared in the main storage device 20. Also, input of bond table data may be accepted using a device for optically reading graphics or characters, such as an image scanner or an optical card reader (OCR), as an input means according to the present invention.

Particularly, in the case wherein the molecular structural diagram A is given by hand-written input using the mouse 50 and then the molecular structural diagram B obtained by the arithmetic is indicated on the display 40, the molecular structural diagram A is first indicated on the display 40 and then the molecular structural diagram B is indicated thereon. In this way the hand-written molecular structural diagram A with distortion is replaced by the molecular structural diagram B without distortion excellent in an aesthetic sense, thus effecting shaping of hand-written graphics (reshaping).

Next explained are the details of the producing method of molecular structural diagram using the molecular structural diagram producing apparatus 1 according to the present embodiment. First, under control of OS 21 the main routine 100 of the molecular structural diagram producing program 22 is started.

Figure 4:
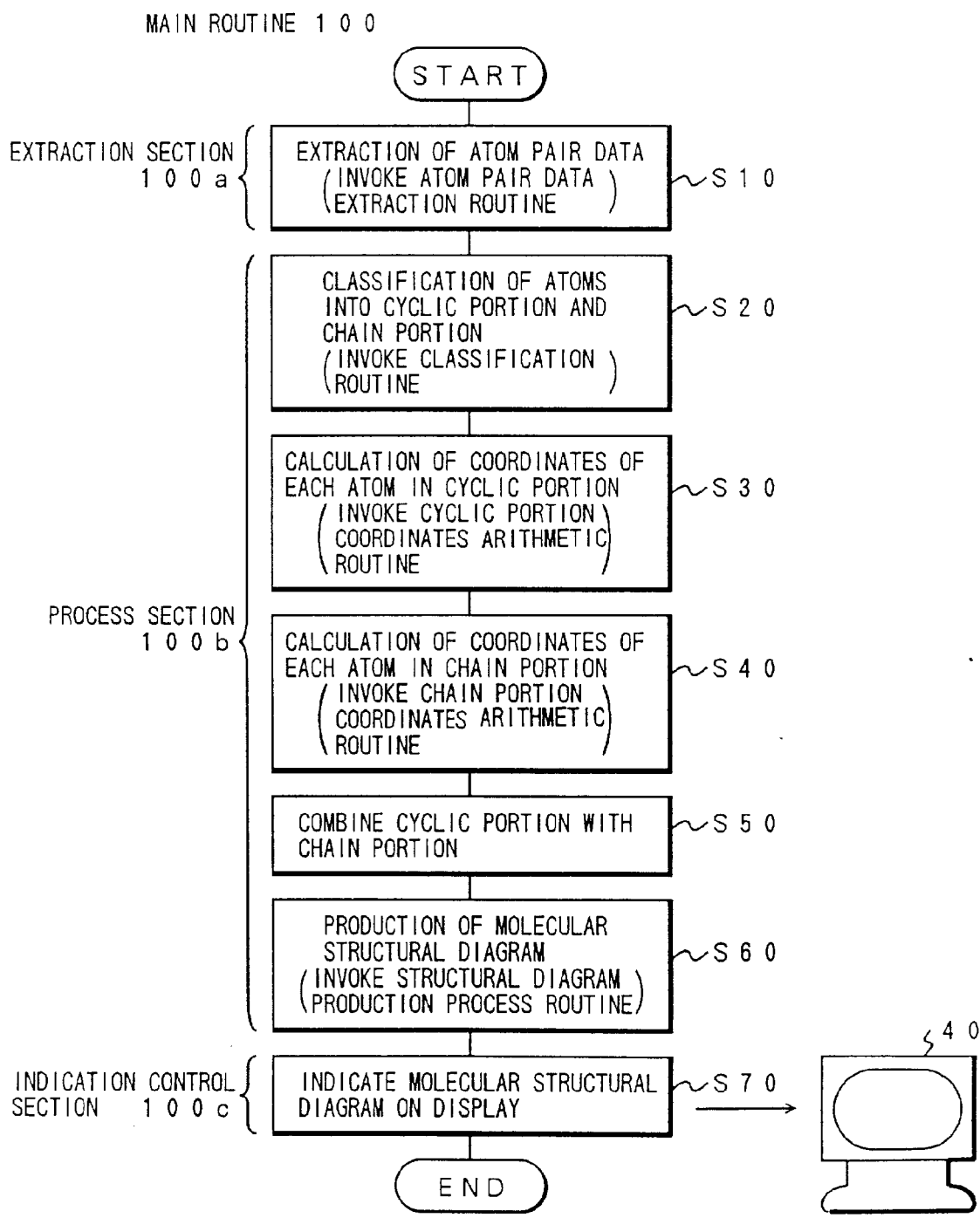
FIG. 4 is a flowchart to show an example of flow of process of a main routine.

As shown in the flowchart of FIG. 4, the main routine 100 comprises the extraction section 100a, the process section 100b, and the indication control section 100c, wherein the extraction section 100a has S10, the process section 100b S20 to S60, and the indication control section 100c S70. By executing the extraction section 100a under control of CPU 80, the extraction section 100a functions as an extracting means (an atom pair data extraction process section) for extracting the atom pair data indicating the bond relation between atoms constituting a compound. By executing the process section 100b under control of CPU 80, the process section 100b functions as a processing means (a molecular structural diagram producing means) for producing the molecular structural diagram of the compound based on the atom pair data. Further, by executing the indication control section 100c under control of CPU 80, the indication control section 100c functions as an indication controlling means for indicating the molecular structural diagram of the compound on the display 40.

As shown in the flowchart of FIG. 4, the main routine 100 first extract the atom pair data recorded in the atom table 32a and atom pair table 32b of the bond table 32 (S10). This extraction is carried out by invoking the atom pair data extraction routine 101. Next, a plurality of bonding atom pair data extracted are classified into the bonding atom pair data constituting a cyclic portion and the bonding atom pair data constituting a chain portion (S20). This classification is carried out by invoking the classification routine 102. Further, based on the bonding atom pair data constituting the cyclic portion, two-dimensional coordinates of respective atoms of the cyclic portion are calculated (S30). This calculation is carried out by invoking the cyclic portion coordinates arithmetic routine 103.

Figure 5A:
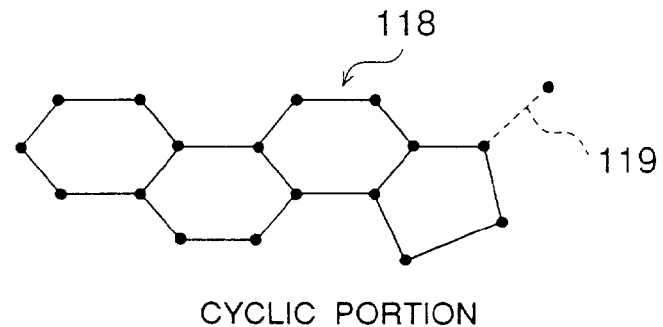
FIG. 5A to FIG. 5C are diagrammatic drawings each to show an example of a method for coupling a cyclic portion with a chain portion.
Figure 5B:
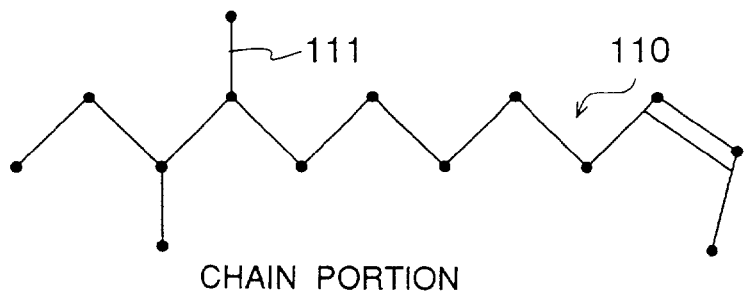
Figure 5C:
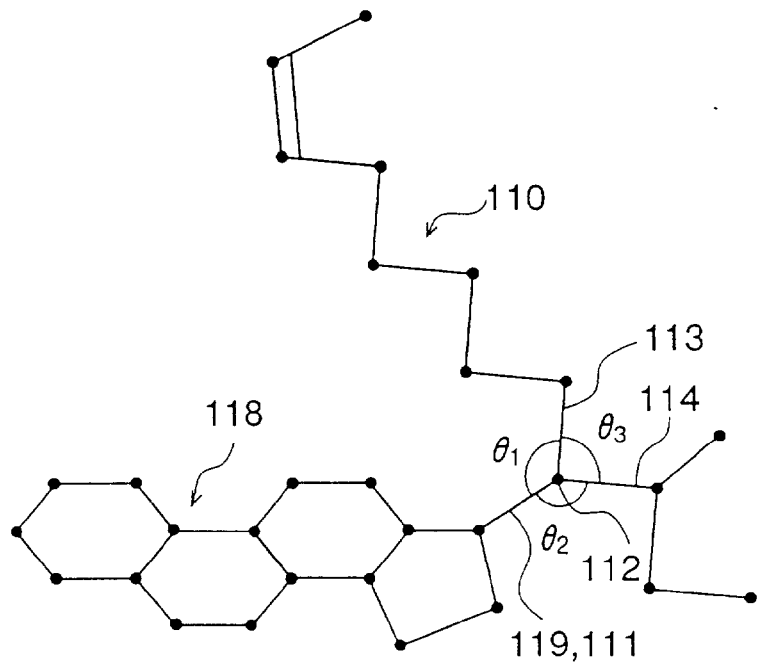

Next, two-dimensional coordinates of respective atoms of the chain portion are calculated based on the bonding atom pair data constituting the chain portion (S40). This calculation is carried out by invoking the chain portion coordinates arithmetic routine 104. Then the chain portion is moved and/or rotated to couple the cyclic portion with the chain portion (S50). Specifically, as shown in FIG. 5A to FIG. 5C, coordinates transformation is effected on the two-dimensional coordinates data of the respective atoms of the chain portion 110 obtained in the process of S40 so that a predetermined bond 119 of the cyclic portion 118 becomes coincident with a predetermined bond 111 of the chain portion 110. Particularly, the chain portion 110 is rotated as performing such adjustment that branching angles $\theta_1$ to $\theta_3$ of respective bonds 111, 113, 114 attaching to the atom 112 at the bonding portion become predetermined angles complying with the number of branches.

The two-dimensional coordinates data of each atom obtained in the processes of S30 to S50 is written in the columns of X coordinate and Y coordinate in the bond table 32 prepared in the main storage device 20.

Next, the image data 10a indicating the molecular structure is prepared based on the two-dimensional coordinates data of each atom written in the columns of X coordinate and Y coordinate in the bond table 32 (S60). This preparation of image data is carried out by invoking the structural diagram production process routine 105. Then the image data 10*a* of molecular structural diagram thus prepared is indicated on the display 40 (S70).

It is noted that S10 corresponds to the atom pair data extraction step (a means involved in the atom pair data extraction step is the atom pair data extraction process section), and S20 to the classification step (a means involved in the classification step is the classification process section). Further, S30, S40, and S50 correspond to the two-dimensional coordinates arithmetic step (a means involved in the two-dimensional coordinates arithmetic step is the two-dimensional coordinates arithmetic process section), and S60 to the structural diagram production process step (a means involved in the structural diagram production process step is the structural diagram production process section). Also, S10 to S60 correspond to the molecular structural diagram production step, and S70 to the molecular structural diagram indication step.

Figure 6:
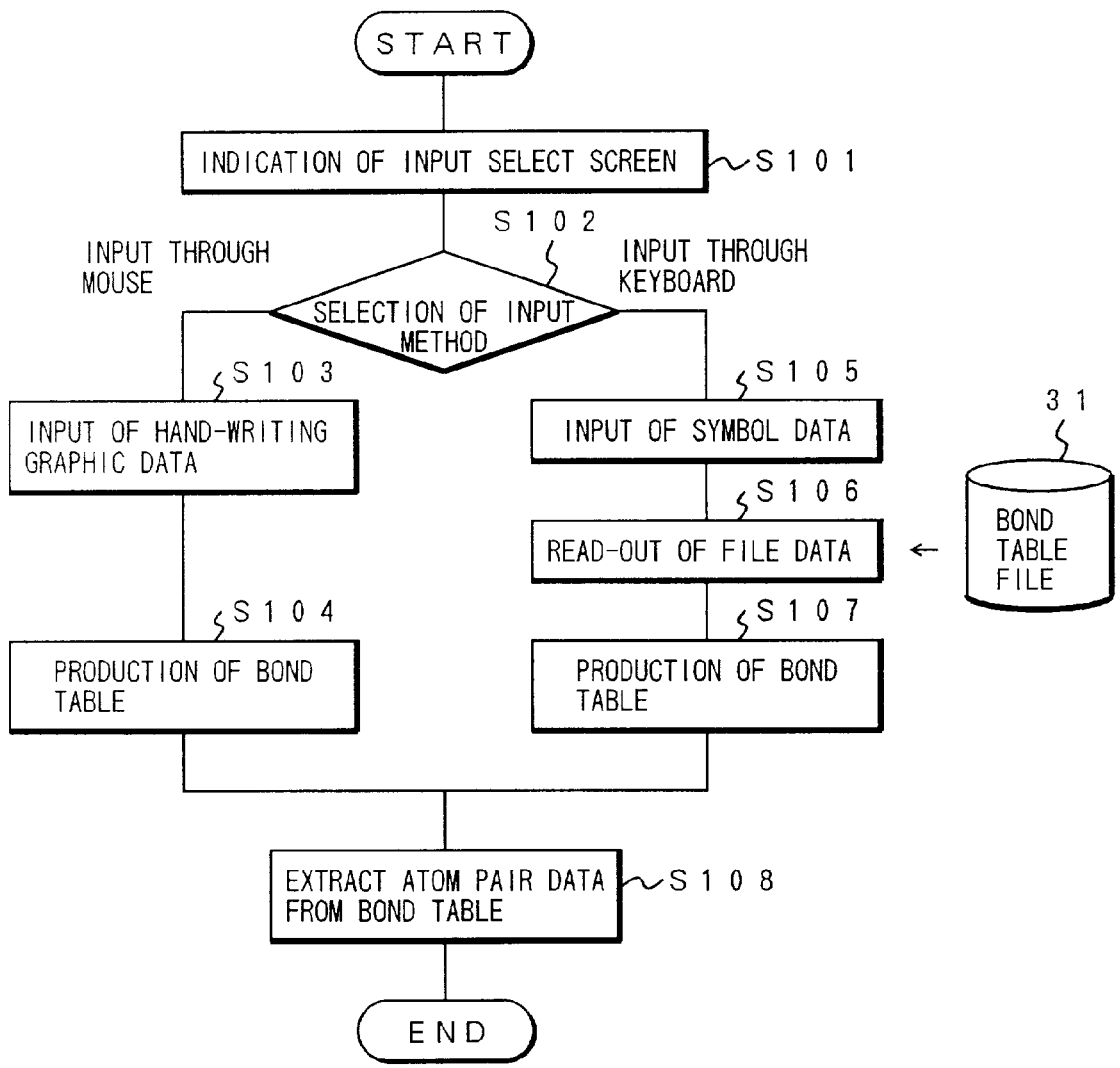
FIG. 6 is a flowchart to show an example of flow of process of an atom pair data extraction routine.

Next explained is the atom pair data extraction routine 101. The atom pair data extraction routine 101 is a sub-routine invoked by the process of S10 in the main routine 100. As shown in the flowchart of FIG. 6, the atom pair data extraction routine 101 first makes a select screen of input method indicated on the display 40 (S101). When the operator selects the input with the mouse 50 in accordance with this indication screen (S102), a screen for drawing a molecular structural diagram is indicated on the display 40. When the operator next gives hand-writing input of a molecular structural diagram indicating the structure of a selected compound using the mouse 50, this hand-writing input of graphic data is accepted (S103). Then, based on this hand-written graphic data, the bond table 32 is prepared in the main storage device 20 (S104).

Next, the input of hand-written graphic data through the mouse 50 is explained more specifically. First, when the operator clicks the mouse 50, data about one atom out of a pair of bonding atoms is input. In the next place, after the operator moves the mouse 50 and when the operator again clicks the mouse 50, data about the other atom forming the pair of bonding atoms together with the one atom is input. Then the click for input of the data about the other atom is regarded, with subsequent input of a next click, as being a click for designating one atom of a next pair of bonding atoms. As described, a pair of bonding atoms can be designated by two consecutive clicks on the mouse 50. This means that all bonding atom pairs constituting a compound can be input by the operator's continuing designation of bonding atom pairs as successively shifting the atoms.

Corresponding to the data about the input atoms (for example, in the input order of atoms, 1, 2, 3, . . . ), numbers of the atoms are written into the column of number of atom in the atom table 32*a*. Also, the data about the bond relation between the atoms input is written in the column of bonding atom pair in the atom pair table 32*b*. Further, if the operator gives input of element name of each atom, the element names will be written in the column of element name in the atom table 32*a*. Similarly, if the operator gives input of types of bonds connecting the bond atom pairs, numerical values corresponding to the types of bonds are written into the column of bond type in the atom pair table 32*b*. It is a preferred arrangement to recognize a name of an element and a type of a bond which are not written specifically, as a carbon and a single bond, respectively. The molecular structural diagram and the bond table based thereon are usually produced as omitting hydrogen atoms.

When in the process of S102 the operator selects the input with the keyboard 60, a symbol string input screen is indicated on the display 40. When the operator gives input of a symbol string of a bond table name specifying a selected compound using the keyboard 60, input of this symbol data 11*a* is accepted (S105). Then the atom pair data of the bond table specified by this symbol data 11*a* is read out of the bond table file 31 (S106), and the bond table 32 is prepared in the main storage device 20 (S107).

Further, after completion of the processes of S104 and S107, the atom pair data is extracted from the atom table 32*a* and atom pair table 32*b* in the bond table 32 prepared by these processes (S108). Then, after completion of the process of S108, the atom pair data extraction routine 101 is ended to return the processing to S20 in the main routine 100.

Figure 7:
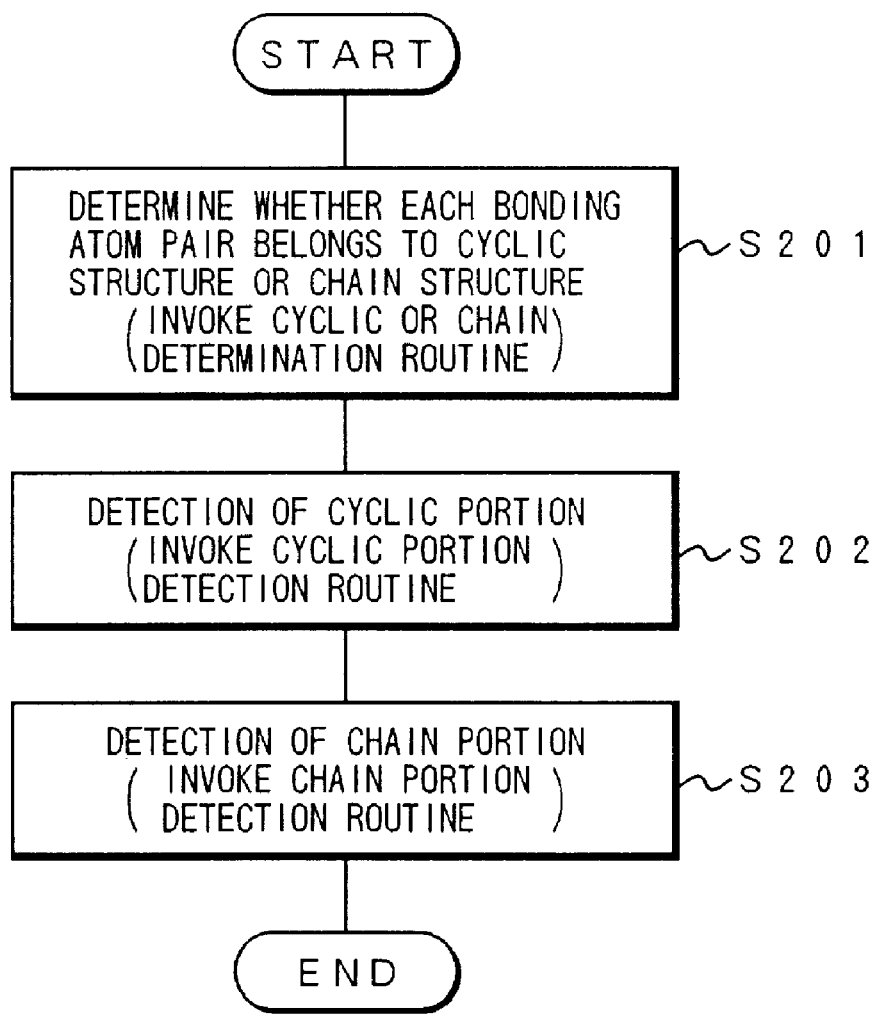
FIG. 7 is a flowchart to show an example of flow of process of a classification routine.

Next explained is the classification routine 102. The classification routine 102 is a sub-routine invoked by the process of S20 in the main routine 100. As shown in the flowchart of FIG. 7, the classification routine 102 first determines whether each bonding atom pair data prepared in the atom pair data extraction routine 101 belongs to either the cyclic structure or the chain structure (S201). This determination is carried out by invoking the cyclic or chain determination routine 106. Then the determination result is set as structural data of atom pair table in the bond table 32 stored in the main storage device 20 as discussed hereinafter.

Figure 8:
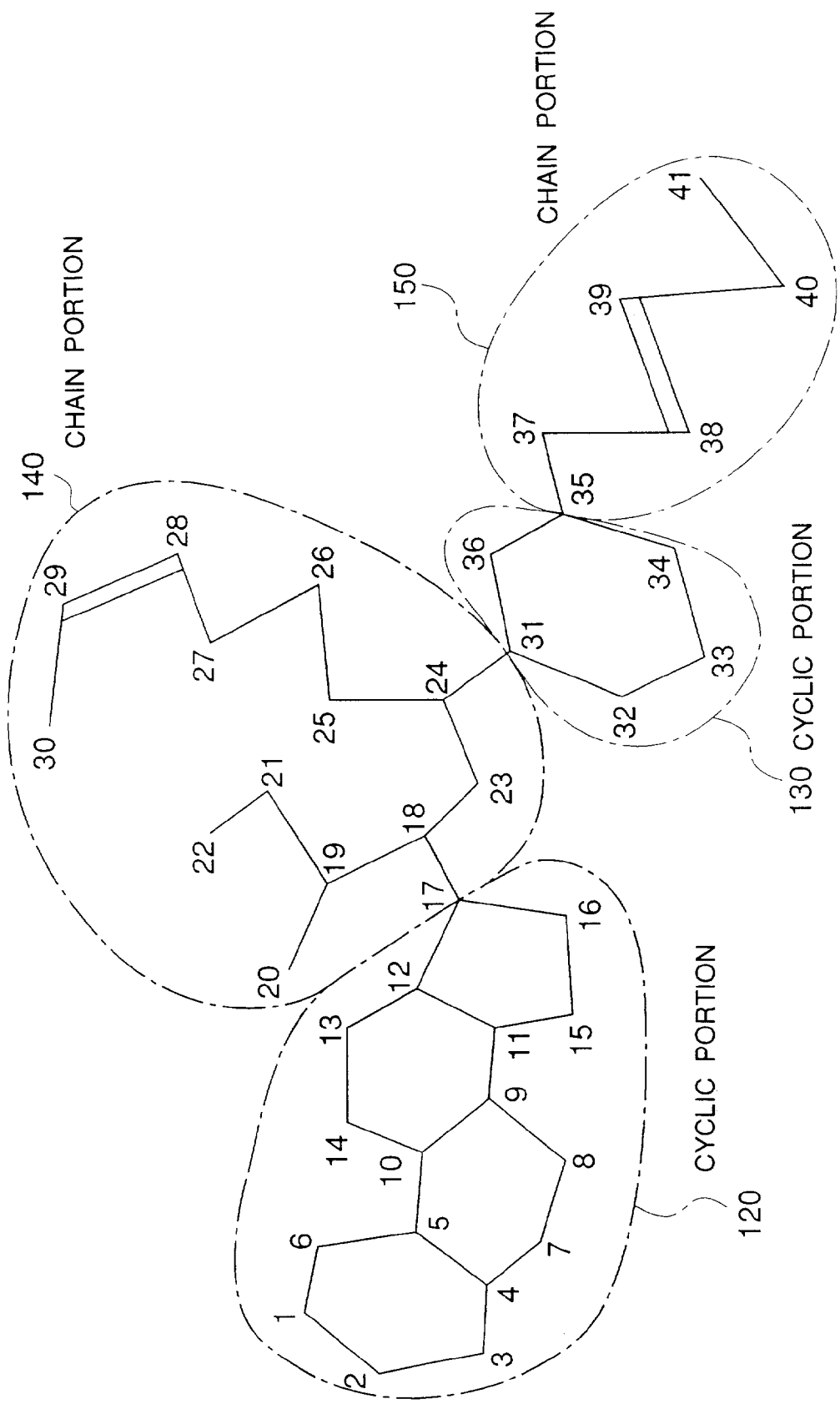
FIG. 8 is a diagrammatic drawing to show an example of a classification state in which each bonding atom pair data is classified into cyclic portions and chain portions.

The cyclic portion is next detected (S202). This detection is carried out by invoking the cyclic portion detection routine 107. Further, the chain portion is detected (S203). This detection is carried out by invoking the chain portion detection routine 108. By the processes of S202 and S203, each bonding atom pair data is classified into the cyclic portion or the chain portion, as described below. For example, as shown in FIG. 8, each bonding atom pair data (1, 2), (2, 3), . . . , (40, 41) is classified into two cyclic portions 120, 130 or two chain portions 140, 150. Then, after completion of the process of S203, the classification routine 102 is completed to return the processing to S30 in the main routine 100.

Figure 9:
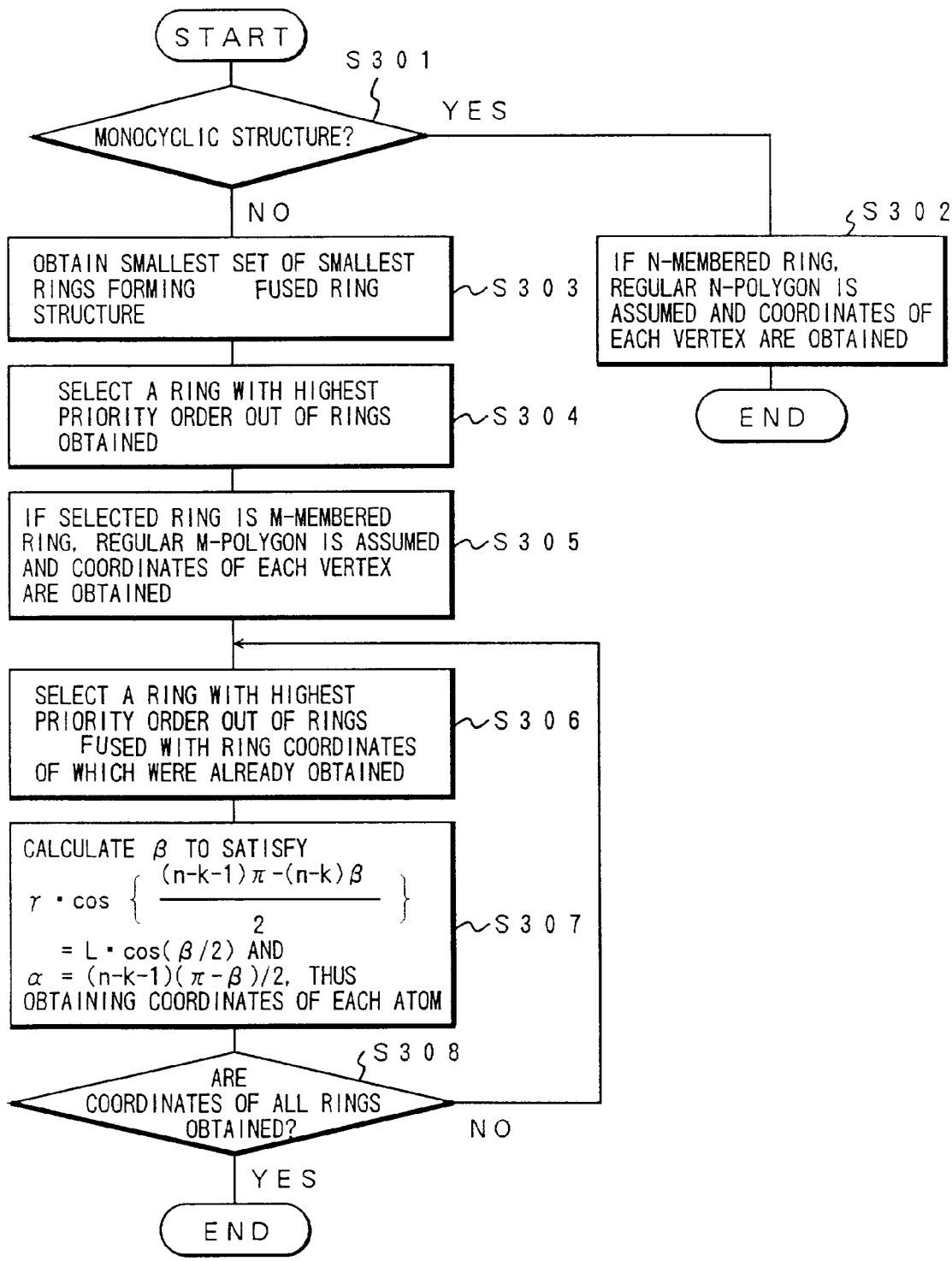
FIG. 9 is a flowchart to show an example of flow of process of a cyclic portion coordinates arithmetic routine.

Next explained is the cyclic portion coordinates arithmetic routine 103. The cyclic portion coordinates arithmetic routine 103 is a sub-routine invoked by the process of S30 in the main routine 100. As shown in the flowchart of FIG. 9, the cyclic portion coordinates arithmetic routine 103 first determines whether a cyclic portion classified in the classification routine 102 is of the monocyclic structure or not (S301). This process is one for calculating $$N = Nb - Na + 1$$

where Na is the number of atoms and Nb is the number of bonds,
and for making a determination that a ring of interest is a single ring with N being 1 while it is a fused ring with N being a number (integer) over 1. Incidentally, N is 0 for chain portions.

Now, the terms used in the present invention will be explained. First, "ring" or "single ring" should be understood as a loop formed by a starting bond and all traced bonds when one performs the operation to start from one atom in an arbitrary starting bond and to trace the bonds one from another and when one can reach the other atom in the starting bond without again tracing the starting bond and any bond or atom already traced. For example, supposing atom 1 in the bonding atom pair (1, 2) in FIG. 2B is one atom in a starting bond, bonds that can be traced from atom 1 are two, bond (6, 1) and bond (1, 7). Here, if bond (6, 1) is selected, we can reach the other atom 2 of the starting bond with tracing the bonds successively in the order of bonds (5, 6), (4, 5), (3, 4), and (2, 3) but without tracing the starting bond and any bond or atom already traced. Therefore, the compound of FIG. 2A and FIG. 2B can be said to have the cyclic structure formed by the starting bond (1, 2) and the thus traced bonds.

Further, "cyclic portion" should be understood as a set of bonds forming all "rings" formed as including an arbitrary bond. The "cyclic portion" is classified by single ring (N=1) and fused ring (N>1), as discussed above.

When a ring of interest is determined to be a monocyclic structure in the process of S301, the ring is assumed to be a regular n-polygon (in the case of n-membered ring) and two-dimensional coordinates of each vertex are obtained (S302). If the ring of interest is determined to be of a fused ring structure in the process of S301, the smallest set of smallest rings (SSSR: Smallest Set of Smallest Rings) is obtained which is necessary and minimum for expressing the all atoms and bonds constituting the fused ring structure (S303). This smallest set of smallest rings can be obtained using the exclusive OR method, which is the prior art. This exclusive OR method is described in detail in the literature "Journal of Chemical Information and Computer Sciences, Vol. 15, No. 3, 1975 p 140–p 147."

As understood also from this literature, the summary of the exclusive OR method is as follows.

(1) Letting Na be the number of atoms constituting a cyclic structure and Nb be the number of bonds constituting it, a set of N (=Nb−Na+1) or more mutually independent single rings (an independent single ring set) is formed. Here, "mutually independent" means that there is at least one bond included in only one of two rings.

(2) Subsequently, an arbitrary number, N or more, of arbitrary single rings are selected (without permitting duplication) out of the independent single ring set, bonds belonging to only a single ring are selected (exclusive OR) out of the bonds included in the partial set of single rings selected, and the bonds thus selected are connected, thereby obtaining another single ring not included in the partial set.

(3) If the single ring obtained in (2) is different from any one of the single rings forming the independent single ring set, a new independent single ring set including it is formed.

(4) Returning to (2), the process is repeated for all combinations of N or more single rings before no new single ring is obtained.

(5) Since (1) to (4) obtained all mutually independent single rings, the SSSR can be obtained by selecting N single rings in order from the smallest number of ring-constituting members out of the independent single ring set thus obtained.

Figure 10A:
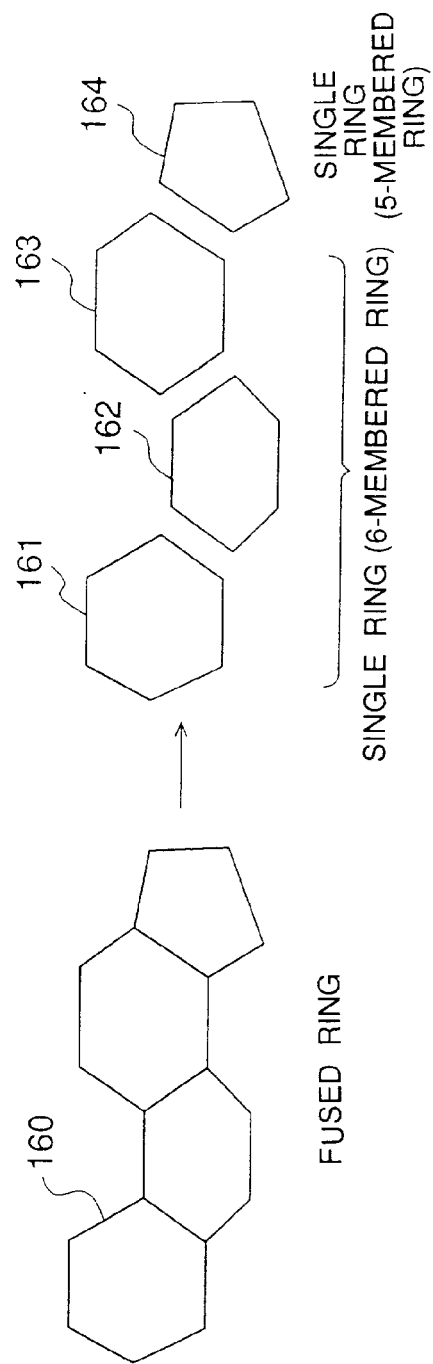
FIG. 10A and FIG. 10B are diagrammatic drawings each of which shows an example of a state in which a fused ring is divided into a plurality of single rings by the exclusive OR method.
Figure 10B:
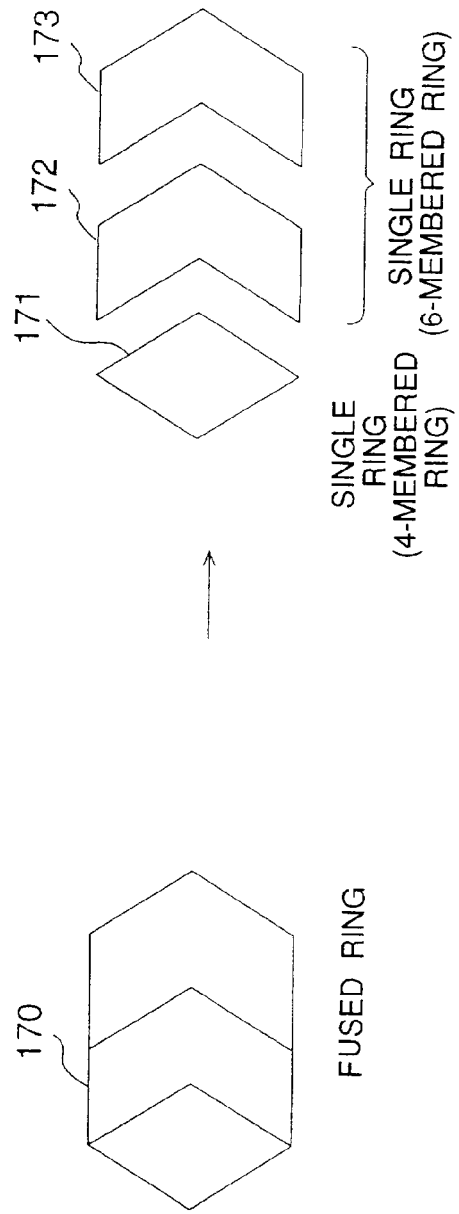

Illustrating the SSSR obtained by the exclusive OR method, with the fused ring 160 shown in FIG. 10A, there are ten single rings included in the independent single ring set, but the SSSR is comprised of a set of four single rings 161 to 164. Similarly, in the case of the fused ring 170 shown in FIG. 10B, there are six single rings included in the independent single ring set, but the SSSR is composed of a set of three single rings 171 to 173. Namely, the exclusive OR method to obtain the SSSR is a computation method to extract all single rings that can be traced in the fused ring and to make a set by extracting N single rings in order from the smallest number of ring-constituting members out thereof.

Next, a single ring (a predetermined single ring) with the highest priority order (each single ring is preliminarily given a priority order, depending upon the number of members of ring, for example as six-membered ring>five-membered ring>three-membered ring>four-membered ring>seven-membered ring, . . . ) is selected out of the SSSR obtained (S304). Then, if the single ring selected is an m-membered ring (m is a natural number of three or more), a regular m-polygon is assumed and two-dimensional coordinates of each vertex are obtained (S305). Further, a single ring with the highest priority order is selected out of the rings fused with the single ring (specific single ring) *the two-dimensional coordinates of which were already obtained (S306).

Selection of single ring in the processes of S304 and S306 is preferably carried out according to the priority order basically determined depending upon the number of members of ring. Further, it is also preferable to divide a same basic order into finer orders for single rings of same number of members according to constituent elements and/or bond types, for example, by assigning a lower priority to rings containing a nitrogen atom or assigning a higher priority to rings containing a double bond. According to the knowledge of the inventor of the present application, molecular structural diagrams especially excellent in an aesthetic sense can be obtained when the highest basic order is selected for six-membered rings.

Figure 11:
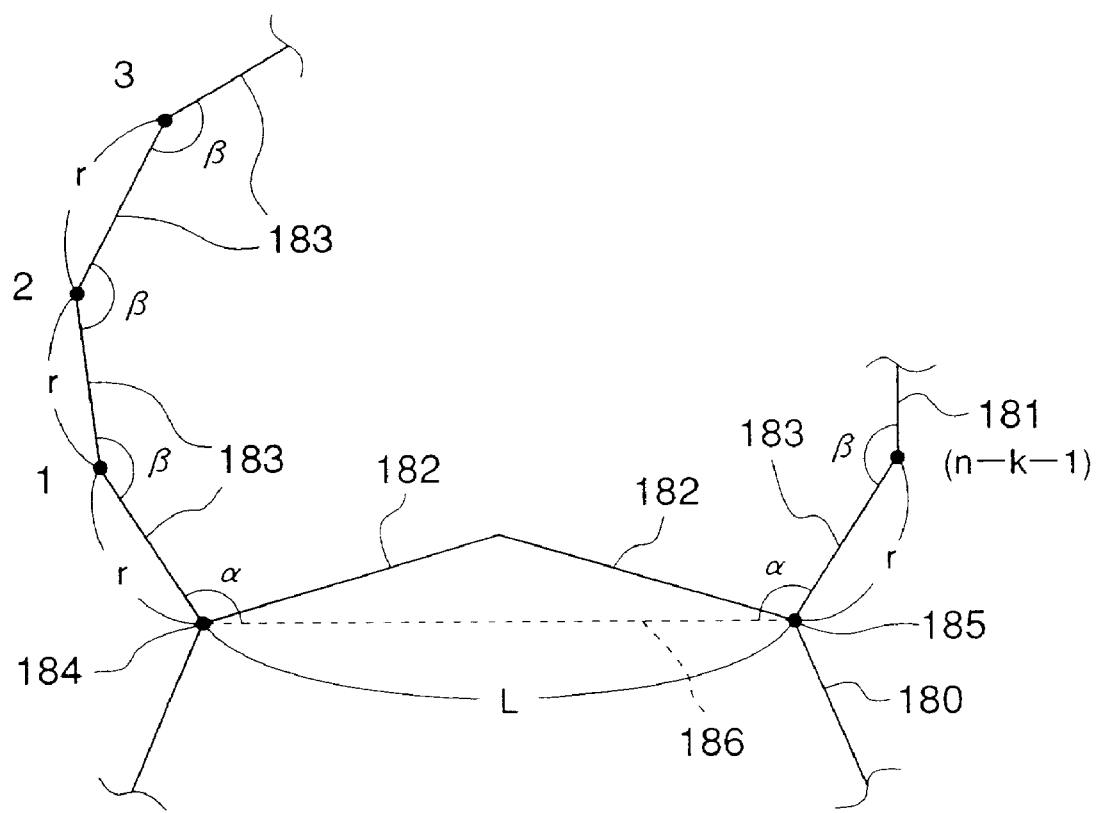
FIG. 11 is a diagrammatic drawing to show an example of two-dimensional coordinates of respective atoms constituting a single ring to be fused with a specific single ring.

Next, as shown in FIG. 11, a single ring 181 to be fused with the single ring (specific single ring) 180 having two-dimensional coordinates thereof already obtained is selected, and in the case of this single ring 181 being an n-membered ring (n is a natural number of not less than 3), two-dimensional coordinates of each atom are obtained as assuming the ring is of an n-polygon sharing k sides (k=2 in FIG. 11) with the single ring 180 (S307). Specifically, out of the sides of the n-polygon forming the single ring 181, k sides shared with the single ring 180 are referred to as shared sides 182 and the other sides as non-shared sides 183. Then L (L is a known value) is assigned to the length of an auxiliary straight line 186 connecting the both ends 184, 185 of a line comprised of the all shared sides 182, and r (r is a predetermined value) is assigned to the length of each non-shared side 183. At this stage the two-dimensional coordinates of each atom constituting the single ring 180 were already obtained, and the length L of the auxiliary straight line 186 is the known value obtained from the two-dimensional coordinates of the atoms located at the both ends 184, 185. In contrast with it, the length r is a predetermined value that can be independently determined for the single ring 181, separately from the length of each side of the single ring 180.

Further, out of internal angles of the (n−k+1) polygon comprised of the auxiliary straight line 186 and the all non-shared sides 183, internal angles between the auxiliary straight line 186 and the non-shared sides 183 are set to α (radian) and internal angles between the non-shared sides 183 to β (radian). Then β to satisfy $$r\cdot\cos\{((n-k-1)\Pi-(n-k)\beta)/2\}=L\cdot\cos(\beta/2)$$

is calculated and also $$\alpha=(n-k-1)(\Pi-\beta)/2$$

(where Π is the circle ratio (ratio of the circumference of a circle to its diameter)) is calculated, thereby obtaining two-dimensional coordinates of each atom. If there is any single ring not selected yet after the process of S307, the processing is returned to S306 and then the processes of S306 and S307 are repeated (S308). Namely, in the process of S307, for all atoms with unknown two-dimensional coordinates out of the atoms constituting the single ring fused with the specific ring with known two-dimensional coordinates, the unknown atoms are positioned so as to have the equal length r of bond and the equal angle β of bond and then two-dimensional coordinates thereof are obtained. Then the locations of the unknown atoms become symmetric with respect to the perpendicular bisector to the auxiliary straight line 186.

If in the process of S308 it is determined that the two-dimensional coordinates of the all single rings forming the SSSR were already obtained or if the process of S302 is completed, the cyclic portion coordinates arithmetic routine 103 is ended to return the processing to S40 in the main routine 100.

Here, S303 corresponds to the first step (a means involved in the first step is the first process section) and S305 to the second step (a means involved in the second step is the second process section). Further, S306 and S307 correspond to the third step (a means involved in the third step is the third process section) and S308 to the fourth step (a means involved in the fourth step is the fourth process section).

Figure 12:
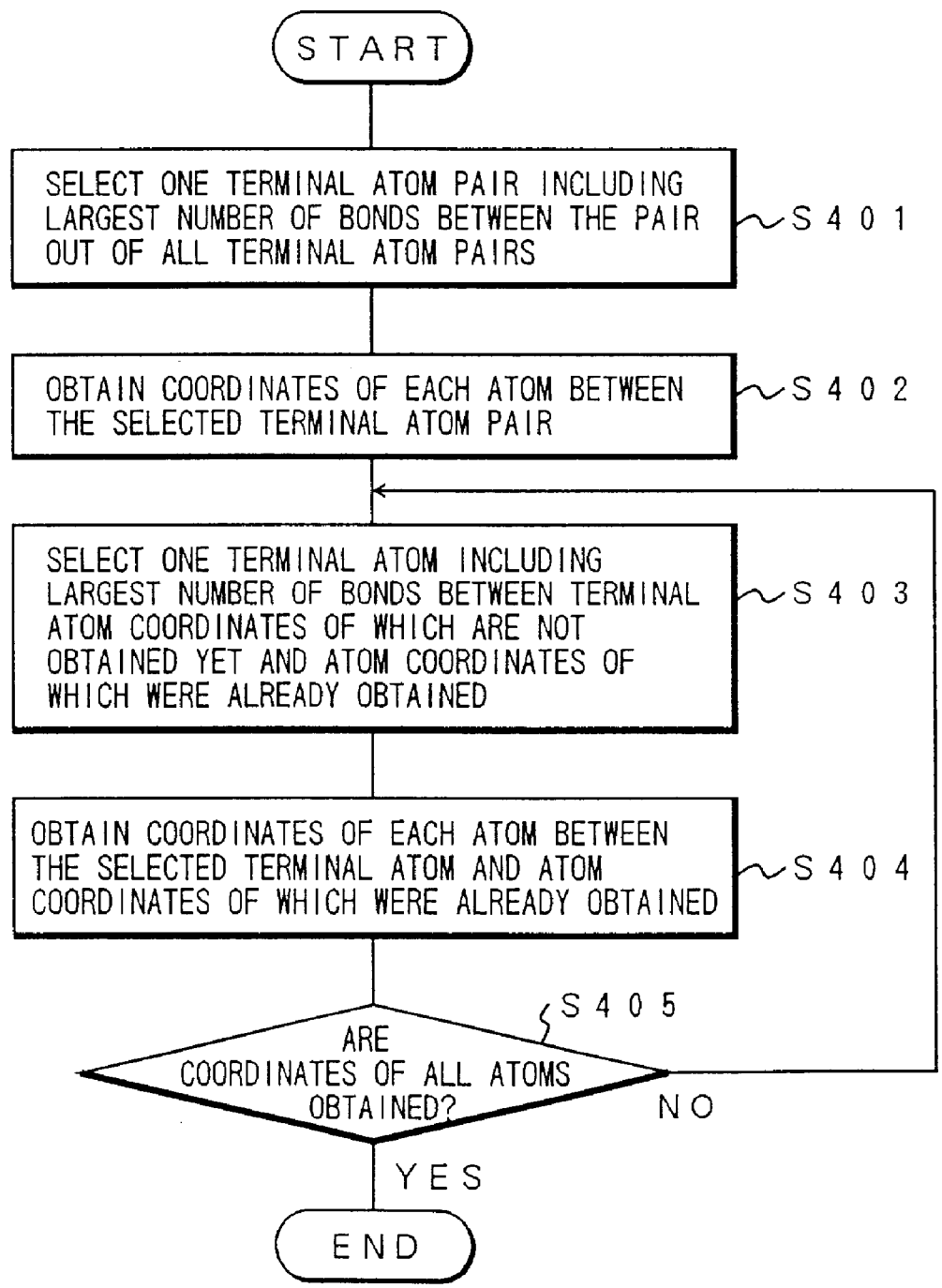
FIG. 12 is a flowchart to show an example of flow of process of a chain portion coordinates arithmetic routine.

Next explained is the chain portion coordinates arithmetic routine 104. The chain portion coordinates arithmetic routine 104 is a sub-routine invoked by the process of S40 in the main routine 100. As shown in the flowchart of FIG. 12, the chain portion coordinates arithmetic routine 104 is configured first to extract all terminal atoms being terminals of the chain structure out of the atoms classified into the chain portion and to select a terminal atom pair including the largest number of bonds between them out of the extracted pairs of terminal atoms (S401).

Figure 13:
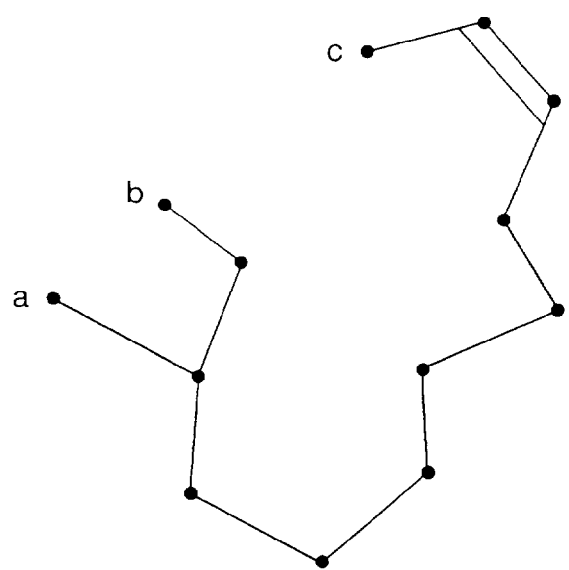
FIG. 13 is a diagrammatic drawing to show an example of a terminal atom pair becoming terminals of a chain structure.

As shown in FIG. 13, the terminal atoms are atoms a to c, being the terminals of the chain structure, out of a plurality of atoms connected in a chain configuration. Also, the terminal atom pairs include combinations of these terminal atoms a to c, (a, b), (a, c), and (b, c). In this example, the number of bonds included between the terminal atom pair (a, b), (a, c), or (b, c) is 3, 10, or 11, respectively. Therefore, the terminal atom pair (b, c) is selected in the process of S401.

Figure 14:
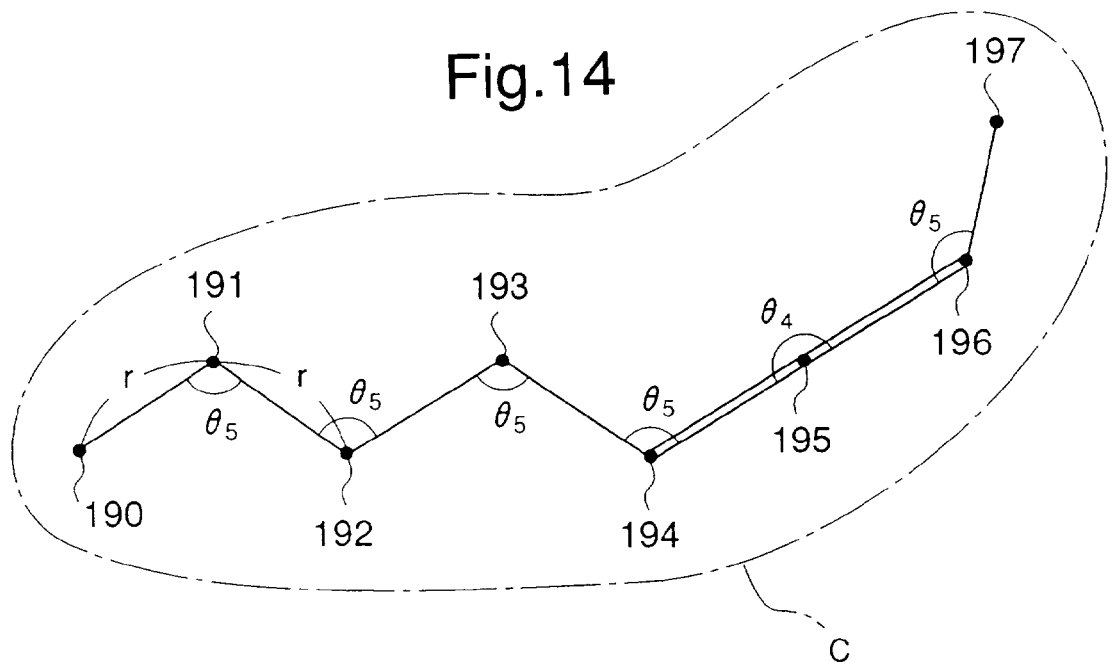
FIG. 14 is a diagrammatic drawing to show an example of two-dimensional coordinates of respective atoms constituting a chain portion.

Then the two-dimensional coordinates are obtained for each atom between the terminal atom pair selected (S402). As shown in FIG. 14, the two-dimensional coordinates of each atom 190 to 197 between the terminal atom pair (the pair of the terminal atom 190 and terminal atom 197) are determined in order from the one terminal atom 190 toward the other terminal atom 197, using angles depending upon a combination of bond types of adjacent bonds (for example, $\theta_4=180°$ in the case of a triple bond being adjacent or in the case of a double bond adjacent to another double bond and $\theta_5=120°$ in the other cases) and determining the length between atoms as a constant value r. This determination of two-dimensional coordinates is made with such consideration as to comply with designation of the cis-configuration or trans-configuration (the trans-configuration is adopted for the cases without designation). Reception of the designation of cis-configuration or trans-configuration is preferably done in the process of the atom pair data extraction routine 101.

Figure 15:
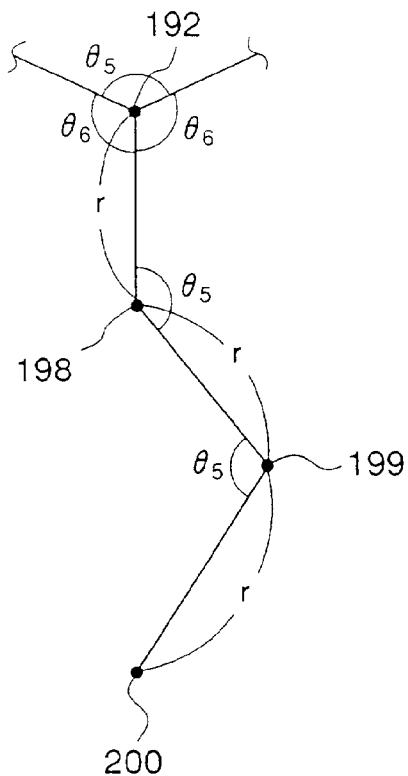
FIG. 15 is a diagrammatic drawing to show another example of two-dimensional coordinates of respective atoms constituting a chain portion.

Next selected is a terminal atom where the largest number of bonds are present between the selected terminal atom without two-dimensional coordinates thereof obtained and an atom with two-dimensional coordinates thereof already obtained (hereinafter referred to as a branch point atom) (S403), and two-dimensional coordinates are obtained for each atom between this branch point atom and the terminal atom (S404). As shown in FIG. 15, the two-dimensional coordinates of each atom 198 to 200 between the branch point atom 192 and the terminal atom 200 are obtained in order from the atom 198 toward the terminal atom 200, using a branch angle depending upon the number of atoms coupled with the branch point atom 192 (for example, $\theta_6=120°$ for coupling of three atoms and $\theta_7=90°$ ($\theta_7$ is not shown) for coupling of four atoms) and further determining the length between atoms as a constant value r.

If at S405 there is any terminal atom not selected yet, the processing is returned to S403, thereby repeating the processes of S403 and S404. If the process of S405 results in determining that the positions of the all atoms are obtained, the chain portion coordinates arithmetic routine 104 is ended to return the processing to S50 in the main routine 100. Here, S401 corresponds to the fifth step (a means involved in the fifth step is the fifth process section) and S402 to the sixth step (a means involved in the sixth step is the sixth process section). Further, S403 corresponds to the seventh step (a means involved in the seventh step is the seventh process section), and S404 to the eighth step (a means involved in the eighth step is the eighth process section).

Figure 16:
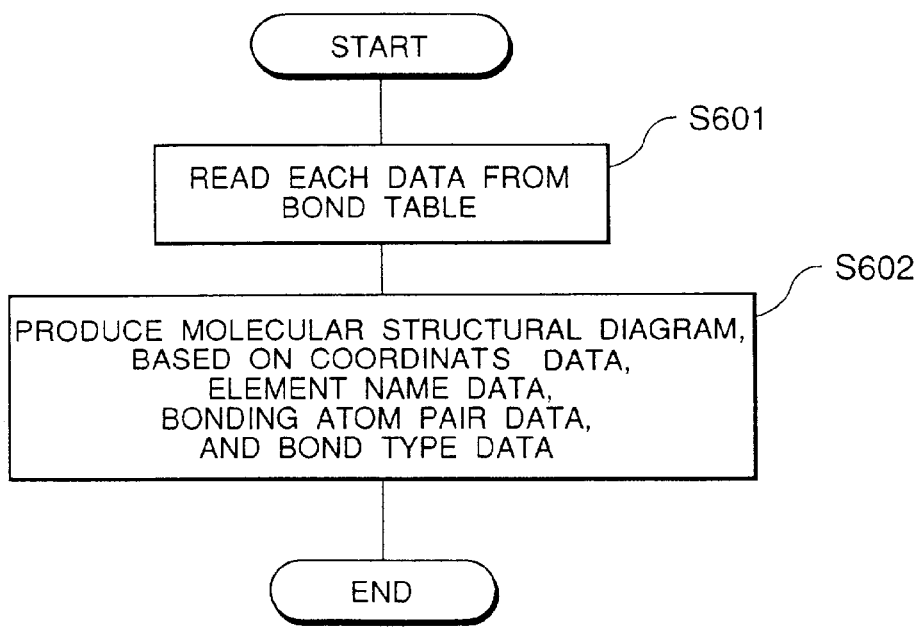
FIG. 16 is a flowchart to show an example of flow of process of a structural diagram production process routine.

Next explained is the structural diagram production process routine 105. The structural diagram production process routine 105 is a sub-routine invoked by the process of S60 in the main routine 100. As shown in the flowchart of FIG. 16, the structural diagram production process routine 105 is configured, first, to read each data of bond table 32 stored in the main storage device 20 (S601). Then, based on the two-dimensional coordinates data, element name data, bonding atom pair data, and bond type data thus read out, image data of molecular structural diagram is prepared (S602).

This preparation of image data is carried out in the following procedures. First, the two-dimensional coordinates data of each atom is plotted on the image data. Then the atoms plotted based on the bonding atom pair data are connected by straight line. Then a symbol indicating an element name is written in beside the two-dimensional coordinates position of each atom, based on the element name data. Further, based on the bond type data, a straight line or straight lines are drawn in the number corresponding to the type of bond between atoms for expressing the bond (for example, one straight line for single bond, two straight lines for double bond, and three straight lines for triple bond).

The image data 10a of molecular structural diagram prepared in this manner is stored in the image memory 10 (FIG. 3). Then, after completion of the process of S602, the structural diagram production process routine 105 is ended to return the processing to S70 in the main routine 100.

The structural diagram production process routine 105 may be configured to prepare only a geometric form of molecular structural diagram without indication of element name and indication of bond type. In this case, the indication of element name and indication of bond type may be performed in the molecular structural diagram indication routine 109.

Next explained is the cyclic or chain determination routine 106. The cyclic or chain determination routine 106 is a sub-routine invoked by the process of S201 in the classification routine 102. This cyclic or chain determination routine 106 is carried out for each data selected from the bonding atom pair data in the bond table 32 and is configured to determine whether the bonding atom pair data selected belongs to either the cyclic portion or the chain portion.

Figure 17:
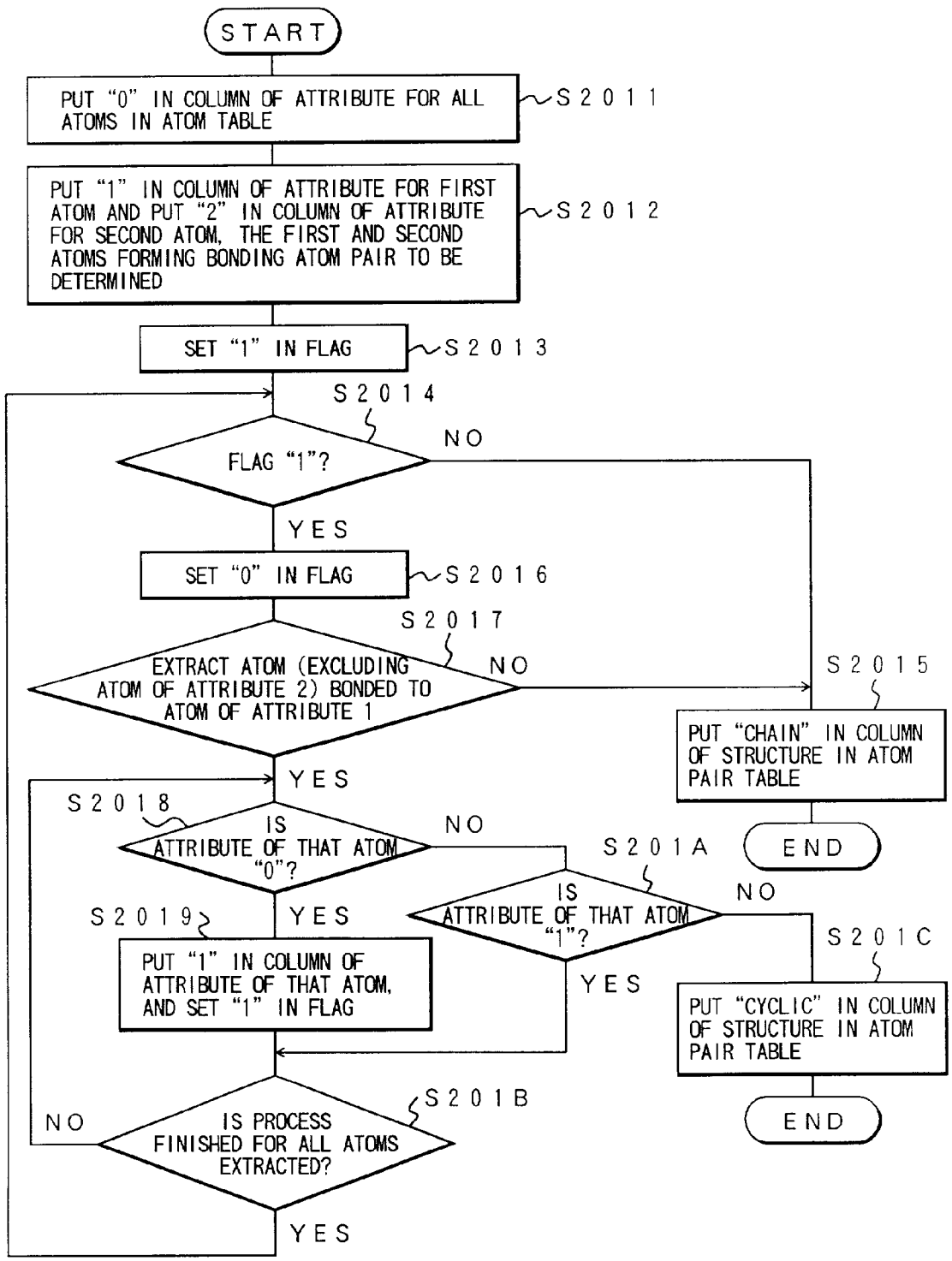
FIG. 17 is a flowchart to show an example of flow of process of a cyclic or chain determination routine.

Describing it along the flowchart of FIG. 17, the cyclic or chain determination routine 106 first writes "0" in the column of attribute for all atoms in the atom table 32a in the bond table 32 (S2011). Then "1" is written in the column of attribute for a first atom constituting a bonding atom pair selected and being to be determined and "2" in the column of attribute for a second atom thereof (S2012). Next, "1" is set in a flag of a predetermined region secured in the main storage device 20 (S2013). Further, determination is made about whether "1" is set in the flag (S2014). If the process of S2014 results in determining that "1" is not set in the flag, "chain" is written in the column of structure of the atom pair table 32b (S2015).

If the process of S2014 results in determining that "1" is set in the flag, the flag is turned to "0" (S2016). Then all atoms bonded to the atom of attribute "1" (excluding the atom of attribute "2" constituting the bonding atom pair to be determined) are extracted (S2017). If the process of S2017 results in extracting no atom bonded to the atom of attribute "1" (NO), the process of S2015 is carried out. If the process of S2017 results in extracting an atom bonded to the atom of attribute "1" (YES), the following arithmetic of (1) to (4) is repeated for each atom extracted.

(1) Determination is made about whether the attribute of the atom is "0" (S2018).

(2) If in the process of S2018 the attribute of the atom is "0," "1" is written in the column of attribute of the atom and "1" is set in the flag (S2019).

(3) If in the process of S2018 the attribute of the atom is not "0," determination is made about whether the attribute of the atom is "1" (S201A).

(4) After completion of the process of S2019 or if the attribute is "1" in the process of S201A, the processing is returned to S2018 to repeat the above processes for the remaining atoms extracted. When the arithmetic of (1) to (3) is completed for the all atoms extracted, the processing is returned to S2014 (S201B).

In the process of S201A in the middle of the loop operation of (1) to (3) for the all atoms extracted, if the attribute of the atom is not "1" (thus, the attribute of the atom is "2," naturally), "cyclic" is written in the column of structure of the atom pair table 32b (S201C). Further, after completion of the process of S2015 or S201C, the cyclic or chain determination routine 106 is repetitively carried out as selecting one of the remaining bonding atom pairs to be determined. Then, after completion of cyclic or chain determination for all bonding atom pairs, the cyclic or chain determination routine 106 is ended to return the processing to S202 in the classification routine 102. Incidentally, when the cyclic or chain determination routine 106 is carried out for the bonding atom pair data of FIG. 2B, bonds are classified into those belonging to the cyclic portion and those belonging to the chain portion as shown in the column of structure in the same drawing.

Figure 18:
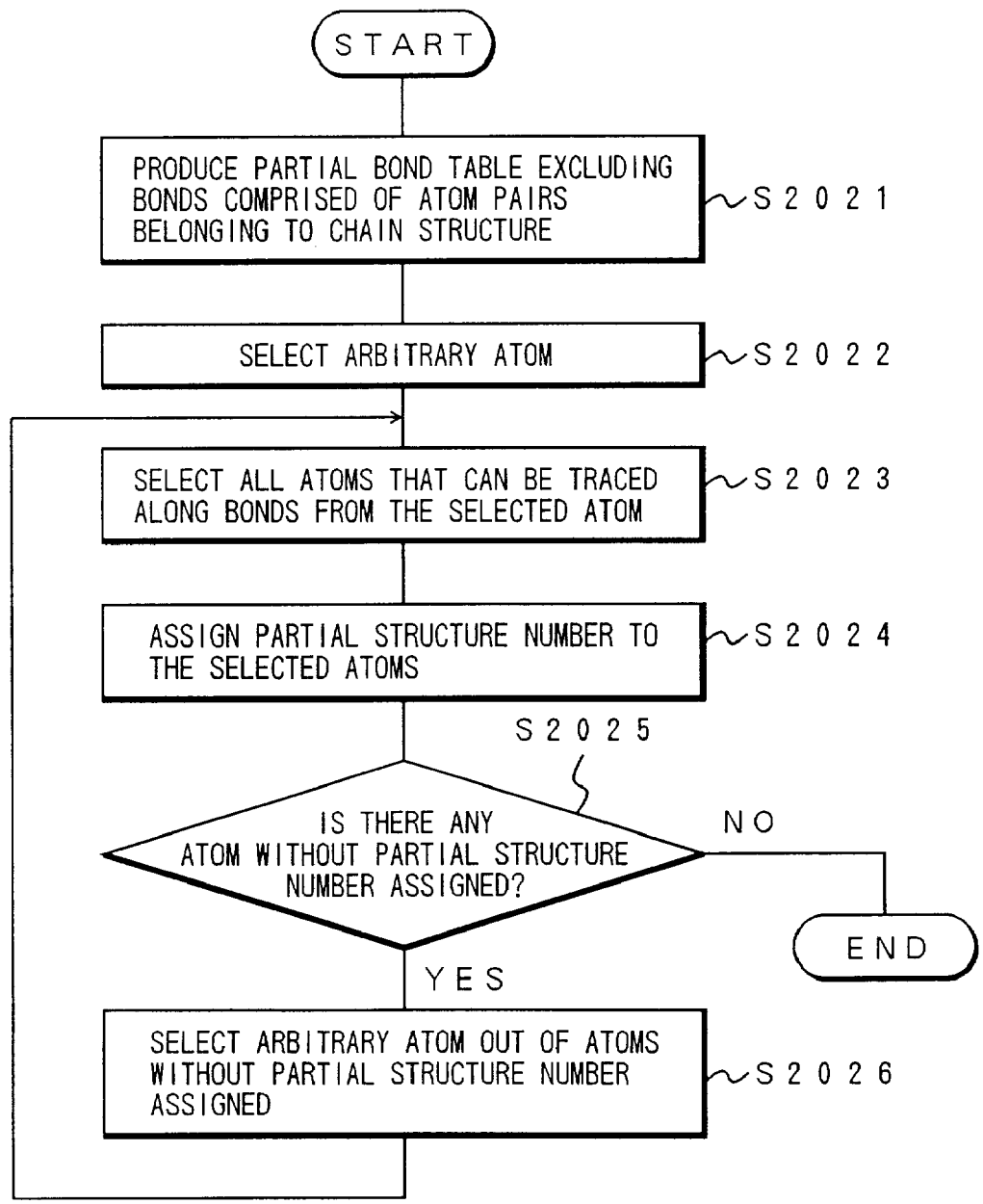
FIG. 18 is a flowchart to show an example of flow of process of a cyclic portion detection routine.

Next explained is the cyclic portion detection routine 107. The cyclic portion detection routine 107 is a sub-routine invoked by the process of S202 in the classification routine 102. As shown in the flowchart of FIG. 18, the cyclic portion detection routine 107 first prepares a partial bond table excluding bonds comprised of the atom pairs belonging to the chain structure (S2021). Next, an arbitrary atom is selected from this partial bond table (S2022). Then selected are all atoms that can be traced from the selected atom along the bonds given by the bonding atom pair data (S2023).

A partial structure number different from partial structure numbers already used (if any) is assigned to each atom thus selected (S2024). Further, it is determined whether there is any atom without a partial structure number (S2025). If S2025 results in determining that there are some atoms without a partial structure number, an arbitrary atom is selected from the atoms without a partial structure number (S2026), and the processing is returned to S2023. If the process of S2025 results in determining that the all atoms were already given their partial structure numbers, the cyclic portion detection routine 107 is ended to return the processing to S203 in the classification routine 102.

Consequently, if the cyclic portion detection routine 107 is executed for classifying a compound by the cyclic portion and chain portion, one cyclic portion of the compound can be recognized as a set of atoms having a same partial structure number by computer. Types (the number) of cyclic portions contained in the compound correspond to types of partial structure numbers.

Figure 19:
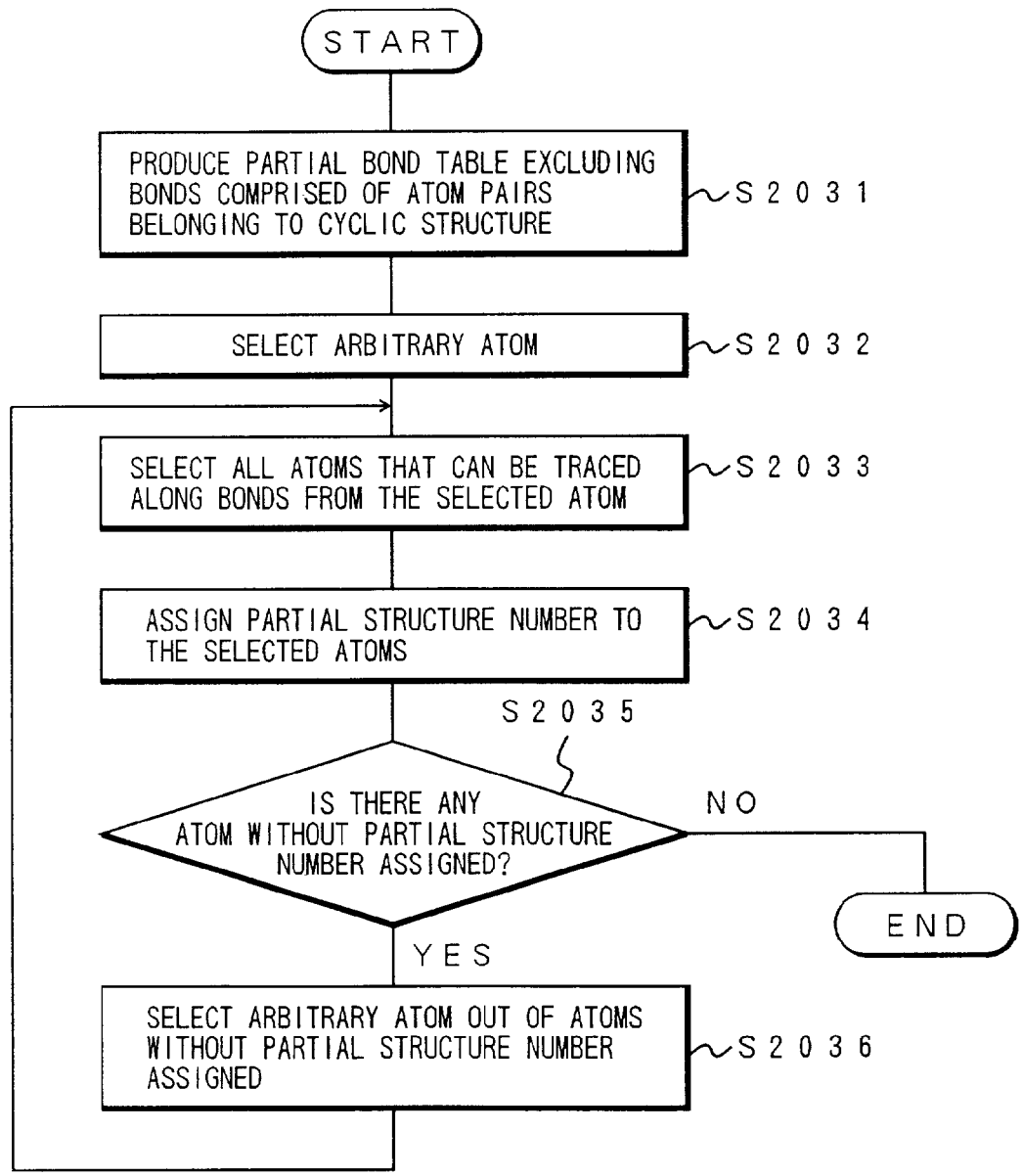
FIG. 19 is a flowchart to show an example of flow of process of a chain portion detection routine.

Next explained is the chain portion detection routine 108. The chain portion detection routine 108 is a sub-routine invoked by the process of S203 in the classification routine 102. As shown in the flowchart of FIG. 19, the cyclic portion detection routine 108 first prepares a partial bond table excluding the bonds comprised of the atom pairs belonging to the cyclic structure (S2031). Next, an arbitrary atom is selected from this partial bond table (S2032). Then selected are all atoms that can be traced from the selected atom along bonds given by the bonding atom pair data (S2033).

A partial structure number different from those already used (if any) is assigned to each atom thus selected (S2034). Further, it is determined whether there is any atom without a partial structure number (S2035). If S2035 results in determining that there are some atoms without a partial structure number, an arbitrary atom is selected from those without a partial structure number (S2036) and the processing is returned to S2033. If the process of S2035 results in determining that the all atoms were already given their partial structure numbers, the chain portion detection routine 108 is ended to return the processing to the end of S203 in the classification routine 102.

Consequently, if the chain portion detection routine 108 is carried out for classifying a compound by the cyclic portion and chain portion, a chain portion of the compound can be recognized as a set of atoms having a same partial structure number by computer. Types (the number) of chain portions contained in the compound correspond to types of partial structure numbers.

Figure 20:
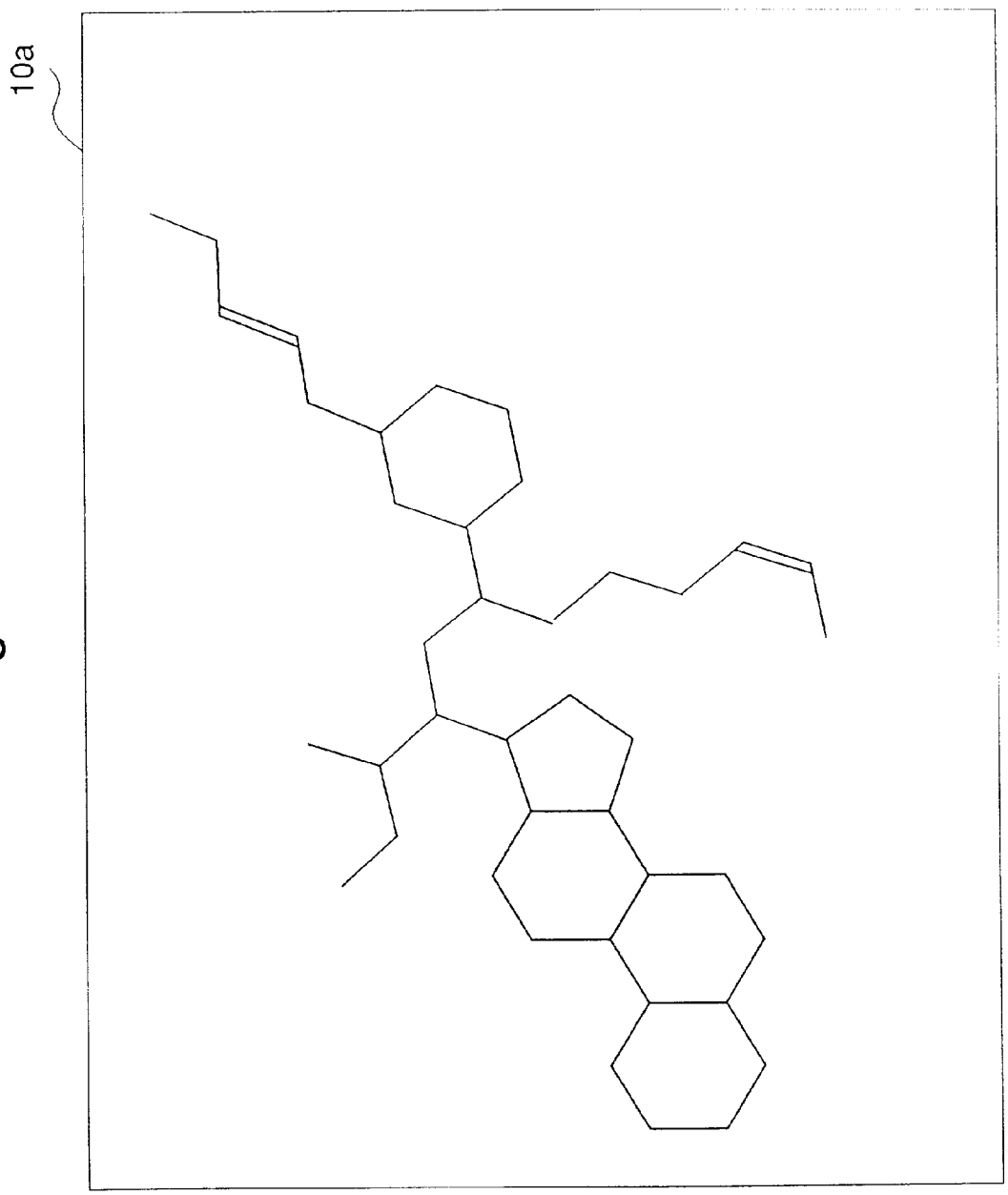
FIG. 20 is a diagrammatic drawing to show an example of image data indicated on a display.

Next, FIG. 20 shows an example of the image data 10a indicated on the display 40 by the process of S70 in the main routine 100. This image data 10a was produced within a very short time of one or less second (excluding the time for hand-writing input through the mouse 50) though the structure was very complex. As described above, the producing apparatus and producing method of molecular structural diagram of the present invention according to the present embodiment are very suitable for quickly and beautifully producing the molecular structural diagrams of complex structure.

The foregoing described the first preferred embodiment of the producing apparatus and producing method of molecular structural diagram according to the present invention, but the present invention is not limited to the above embodiment.

For example, if an object is one of compounds having the complex molecular structure like the structure of fused rings, especially, like the structure of fused rings sharing three or more atoms, preferred is the second embodiment in which the step 307 in the foregoing cyclic portion coordinates arithmetic routine 103 is modified as follows.

Figure 21:
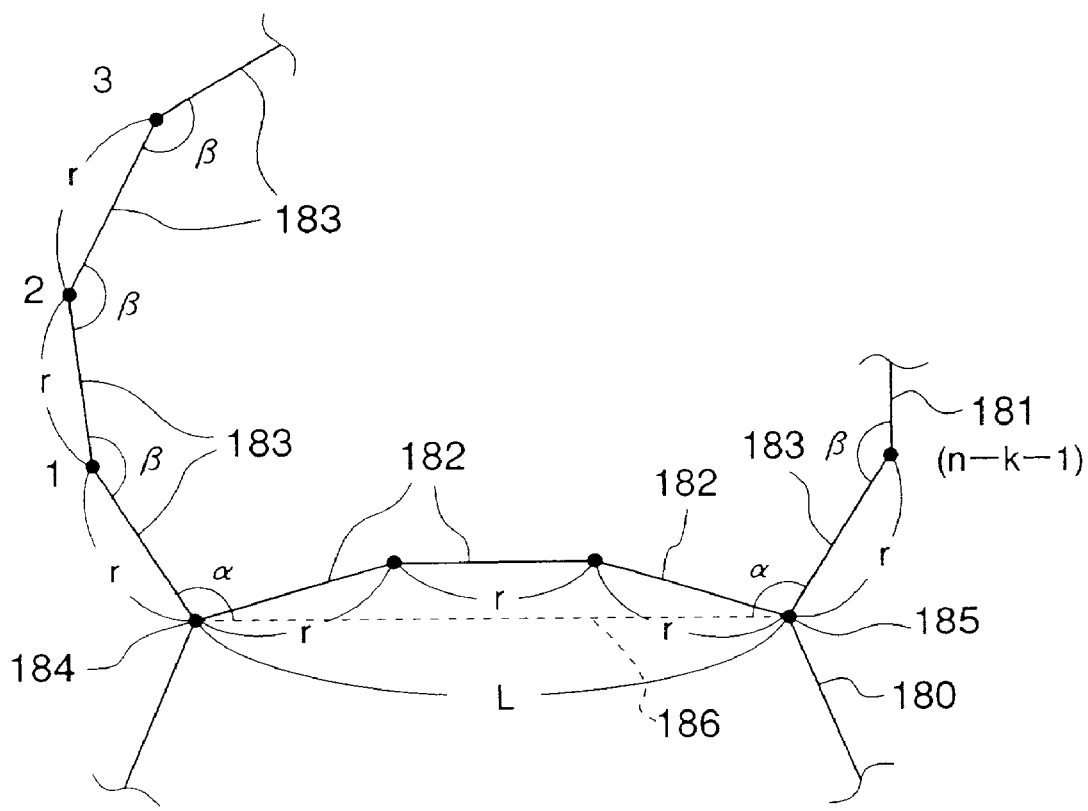
FIG. 21 is a diagrammatic drawing to show another example of two-dimensional coordinates of respective atoms constituting a single ring to be fused with a specific single ring.

Namely, in step 307 in the cyclic portion coordinates arithmetic routine 103 shown in FIG. 9, the single ring 181 fused with the single ring (the specific single ring) 180 for which the two-dimensional coordinates were already obtained is selected as shown in FIG. 21, and in the case of this single ring 181 being an n-membered ring (where n is a natural number not less than 3), the ring is assumed to be of an n-polygon sharing k sides (k=3 in FIG. 21) with the single ring 180 and two-dimensional coordinates of each atom are obtained (S307). Specifically, out of the sides of the n-polygon forming the single ring 181, the k sides shared with the single ring 180 are referred to as shared sides 182 and the other sides as non-shared sides 183. Then L (L is a known value) is assigned to the length of an auxiliary straight line 186 connecting the both ends 184, 185 of a line comprised of the all shared sides 182 and r to the length of each non-shared side 183 (r is a constant value).

At this stage two-dimensional coordinates of each atom forming the single ring 180 were already obtained, and the length L of the auxiliary straight line 186 is a known value obtained from the two-dimensional coordinates of the atoms located at the both ends 184, 185. In contrast with it, the length r is normally a constant value commonly determined for the single ring 180 and the single ring 181 except for the case of carrying out an exception process described below or the like. By using the constant value r for the all sides of the single rings 180, 181 in this manner, the arithmetic to obtain the two-dimensional coordinates of each atom can be performed more quickly.

Further, out of internal angles of the (n−k+1) polygon comprised of the auxiliary straight line 186 and the all non-shared sides 183, internal angles between the auxiliary straight line 186 and the non-shared sides 183 are set to α (radian) and internal angles between the non-shared sides 183 to β (radian). Then P to satisfy $$r \cdot \cos\{((n-k-1)\Pi-(n-k)\beta)/2\} = L \cdot \cos(\beta/2)$$

is calculated and also $$\alpha = (n-k-1)(\Pi-\beta)/2$$

(where n is the circle ratio (ratio of the circumference of a circle to its diameter)) is calculated, thereby obtaining two-dimensional coordinates of each atom. If there is any single ring not selected yet after the process of S307, the processing is returned to S306 and then the processes of S306 and S307 are repeated (S308).

Namely, the process of S307 is configured so that for all atoms with unknown two-dimensional coordinates out of the atoms constituting the single ring fused with the specific ring with known two-dimensional coordinates, the unknown atoms are positioned so as to have the same length r of bond and the same angle β of bond and the two-dimensional coordinates of each unknown atom are obtained. The above algorithm employed in S307 is exceedingly effective to cases of especially complex structure, for example, like a molecular structural diagram of a fused ring having a combination of mutually fused rings sharing three or more consecutive atoms in combinations of rings included in the SSSR featuring the fused ring, or like a molecular structural diagram containing such a fused ring. This is because the two-dimensional coordinates of atoms can be calculated quickly using the above coordinates arithmetic method and locations of atoms are symmetric with respect to the perpendicular bisector to the auxiliary straight line 186, whereby the molecular structural diagram produced is easy to grasp the structure visually and excellent in an aesthetic sense.

The shared sides 182 correspond to bonds A according to the present invention and the non-shared sides 183 to bonds B according to the present invention. Accordingly, the bonds B include those having one atom shared by two rings and the other atom not shared. Further, the fused ring 160 shown in FIG. 10A includes three combinations of mutually fused rings as sharing two consecutive atoms, and the fused ring 170 shown in FIG. 10B includes two combinations of mutually fused rings as sharing three consecutive atoms.

If the process of S308 results in determining that the two-dimensional coordinates were already obtained for the all rings constituting the SSSR or if the process of S302 is completed, the cyclic portion coordinates arithmetic routine 103 is ended to return the processing to S40 in the main routine 100.

In general, as the number of bonds attaching to each atom increases, an atom two-dimensional coordinates of which are calculated in the process of S307 comes more frequently to overlap with or drop in close proximity of atoms coordinates of which were already determined. As a countermeasure against such inconvenience, it becomes necessary to change the length of one bond, thereby shifting the position of atom. Accordingly, the cyclic portion coordinates arithmetic routine 103 incorporates an exception process to change the length of bond, and the length of bond becomes a value other than r when such an exception process is carried out.

However, considering the relation of proximity frequency with the number of bonds as described above, the cyclic portion coordinates arithmetic routine 103 is preferably configured to perform such a process as to set the length of all bonds to the constant value r when either number of bonds attaching to each atom of the fused ring as a processed object is three or less. This enhances the speed of the arithmetic to obtain the two-dimensional coordinates more and can decrease the number of steps in the cyclic portion coordinates arithmetic routine 103.

Figure 22A:
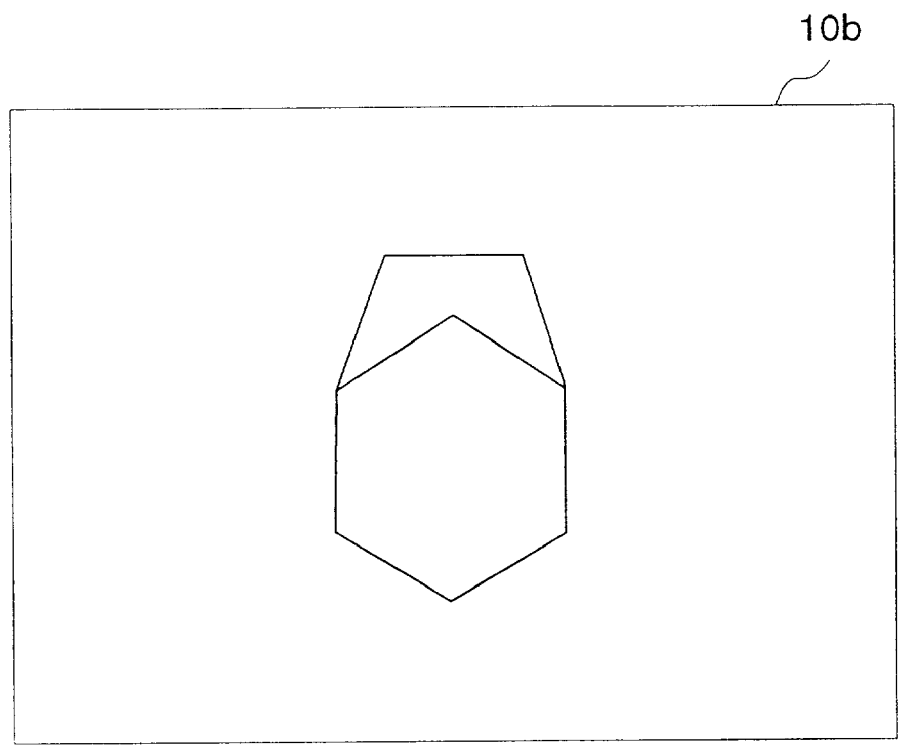
FIG. 22A and FIG. 22B are diagrammatic drawings each to show another example of image data indicated on the display.
Figure 22B:
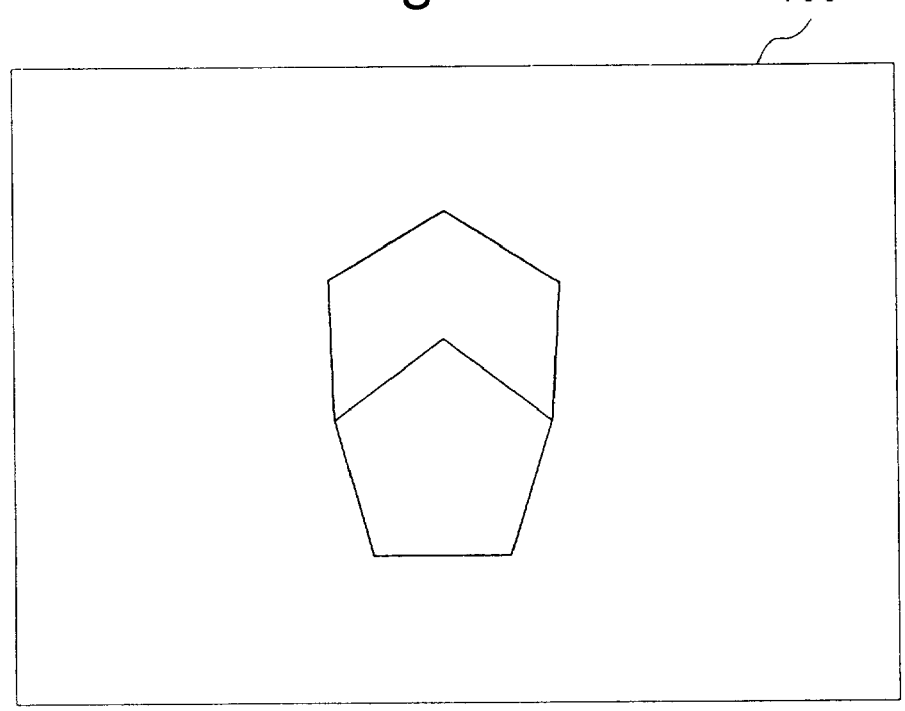

FIG. 22A and FIG. 22B show examples of image data 10b, 10c indicated on the display 40 by the process of S70 in the main routine 100, where the configuration is the same as in the first embodiment except for the above modification of step 307 in the cyclic portion coordinates arithmetic routine 103. The fused rings of FIG. 22A and FIG. 22B are indication examples where the bonding atom pair data accepted in the process of S10 is data of a compound comprised of only the fused ring, the smallest set of smallest rings necessary and minimum to express the all atoms and bonds constituting the fused ring is comprised of only one five-membered ring and one six-membered ring, and the data is about the fused ring in which the five-membered ring and the six-membered ring are fused as sharing three atoms. The image data 10b is a molecular structural diagram produced in such a way that the five-membered ring is fused to the six-membered ring preferentially drawn as a regular hexagon, and the image data 10c is a molecular structural diagram produced in such a way that the six-membered ring is fused to the five-membered ring preferentially drawn as a regular pentagon.

Since these data is obtained by the arithmetic to set the length of the all bonds to the constant value r in the processes of S307 and S309, all lengths of respective bonds in the molecular structural diagrams shown in the image data 10b, 10c become equal. Since the arithmetic is carried out using the constant value r commonly to the length of each bond in the molecular structural diagram as described above, the arithmetic process becomes quicker and the number of steps of arithmetic program is decreased.

As described above, the producing apparatus and producing method of molecular structural diagram according to the above second embodiment are very suitable for producing and indicating molecular structural diagrams of complex cyclic structure more quickly and beautifully.

Figure 23:
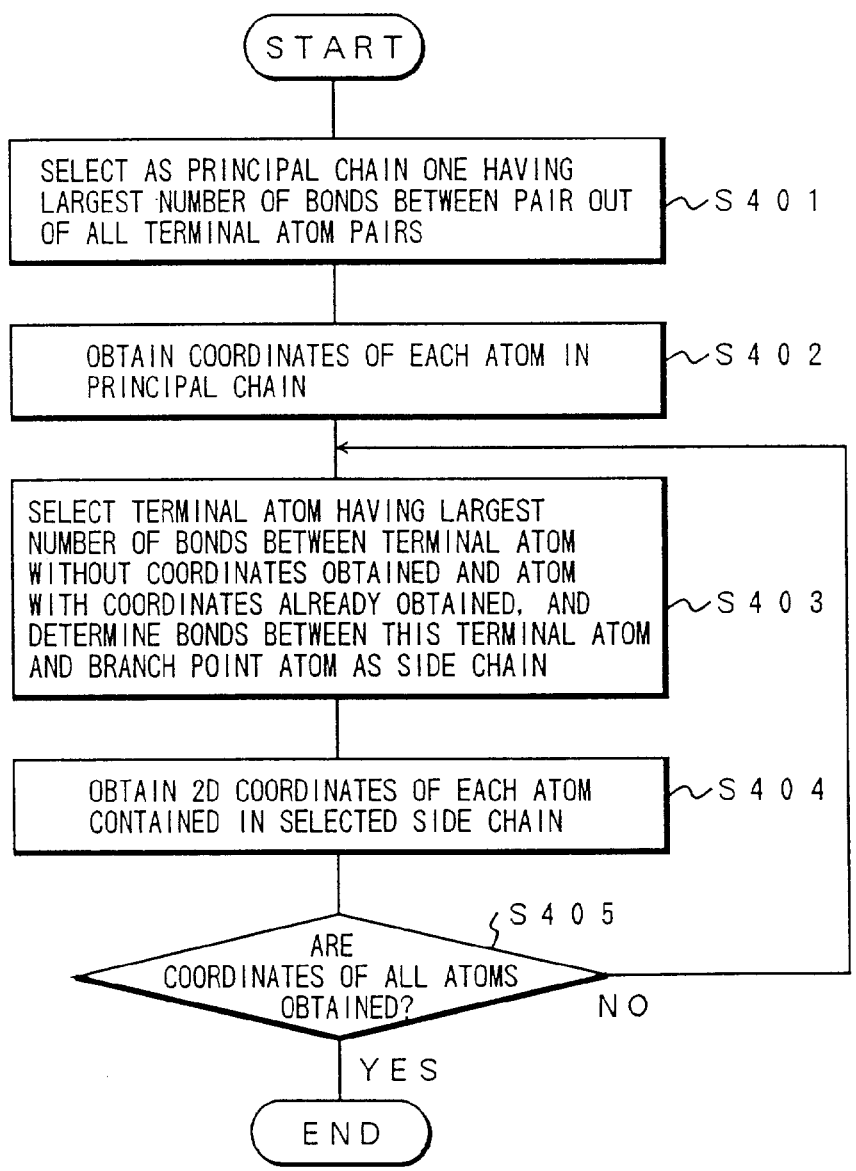
FIG. 23 is a flowchart to show another example of flow of process of a chain portion coordinates arithmetic routine.

For the cases where many atoms are connected in a chain configuration, especially, where an object is a compound in the chain structure having a complex configuration containing side chains, preferred is the third embodiment adopting the chain portion coordinates arithmetic routine 104 shown in FIG. 23 in place of the aforementioned chain portion coordinates arithmetic routine 104 shown in FIG. 12.

Next explained is the chain portion coordinates arithmetic routine 104 shown in FIG. 23. The chain portion coordinates arithmetic routine 104 is a sub-routine invoked by the process of S40 in the main routine 100. As shown in the flowchart of FIG. 23, the chain portion coordinates arithmetic routine 104 first extracts all terminal atoms being terminals of the chain structure out of the atoms classified into the chain portion and selects as a principal chain a terminal atom pair including the largest number of bonds between the pair out of pairs of terminal atoms extracted (S401).

As shown in FIG. 13, the terminal atoms are atoms a to c which are terminal portions of the chain structure among the plurality of atoms connected in the chain configuration. Also, the terminal atom pairs include combinations of these terminal atoms a to c, (a, b), (a, c), and (b, c). In this example, the number of bonds included between the terminal atom pair (a, b), (a, c), or (b, c) is 3, 10, or 11, respectively. Accordingly, the process of S401 selects the terminal atom pair (b, c) as a principal chain.

Here, if there are a plurality of terminal atom pairs including the largest number of bonds (hereinafter referred to as maximum bond pairs), predetermined logic is employed to assign priority orders to the respective maximum bond pairs and to select a bond chain of the maximum bond pair with the highest priority order as a principal chain.

The following shows an example of such logic.

(1) A lower priority order is assigned to a bond chain of a maximum bond pair with a large number of cis-configurations. If determination is impossible because of the same number of cis-configurations then the next step is carried out.

(2) A lower priority order is given to a bond chain of a maximum bond pair including more triple bonds. If determination is impossible because of the same number of triple bonds, then the next step is carried out.

(3) A higher priority order is given to a bond chain of a maximum bond pair containing more double bonds of trans-configuration. If determination is impossible because of the same number of double bonds then the next step is carried out.

(4) Preliminarily checking the number of atoms for each atom species with a priority order set (for example, in the order of carbon, oxygen, nitrogen, phosphorus, sulfur, fluorine, and chlorine or the like), a higher priority order is given to a bond chain of a maximum bond pair containing more atoms. Here, determination is first carried out as to the position of the atom with the highest priority order. If determination is impossible, the atoms with the subsequent orders are checked in order. If this determination cannot discriminate two chains then the next step is carried out.

(5) Checking the positions of the atoms in accordance with the priority orders, a higher priority order is given to an atom located more inside the bond chain of maximum bond pair. Here, determination is first carried out as to the position of the atom with the highest priority order, and the atoms with the subsequent orders are checked in order if determination cannot be made. If this determination cannot make discrimination, the next step is carried out.

(6) Checking positions of multiple bonds, a higher priority order is given to one with a bond located more inside the bond chain of maximum bond pair. Here, determination is first carried out as to the position of triple bond. If determination is not made then the position of double bond is checked. If this determination cannot discriminate two chains, then the two bond chains are equivalent, and either one of them is selected.

The above steps (1) to (6) are carried out before determination is made as to an arbitrary combination of maximum bond pairs and then the same determination is continued between the higher maximum bond pair and other maximum bond pairs, whereby a maximum bond pair with the highest priority can be selected.

Then two-dimensional coordinates of each atom contained in the principal chain selected in the process of S401 are obtained (S402). As shown in FIG. 14, the two-dimensional coordinates of each atom 190 to 197 contained in the principal chain C (the bonding atom pair between the terminal atom 190 and the terminal atom 197) are obtained in order from the one terminal atom 190 to the other terminal atom 197 using the angles depending upon a combination of bond types of adjacent bonds and setting the length between atoms to the constant value r. Specifically, a same angle $\theta_4$ ($\theta_4=180°$, for example) is preferably used as an angle between adjacent bonds where the combination of bond types of adjacent bonds is of a single bond with a triple bond or where the combination is of a double bond with another double bond. Also, a same angle $\theta_5$ ($\theta_5=120°$, for example) different from the angle $\theta_4$ is preferably used as an angle between adjacent bonds, where the combination of bond types of adjacent bonds is of a single bond with another single bond or where the combination is of a single bond with a double bond.

With existence of designation of cis-configuration or trans-configuration, the above determination of two-dimensional coordinates is carried out with consideration to satisfy it. Acceptance of designation of cis-configuration or trans-configuration is preferred to be done in the process of the atom pair data extraction routine 101. The trans-configuration is taken without designation of bond configuration. The reason why the trans-configuration is taken as a default value in this manner is that the trans-configuration is easier to grasp the structure visually and can decrease the frequencies of superposition and very close proximity of atoms. Especially, if the bond configuration is the trans-configuration and if the combination of bond types of adjacent bonds is of a single bond with another single bond or of a single bond with a double bond, a line connecting middle points of respective bonds becomes a straight line, which makes visual grasp of structure very easy.

Next, if there are a plurality of terminal atoms two-dimensional coordinates of which are not obtained yet, selected is a terminal atom having the largest number of bonds between the terminal atom without two-dimensional coordinates obtained and the atom with two-dimensional coordinates already obtained (hereinafter referred to as a branch point atom), and the bond chain between this terminal atom and the branch point atom is defined as a side chain (S403). Then two-dimensional coordinates are obtained for each atom contained in the side chain thus selected (S404).

Figure 24:
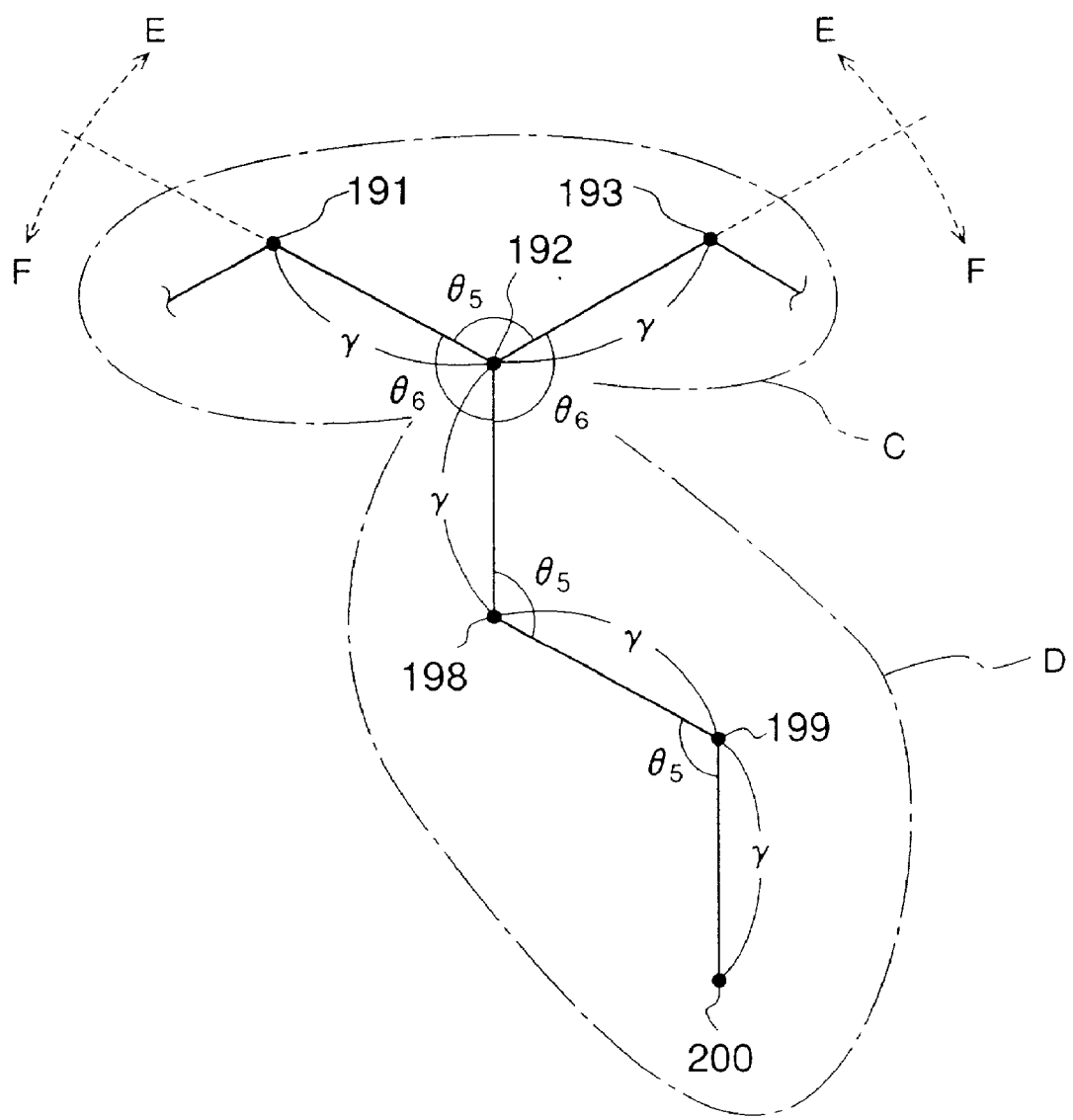
FIG. 24 is a diagrammatic drawing to show another example of two-dimensional coordinates of respective atoms constituting a chain portion.

As shown in FIG. 24, two-dimensional coordinates of each atom 198 to 200 contained in the side chain D (a bond chain between the branch point atom 192 and the terminal atom 200) branched from the principal chain C are obtained in order from the atom 198 toward the terminal atom 200, using the angles depending upon the combination of bond types of adjacent bonds and setting the length between atoms to the constant value r. Specifically, out of two regions E, F separated by two bonds (the bond between the atom 191 and the branch point atom 192 and the bond between the atom 193 and the branch point atom 192) adjacent to the branch point atom 192 (or having an end thereat), the side chain D is located in the region F on the external angle side.

Also for the side chains, the same angle $\theta_4$ ($\theta_4=180°$, for example) can be used preferably as an angle between adjacent bonds, where the combination of bond types of adjacent bonds is of a single bond with a triple bond or of a double bond with another double bond. Further, the same angle $\theta_5$ ($\theta_5=120°$, for example) different from the angle $\theta_4$ can also be used preferably as an angle between adjacent bonds, where the combination of bond types of adjacent bonds is of a single bond with another single bond or of a single bond with a double bond.

Angles between the principal chain C and the side chain D attaching to the branch point atom 192 are obtained as follows, for example. If the internal angle of the branch point atom 192 is given as $\theta_5=120°$ and if the number of bonds with the branch point atom 192 being an atom at one end is three, the external angle of the branch point atom 192 is bisected, so that each angle is given as $\theta_6=120°$. If the internal angle of the branch point atom 192 is given as $\theta_5=90°$ and if the number of bonds with the branch point atom 192 being an atom at one end is four, the external angle of the branch point atom 192 is trisected, so that each angle is given as $\theta_7=90°$.

From the above description, general solutions of each angle $\theta_n$ (radian) obtained by equally dividing the external angle of branch point atom 192 are expressed by $$\theta_n = (2\Pi - \theta_i)/(n-1)$$

where the internal angle of the branch point atom 192 is $\theta_i$ (radian) and the number of bonds with the branch point atom 192 being an atom at one end is n ($n \geq 3$).

If the bond configuration is the trans-configuration and if the combination of bond types of adjacent bonds is of a single bond with another single bond or of a single bond with a double bond, a line connecting middle points of respective bonds also becomes a straight line in the side chain in principle, which makes visual grasp of structure extremely easy. However, some or the whole of the principles applied to the principal chain (the same length between atoms, the same angle between adjacent bonds, and the line connecting the middle points of bonds being a straight line) is not applied in some cases for the side chains from the reason of avoiding close proximity between side chains or between side chain and principal chain or the like.

Next, if there is any atom not selected yet after execution of the process of S405, the processing is next returned to S403 to repeat the processes of S403 and S404. If the process of S405 results in determining that positions of all atoms are obtained, the chain portion coordinates arithmetic routine 104 is ended to return the processing to S50 in the main routine 100.

Figure 25:
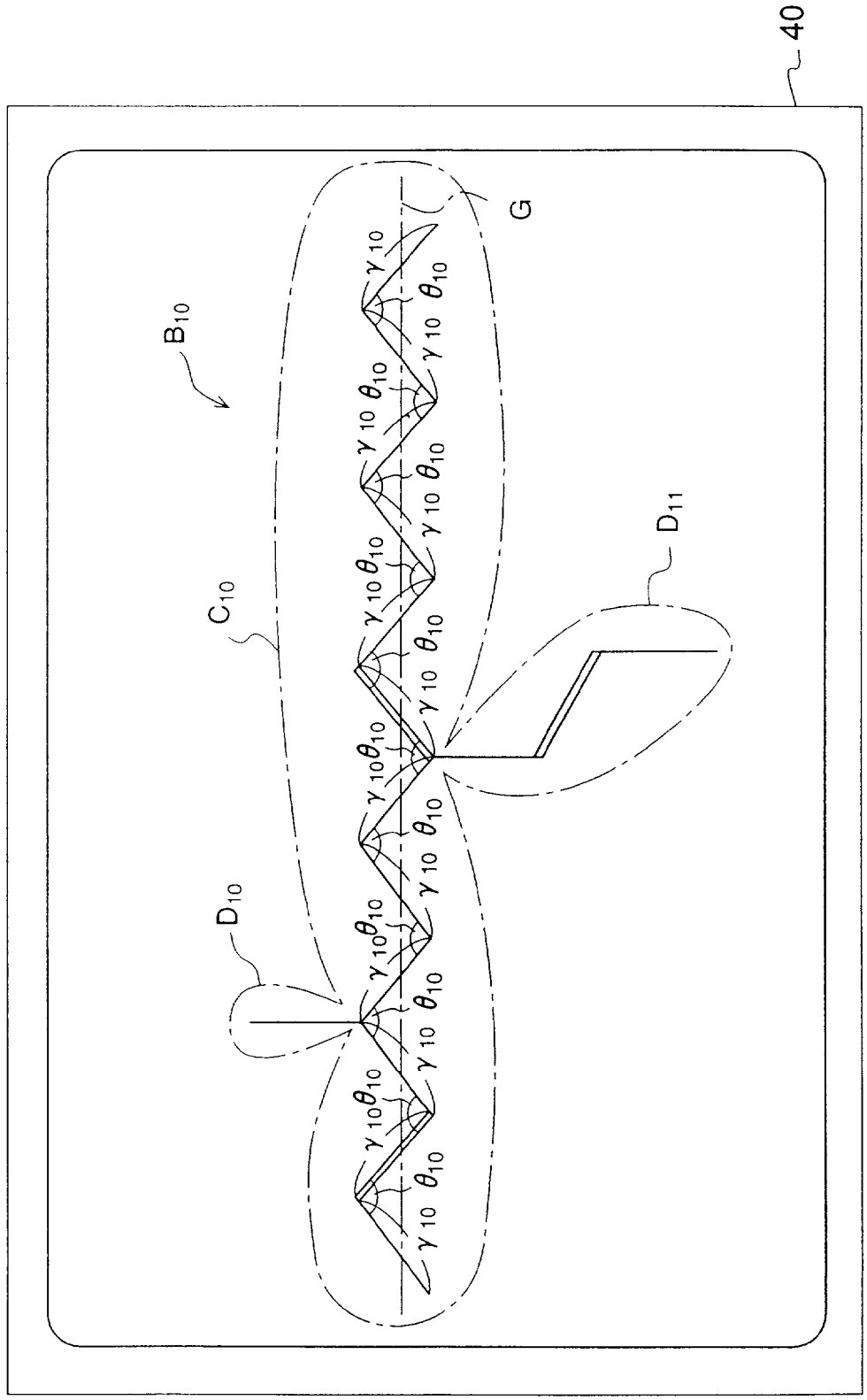
FIG. 25 is a diagrammatic drawing to show another example of image data indicated on the display.

FIG. 25 shows an example of molecular structural diagram $B_{10}$ indicated on the display 40 by the process of S70 in the main routine 100, in the same arrangement as the first embodiment except that the chain portion coordinates arithmetic routine 104 shown in FIG. 23 is adopted. As shown in FIG. 25, the molecular structural diagram $B_{10}$ is a structural diagram of a compound in such chain structure that the bonding atom pair data accepted in the process of S10 is comprised of only the chain structure, the bonds between atoms only single bonds and double bonds of trans-configuration, and two double bonds are not adjacent. The molecular structural diagram $B_{10}$ is comprised of the principal chain $C_{10}$ and two side chains $D_{10}$, $D_{11}$ branched from this principal chain $C_{10}$.

It is readily determined based on the bonding atom pair data whether a compound is one comprised of only the chain structure not containing the cyclic structure. Namely, letting Na be the number of atoms included in the bonding atom pair data and Nb be the number of bonds therein, N=Nb−Na+1 is calculated and the compound is determined to be one comprised of only the chain structure if N is 0.

It is thus understood from the molecular structural diagram $B_{10}$ indicated on the display 40 that the bond chain between the atom pair including the largest number of bonds between two terminal atoms out of all combinations connecting two terminal atoms is selected as the principal chain $C_{10}$. It is also seen that the length $r_{10}$ and bond angle $\theta_{10}$ of each bond forming this principal chain $C_{10}$ both are identical and that the molecular structural diagram $B_{10}$ of the compound is produced so that the line G connecting the middle points of bonds becomes a straight line. Further, it is seen that the line G connecting the middle points of bonds is arranged to extend in parallel with the horizontal frame of the display screen. By this arrangement wherein the line G connecting the middle points of bonds is a straight line (which is implemented when the bonds of the principal chain are of the trans-configuration) and wherein the line G is parallel to the horizontal frame of the display screen, the image data can be produced quickly and visual grasp of structure becomes extremely easy. The bond angle $\theta_{10}$ preferably employed is 120°.

As described above, the producing apparatus and producing method of molecular structural diagram according to the above third embodiment are very suitable for producing and indicating the molecular structural diagrams of complex chain structure more quickly and beautifully.

Figure 26:
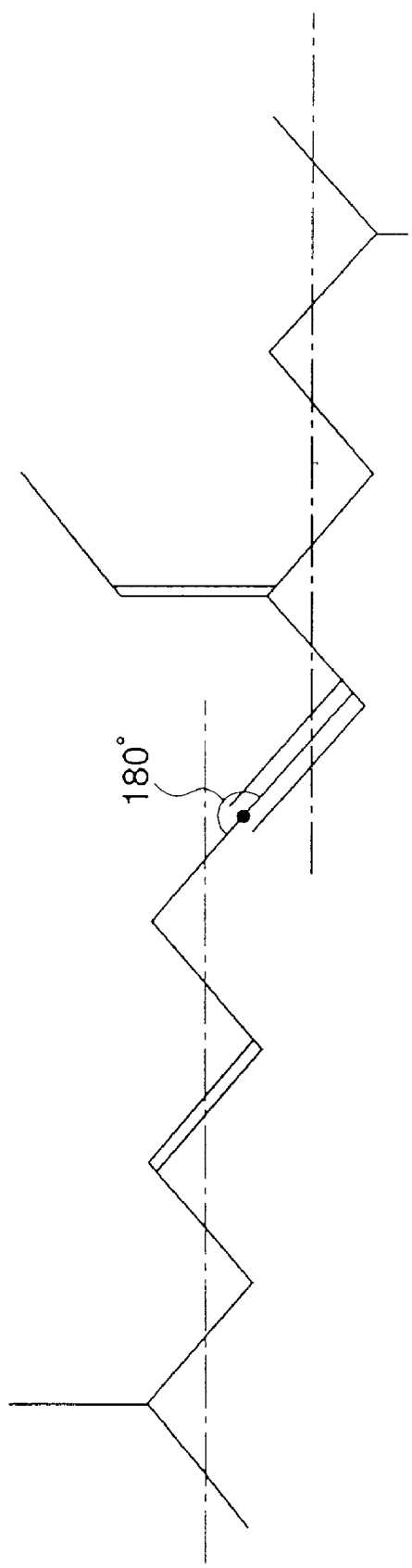
FIG. 26 is a diagrammatic drawing to show still another example of image data indicated on the display.

The present invention can be implemented in a variety of modifications without having to be limited to the above embodiments. For example, the above third embodiment was arranged to draw the molecular structural diagram so that the line connecting the middle points of respective bonds in the principal chain became a straight line where the combination of bond types of adjacent bonds was of a single bond with another single bond or of a single bond with a double bond of trans-configuration, but the molecular structural diagram may be drawn so that the line connecting the middle points of respective bonds becomes a straight line, similarly for principal chains having the triple bond. However, in a bond adjacent to a triple bond or in some cases where two double bonds are adjacent, grasp of structure of compound is often easy when the angles of this bond are 180° (linear) as shown in FIG. 26. In such cases, the line connecting the middle points of respective bonds in the principal chain is not a straight line.

Also, the process of S70 to indicate the image data of molecular structural diagram on the display 40 is not indispensable, but the data may be output through the printer 70 instead of the indication on the display 40. Alternatively, the data may be stored as a file in the hard-disk device 30 or the like.

The apparatus may be configured to include a process for the cases wherein there is close proximity or crossover of atoms, which is arranged to change some of bonds included in the chain portion without designation of cis-configuration or trans-configuration, from cis-configuration to trans-configuration or from trans-configuration to cis-configuration, thereby avoiding close proximity or crossover. Further, if close proximity of atoms occurs in the step to obtain the two-dimensional coordinates of atoms in a fused ring, the process of S307 may be configured again to perform the process with another value of r, thereby avoiding the close proximity.

Moreover, in the cases containing molecular structures for which the configuration (orientation) is determined in common use, the configuration of the whole molecular structural diagram may be changed so as to comply therewith. Molecules with configurations determined in common use include steroids, vitamins, sugars, and so on.

Next explained is a computer program product (storage medium) for production of molecular structural diagram according to an embodiment of the present invention.

Figure 27:
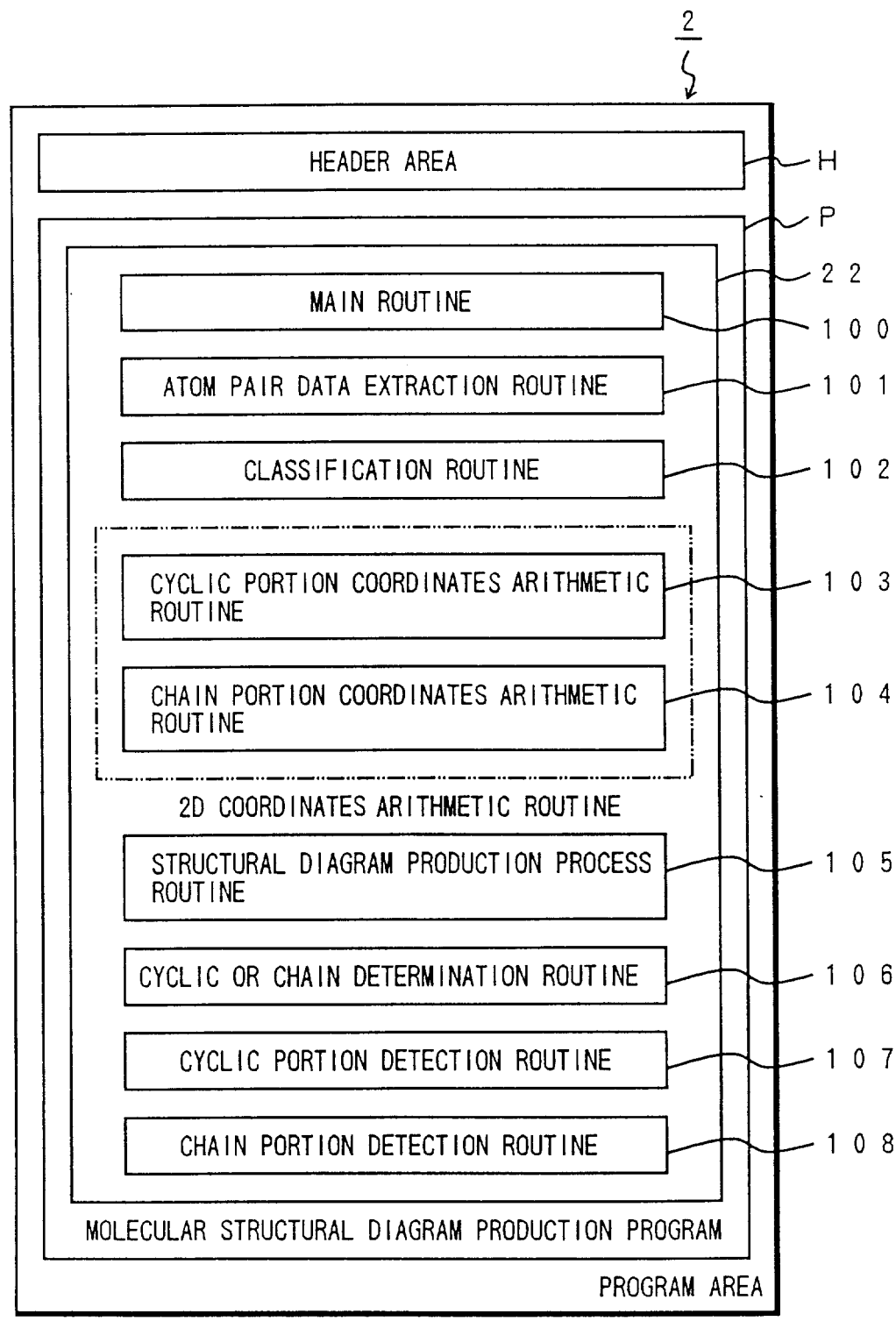
FIG. 27 is a block diagram to show an example of the data structure of the storage medium for production of molecular structural diagram according to the present invention.

FIG. 27 is a block diagram to show the data configuration of the computer program product (storage medium) 2 for production of molecular structural diagram according to the embodiment of the present invention. As shown in the same drawing, the storage medium 2 for production of molecular structural diagram of the present embodiment comprises a program area P for storing programs, and a header area H for storing data about the number of blocks of the program area P and about area management of program area P. The program area P stores the molecular structural diagram production program 22 for obtaining two-dimensional coordinates data of each atom forming a compound from the atom pair data of the compound and producing a molecular structural diagram from these two-dimensional coordinates data.

This molecular structural diagram production program 22 comprises the main routine 100 for systematically controlling the processing, the atom pair data extraction routine 101 for extracting the atom pair data indicating the bond relation of each atom forming the compound, and the classification routine 102 for classifying each atom forming the compound into the cyclic portion or the chain portion. Also, the molecular structural diagram production program 22 comprises the two-dimensional coordinates arithmetic routine (the cyclic portion coordinates arithmetic routine 103 and the chain portion coordinates arithmetic routine 104) for obtaining two-dimensional coordinates of each atom classified into the cyclic portion and/or the chain portion, the structural diagram production process routine 104 for producing a molecular structural diagram, and the cyclic or chain determination routine 106 for determining whether each atom pair data belongs to either the cyclic portion or the chain portion. Further, the molecular structural diagram production program 22 comprises the cyclic portion detection routine 107 for detecting the cyclic portion, and the chain portion detection routine 108 for detecting the chain portion.

Here, the two-dimensional coordinates arithmetic routine is comprised of the cyclic portion coordinates arithmetic routine 103 for obtaining two-dimensional coordinates of each atom classified into the cyclic portion, and the chain portion coordinates arithmetic routine 104 for obtaining two-dimensional coordinates data of each atom classified into the chain portion. Also, the storage medium 2 for production of molecular structural diagram may be any information medium capable of optically or magnetically recording information, such as a flexible disk, a CD-ROM, or an MD.

Figure 28:
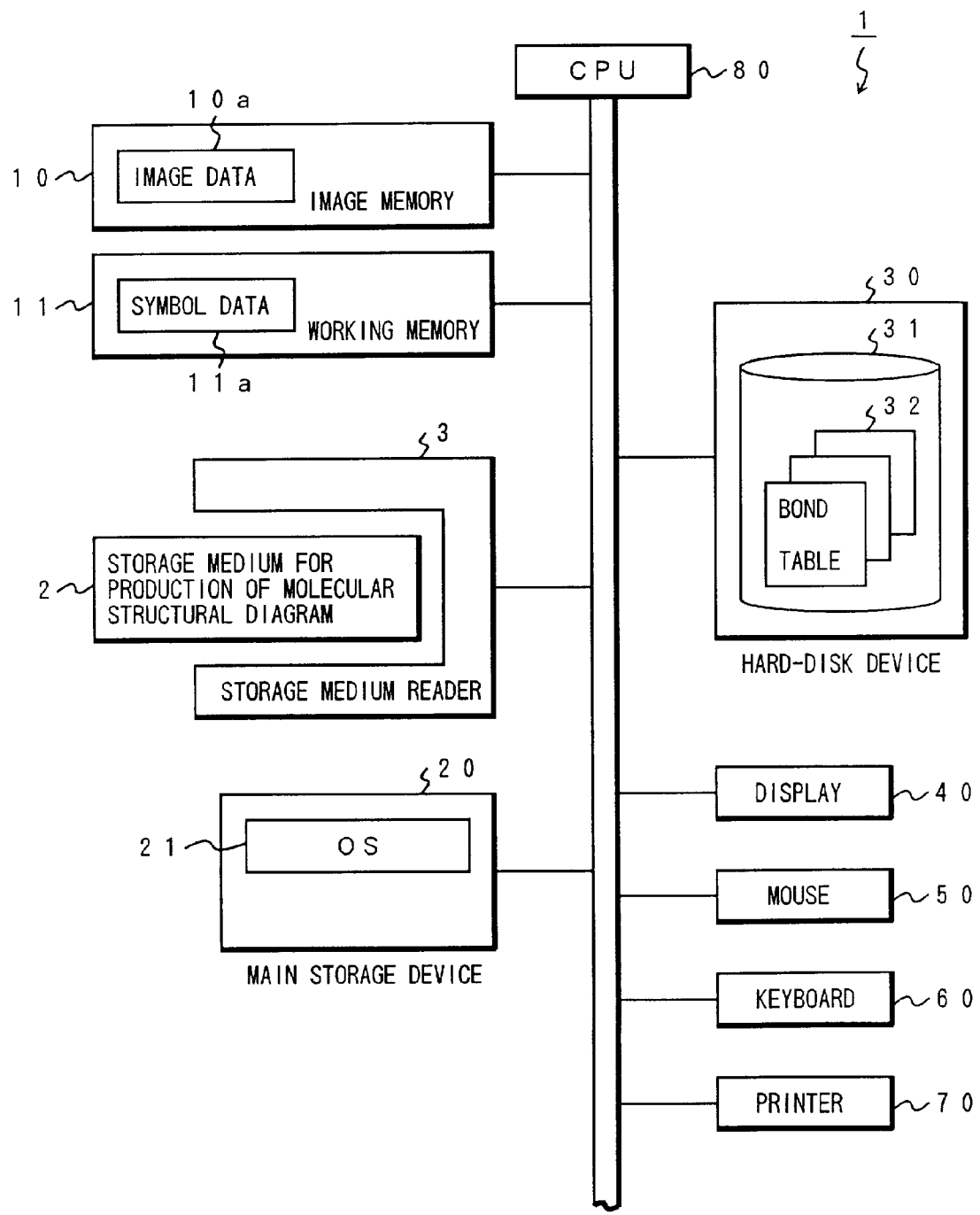
FIG. 28 is a block diagram to show an example of the structure of the information processing apparatus according to the present invention.
Figure 29:
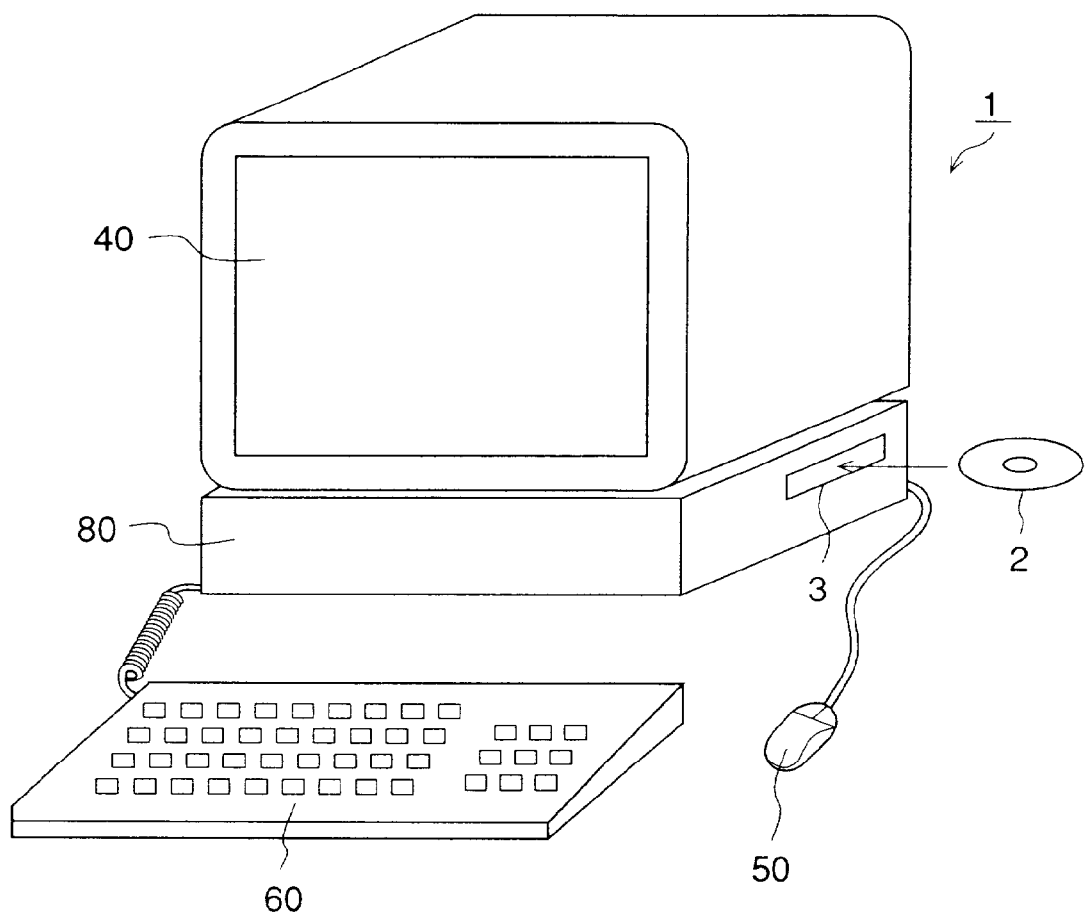
FIG. 29 is a perspective view to show an example of the structure of the information processing apparatus according to the present invention.

The molecular structural diagram production program 22 stored in the storage medium 2 for production of molecular structural diagram can be executed in the information processing apparatus (molecular structural diagram producing apparatus) 1 shown in FIG. 28 and FIG. 29, for example.

FIG. 28 is a block diagram to show the structure of the information processing apparatus 1 of the present embodiment, and FIG. 29 is a perspective view thereof. The information processing apparatus 1 comprises the image memory 10 for storing the image data 10a of molecular structural diagram, the working memory 11 for temporarily storing the symbol data 11a or the like, and a recording medium reader 3 for reading the molecular structural diagram production program 22 stored in the storage medium 2 for production of molecular structural diagram. Also, the information processing apparatus 1 comprises the main storage device 20 storing the operating system (OS) 21, the hard-disk device 30 storing the bond table file 31, and the display 40 for indicating the molecular structural diagram.

Further, the information processing apparatus 1 comprises the mouse 50 as a pointing device for accepting input of hand-written graphics, the keyboard 60 for accepting input of symbol data such as a chemical formula, the printer 70 for outputting the molecular structural diagram, and the CPU 80 for controlling execution of the molecular structural diagram production program 22 and the like. The pointing devices include a tablet, a digitizer, and a light-pen as well as the mouse 50, and either one of these devices may replace the mouse 50.

A plurality of bond tables 32 are registered in the bond table file 31 stored in the hard-disk device 30. As shown in FIG. 2A and FIG. 2B, the bond table 32 comprises the atom table 32a and atom pair table 32b. The atom table 32a is provided with the columns for numbers of atoms, two-dimensional coordinates of atoms (for example, orthogonal X-Y coordinates), element names (which are normally element symbols, but may be numerals of element numbers or the like), and attributes to be written therein (see FIG. 2A), while the atom pair table 32b is provided with the columns for the bonding atom pair data, bond types (1 for single bond, 2 for double bond, 3 for triple bond, and 4 for aromatic bond, for example), and structure to be written therein (see FIG. 2B). Here, the numbers of atoms are numbers for identifying the respective atoms constituting the compound by computer. The example of FIG. 2A uses numerals as the numbers of atoms, but they may be symbols. The bonding atom pair data is preferably expressed as a combination of numbers of atoms.

Next explained is the flow of process when the information processing apparatus 1 executes the molecular structural diagram production program 22 stored in the storage medium 2 for production of molecular structural diagram. As shown in FIG. 28, when the storage medium 2 for production of molecular structural diagram is inserted into the storage medium reader 3, the storage medium reader 3 reads the molecular structural diagram production program 22 stored in the program area P of the storage medium 2 for production of molecular structural diagram. Then the molecular structural diagram production program 22 thus read by the storage medium reader 3 is transferred to the storage device 30 to be stored in the storage device 30. After that, when the operator gives input of a command to start the operation using the keyboard 60 or the like, the main routine 100 of the molecular structural diagram production program 22 is started under control of OS 21.

After that, the atom pair data extraction routine 101, classification routine 102, cyclic portion coordinates arithmetic routine 103 , chain portion coordinates arithmetic routine 104, structural diagram production process routine 105, cyclic or chain determination routine 106, cyclic portion detection routine 107, and chain portion detection routine 108 are carried out as described previously, whereby even the image data 10a of molecular structural diagram having the very complex structure for example as shown in FIG. 20 was able to be produced within a very short time of 1 or less second (excluding the time of hand-writing input through the mouse 50) and to be indicated on the display 40. Thus, the computer program product (storage medium) for production of molecular structural diagram of the present invention according to the present embodiment is very suitable for quickly and beautifully producing the molecular structural diagrams of complex structure.

The foregoing explained the first preferred embodiment of the computer program product (storage medium) for production of molecular structural diagram according to the present invention, but the present invention is not limited to the above embodiment.

For example, in the case where the object is a compound having the complex molecular structure like a fused ring, especially a fused ring sharing three or more atoms, by changing step 307 in the cyclic portion coordinates arithmetic routine 103 to step 307 in the aforementioned second embodiment, the image data 10b and 10c of the molecular structural diagrams as shown in FIG. 22A and FIG. 22B was able to be produced within a shorter time and to be indicated on the display 40. Accordingly, the computer program product (storage medium) for production of molecular structural diagram according to the above second embodiment is very suitable for producing and indicating the molecular structural diagrams of complex cyclic structure more quickly and beautifully.

If many atoms are connected in a chain configuration, especially, if the object is a compound of the chain structure having the complex structure as including side chains, by employing the chain portion coordinates arithmetic routine 104 shown in FIG. 23 according to the aforementioned third embodiment, the image data of molecular structural diagram to make visual recognition of structure very easy as shown in FIG. 20 was able to be produced within a shorter time and to be indicated on the display 40. Accordingly, the computer program product (storage medium) for production of molecular structural diagram according to the above third embodiment is very suitable for producing and indicating the molecular structural diagrams of complex chain structure more quickly and beautifully.

Figure 30:
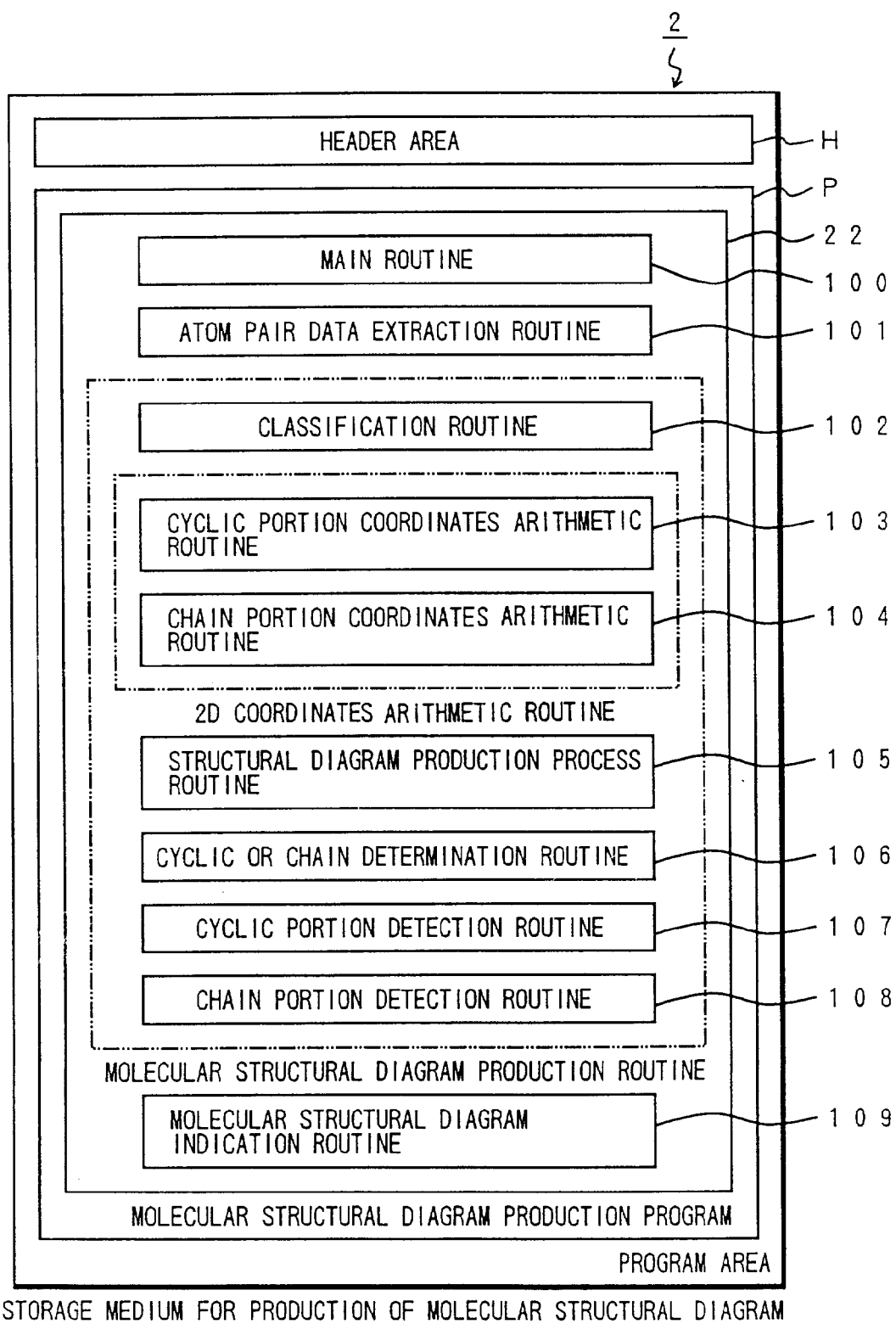
FIG. 30 is a block diagram to show another example of the data structure of the storage medium for production of molecular structural diagram according to the present invention.

The present invention may involve a variety of modifications without having to be limited to the above embodiments. For example, as shown in FIG. 30, the molecular structural diagram indication routine 109 for indicating the molecular structural diagram produced as described above on the display 40 may be stored in the program area P of the computer program product (storage medium) 2.

Also, the molecular structural diagram may be output through the printer 70 instead of the indication on the display 40, or may be stored as database in the hard-disk device 30.

INDUSTRIAL APPLICABILITY

By the molecular structural diagram producing apparatus, producing method and storage medium for production (computer program product) of the present invention, the molecular structural diagrams are automatically produced based on the bonding atom pair data indicating the bond relation of each atom. Namely, first, based on the bonding atom pair data, each atom forming a compound is classified into the cyclic portion or the chain portion. Then two-dimensional coordinates of each atom classified into the cyclic portion and two-dimensional coordinates of each atom classified into the chain portion are obtained separately from each other, and a molecular structural diagram is produced from these two-dimensional coordinates.

By classifying each atom forming a compound into the cyclic portion or the chain portion and performing the arithmetic for the cyclic portion and the arithmetic for the chain portion separately from each other in this manner, the molecular structural diagrams easy to grasp the structure visually and excellent in an aesthetic sense can be automatically produced quickly. Especially, the present invention enables even complex molecular structural diagrams such as a single ring with many constituent atoms or a fused ring to be automatically produced very easily within a short time.

By the molecular structural diagram producing apparatus, producing method and storage medium for production of the present invention, molecular structural diagrams with high symmetry can be produced quickly without increasing the size of program or necessary data amounts. Then the present invention permits molecular structural diagrams well balanced and excellent in an aesthetic sense to be obtained with good efficiency, and use of this molecular structural diagram makes visual grasp of molecular structure extremely easy.

Further, the present invention facilitates integration of mass bond table data, so that the present invention can be effectively used for construction of compound structure database. This is because the present invention effects the high-speed, accurate, and beautiful shaping process on even a rough molecular structural diagram hand-written, so as to automatically produce a bond table thereof. By performing direct input of bond table, integration of larger data becomes possible.

I claim:

1. A computer system configured to produce molecular structural diagrams the computer system comprising:

input means for accepting input of bonding atom pair data indicating the bond relation of each atom constituting a compound, storage means for storing at least said bonding atom pair data, and molecular structural diagram producing means for producing a molecular structural diagram of said compound, based on said bonding atom pair data extracted from said storage means;

wherein said molecular structural diagram producing means comprises:

an atom pair data extraction process section for extracting said bonding atom pair data from said storage means, a classification process section for classifying each atom constituting said compound into either of a cyclic portion and a chain portion, based on said bonding-atom pair data extracted in said atom pair data extraction process section, a two-dimensional coordinates arithmetic process section for obtaining two-dimensional coordinates of each atom classified into said cyclic portion and/or into said chain portion in said classification process section, and a structural diagram production process section for producing a molecular structural diagram, based on said two-dimensional coordinates of each atom obtained in said two-dimensional coordinates arithmetic process section.

2. A computer system according to claim 1, wherein said two-dimensional coordinates arithmetic process section comprises:

a first process section for, in the case where a ring comprised of atoms classified into said cyclic portion is a fused ring, separating said fused ring into a plurality of single rings, a second process section for selecting a predetermined single ring out of the single rings separated in said first process section and for, in the case of said single ring being an m-membered ring (m is a natural number not less than 3), obtaining two-dimensional coordinates of each atom as assuming said m-membered ring is a regular m-polygon, a third process section for selecting a single ring fused with a specific single ring for which two-dimensional coordinates of atoms were already obtained, out of the single rings separated in said first process section and for, in the case of said single ring being an n-membered ring (n is a natural number not less than 3), obtaining two-dimensional coordinates of each atom as assuming said n-membered ring is an n-polygon sharing k sides (k is a natural number) with said specific single ring, and a fourth process section for repeating said third process section until two-dimensional coordinates of all atoms in each single ring separated in said first process section have been obtained.

3. A computer system according to claim 2, wherein in said second process section, the predetermined single ring is selected in accordance with a priority order assigned to each single ring depending upon a number of atoms in each single ring separated in said first process section.

4. A computer system according to claim 2, wherein in said third process section, the two-dimensional coordinates of each atom are obtained as follows:

among sides of said n-polygon the k sides shared with said specific single ring are regarded as shared sides and the other sides as non-shared sides, a length of an auxiliary straight line connecting two ends of a line comprised of all said shared sides is let to be L (L is a known value), and a length of each side other than said shared sides is let to be r (r is a predetermined value), among internal angles of an (n−k+1) polygon comprised of said auxiliary straight line and all said non-shared sides internal angles between, said auxiliary straight line and said non-shared sides are let to be $\alpha$ (radian) and internal angles between said non-shared sides are let to be $\beta$ (radian), to satisfy $r\cos\{((n-k-1)\pi-(n-k)\beta)/2\}=L\cos(\beta/2)$ is calculated, and $\alpha=(n-k-1)(\pi-\beta)/2$ is also calculated (where $\pi$ is the circle ratio), thereby obtaining the two-dimensional coordinates of each atom from values of these calculations.

5. A computer system according to claim 1, wherein said two-dimensional coordinates arithmetic process section comprises:

a first process section for extracting all terminal atoms becoming ends of chain structure out of the atoms classified into said chain portion and for selecting out of pairs of said terminal atoms extracted a pair of said terminal atoms having a largest number of bonds contained between the pair of said terminal atoms, a second process section for obtaining two-dimensional coordinates of each atom between said pair of terminal atoms selected in said first process section, a third process section for selecting out of said terminal atoms two-dimensional coordinates of which are not obtained yet, one said terminal atom having a largest number of bonds contained between said terminal atom and an atom two-dimensional coordinates of which were already obtained, and a fourth process section for obtaining two-dimensional coordinates of each atom between said terminal atom selected in said third process section and the atom two-dimensional coordinates of which were already obtained.

6. A computer system according to claim 5, wherein in said second process section and said fourth process section, while keeping a length between atoms constant and changing a bond angle depending upon a number of atoms bonded to each atom, two-dimensional coordinates of each atom are obtained in order from one end.

7. A computer system according to claim 1, wherein said molecular structural diagram producing apparatus further comprises a display and comprises a pointing device as said input means, and wherein in said atom pair data extraction process section, said bonding atom pair data is extracted based on a molecular structural diagram drawn on said display using said pointing device.

8. A computer system according to claim 1, wherein said storage means stores a bond table file in which a table of said bonding atom pair data is recorded, and wherein in said atom pair data extraction process section, said bonding atom pair data is extracted by reading predetermined said bonding atom pair data out of said bond table file.

9. A computer system configured to produce molecular structural diagrams the computer system comprising:

input means for accepting input of bonding atom pair data indicating the bond relation of each atom constituting a compound, storage means for storing at least said bonding atom pair data, and molecular structural diagram producing means for producing a molecular structural diagram of said compound, based on said bonding atom pair data extracted from said storage means;

wherein in said molecular structural diagram producing means, when said bonding atom pair data extracted from said storage means is data of a compound comprised of only a fused ring, when the smallest set of smallest rings necessary and minimum to express all atoms and bonds constituting said fused ring is comprised of only one five-membered ring and one six-membered ring, and when said five-membered ring and said six-membered ring are fused as sharing three atoms, a molecular structural diagram of said compound is produced so that lengths of all bonds become equal.

10. A computer system configured to produce molecular structural diagrams the computer system comprising:

input means for accepting input of bonding atom pair data indicating the bond relation of each atom constituting a compound, storage means for storing at least said bonding atom pair data, and molecular structural diagram producing means for producing a molecular structural diagram of said compound, based on said bonding atom pair data extracted from said storage means;

wherein in said molecular structural diagram producing means, when said bonding atom pair data extracted from said storage means is data about a fused ring in which a number of bonds attaching to any atom therein is not more than 3, a molecular structural diagram of said compound is produced so that lengths of all bonds become equal.

11. A computer system configured to produce molecular structural diagrams the computer system comprising:

input means for accepting input of bonding atom pair data indicating the bond relation of each atom constituting a compound, storage means for storing at least said bonding atom pair data, and molecular structural diagram producing means for producing a molecular structural diagram of said compound, based on said bonding atom pair data extracted from said storage means;

wherein in said molecular structural diagram producing means, when said bonding atom pair data extracted from said storage means is data of a compound comprised of only a fused ring and when, in combinations of rings contained in the smallest set of smallest rings necessary and minimum to express all atoms and bonds constituting said fused ring, an arbitrary pair of rings are fused with each other as sharing three or more atoms, a molecular structural diagram of said compound is produced so that, separating bonds in said pair of rings into bonds A atoms of which are shared by the pair of rings and bonds B atoms of which are not shared thereby, lengths of the bonds B and angles between the bonds B become equal respectively in each ring.

12. A computer system configured to produce molecular structural diagrams the computer system comprising:

input means for accepting input of bonding atom pair data indicating the bond relation of each atom constituting a compound, storage means for storing at least said bonding atom pair data, and molecular structural diagram producing means for producing a molecular structural diagram of said compound, based on said bonding atom pair data extracted from said storage means;

wherein in said molecular structural diagram producing means, when said bonding atom pair data extracted from said storage means is data of a compound which is comprised of only a chain structure, in which bonds between atoms are comprised of only single bonds and/or double bonds without designation of cis-configuration, and in which two double bonds are not adjacent, a molecular structural diagram of said compound is produced so that, defining as a principal chain a bond chain between a terminal atom pair including a largest number of bonds between two terminal atoms thereof out of all combinations of two terminal atoms of said compound, lengths of respective bonds constituting said principal chain and bond angles between the bonds both become equal and a line connecting middle points of the bonds becomes a straight line.

13. A computer system according to claim 12, wherein in said molecular structural diagram producing means, when there is a side chain being a bond chain branched from said principal chain, the molecular structural diagram of said compound is produced so as to locate said side chain in an external-angle-side region out of two regions defined by two bonds in said principal chain adjacent to an atom at a branch point between said principal chain and said side chain.

14. A computer system according to claim 12, wherein said computer system further comprises a display and indication control means for making the molecular structural diagram of said compound produced in said molecular structural diagram producing means, indicated on said display, and wherein in said indication control means, said molecular structural diagram is indicated on said display so that said straight line connecting the middle points of the bonds extends in parallel with a horizontal frame of a screen of said display.

15. A molecular structural diagram producing method for producing a molecular structural diagram using a computer system having input means, storage means, and molecular structural diagram producing means, the method comprising:

an input step for accepting input of bonding atom pair data indicating the bond relation of each atom constituting a compound by said input means, a storage step for storing at least said bonding atom pair data in said storage means, and a molecular structural diagram producing step for producing a molecular structural diagram of said compound, based on said bonding atom pair data extracted from said storage means, by said molecular structural diagram producing means;

wherein said molecular structural diagram producing step comprises:

an atom pair data extraction step for extracting said bonding atom pair data from said storage means, a classification step for classifying each atom constituting said compound into either of a cyclic portion and a chain portion, based on said bonding atom pair data extracted in said atom pair data extraction step, a two-dimensional coordinates arithmetic step for obtaining two-dimensional coordinates of each atom classified into said cyclic portion and/or into said chain portion in said classification step, and a structural diagram production process step for producing a molecular structural diagram, based on said two-dimensional coordinates of each atom obtained in said two-dimensional coordinates arithmetic step.

16. A molecular structural diagram producing method according to claim 15, wherein said two-dimensional coordinates arithmetic step comprises:

a first step for, in the case where a ring comprised of atoms classified into said cyclic portion is a fused ring, separating said fused ring into a plurality of single rings, a second step for selecting a predetermined single ring out of the single rings separated in said first step and for, in the case of said single ring being an m-membered ring (m is a natural number not less than 3), obtaining two-dimensional coordinates of each atom as assuming said m-membered ring is a regular m-polygon, a third step for selecting a single ring fused with a specific single ring for which two-dimensional coordinates of atoms were already obtained, out of the single rings separated in said first step and for, in the case of said single ring being an n-membered ring (n is a natural number not less than 3), obtaining two-dimensional coordinates of each atom as assuming said n-membered ring is an n-polygon sharing k sides (k is a natural number) with said specific single ring, and a fourth step for repeating said third step until two-dimensional coordinates of all atoms in each single ring separated in said first step have been obtained.

17. A molecular structural diagram producing method according to claim 16, wherein in said second step, the predetermined single ring is selected in accordance with a priority order assigned to each single ring depending upon a number of atoms in each single ring separated in said first step.

18. A molecular structural diagram producing method according to claim 16, wherein in said third step, the two-dimensional coordinates of each atom are obtained as follows:

among sides of said n-polygon the k sides shared with said specific single ring are regarded as shared sides and the other sides as non-shared sides, a length of an auxiliary straight line connecting two ends of a line comprised of all said shared sides is let to be L (L is a known value), and a length of each side other than said shared sides is let to be r (r is a predetermined value), among internal angles of an (n−k+1) polygon comprised of said auxiliary straight line and all said non-shared sides internal angles between said auxiliary straight line and said non-shared sides are let to be α (radian) and internal angles between said non-shared sides are let to be β (radian), β to satisfy $$r \cdot \cos\{((n-k-1)\Pi-(n-k)\beta)/2\} = L \cdot \cos(\beta/2)$$

is calculated, and $$\alpha = (n-k-1)(\Pi-\beta)/2$$

is also calculated (where Π is the circle ratio), thereby obtaining the two-dimensional coordinates of each atom from values of these calculations.

19. A molecular structural diagram producing method according to claim 15, wherein said two-dimensional coordinates arithmetic step comprises:
   a first step for extracting all terminal atoms becoming ends of chain structure out of the atoms classified into said chain portion and for selecting out of pairs of said terminal atoms extracted a pair of said terminal atoms having a largest number of bonds contained between the pair of said terminal atoms,
   a second step for obtaining two-dimensional coordinates of each atom between said pair of terminal atoms selected in said first step,
   a third step for selecting out of said terminal atoms two-dimensional coordinates of which are not obtained yet, one said, terminal atom having a largest number of bonds contained between said terminal atom and an atom two-dimensional coordinates of which were already obtained, and
   a fourth step for obtaining two-dimensional coordinates of each atom between said terminal atom selected in said third step and the atom two-dimensional coordinates of which were already obtained.

20. A molecular structural diagram producing method according to claim 19, wherein in said second step and said fourth step, while keeping a length between atoms constant and changing a bond angle depending upon a number of atoms bonded to each atom, two-dimensional coordinates of each atom are obtained in order from one end.

21. A molecular structural diagram producing method according to claim 15, wherein said computer system further comprises a display and comprises a pointing device as said input means, and
   wherein in said atom pair data extraction step said bonding atom pair data is extracted based on a molecular structural diagram drawn on said display using said pointing device.

22. A molecular structural diagram producing method according to claim 15, wherein said storage means stores a bond table file in which a table of said bonding atom pair data is recorded, and
   wherein in said atom pair data extraction step, said bonding atom pair data is extracted by reading predetermined said bonding atom pair data out of said bond table file.

23. A molecular structural diagram producing method for producing a molecular structural diagram, using a computer system having input means, storage means, and molecular structural diagram producing means, the method comprising:
   an input step for accepting input of bonding atom pair data indicating the bond relation of each atom constituting a compound by said input means, a storage step for storing at least said bonding atom pair data in said storage means, and
   a molecular structural diagram producing step for producing a molecular structural diagram of said compound, based on said bonding atom pair data extracted from said storage means, by said molecular structural diagram producing means;
   wherein in said molecular structural diagram producing step, when said bonding atom pair data extracted from said storage means is data of a compound comprised of only a fused ring, when the smallest set of smallest rings necessary and minimum to express all atoms and bonds constituting said fused ring is comprised of only one five-membered ring and one six-membered ring, and when said five-membered ring and said six-membered ring are fused as sharing three atoms, a molecular structural diagram of said compound is produced so that lengths of all bonds become equal.

24. A molecular structural diagram producing method for producing a molecular structural diagram, using a computer system having input means, storage means, and molecular structural diagram producing means, the method comprising:
   an input step for accepting input of bonding atom pair data indicating the bond relation of each atom constituting a compound by said input means,
   a storage step for storing at least said bonding atom pair data in said storage means, and
   a molecular structural diagram producing step for producing a molecular structural diagram of said compound, based on said bonding atom pair data extracted from said storage means, by said molecular structural diagram producing means;
   wherein in said molecular structural diagram producing step, when said bonding atom pair data extracted from said storage means is data about a fused ring in which a number of bonds attaching to any atom therein is not more than 3, a molecular structural diagram of said compound is produced so that lengths of all bonds become equal.

25. A molecular structural diagram producing method for producing a molecular structural diagram, using a computer system having input means, storage means, and molecular structural diagram producing means, the method comprising:
   an input step for accepting input of bonding atom pair data indicating the bond relation of each atom constituting a compound by said input means,
   storage step for storing at least said bonding atom pair data in said storage means, and
   molecular structural diagram producing step for producing a molecular structural diagram of said compound, based on said bonding atom pair data extracted from said storage means, by said molecular structural diagram producing means;
   wherein in said molecular structural diagram producing step, when said bonding atom pair data extracted from said storage means is data of a compound comprised of only a fused ring and when, in combinations of rings contained in the smallest set of smallest rings necessary and minimum to express all atoms and bonds constituting said fused ring, an arbitrary pair of rings are fused with each other as sharing three or more atoms, a molecular structural diagram of said compound is produced so that, separating bonds in said pair of rings into bonds A atoms of which are shared by the pair of rings and bonds B atoms of which are not shared thereby, lengths of the bonds B and angles between the bonds B become equal respectively in each ring.

26. A molecular structural diagram producing method for producing a molecular structural diagram, using a computer system having input means, storage means, and molecular structural diagram producing means, comprising:

an input step for accepting input of bonding atom pair data indicating the bond relation of each atom constituting a compound by said input means, a storage step for storing at least said bonding atom pair data in said storage means, and a molecular structural diagram producing step for producing a molecular structural diagram of said compound, based on said bonding atom pair data extracted from said storage means, by said molecular structural diagram producing means;

wherein in said molecular structural diagram producing step, when said bonding atom pair data extracted from said storage means is data of a compound which is comprised of only a chain structure, in which bonds between atoms are comprised of only single bonds and/or double bonds without designation of cis-configuration, and in which two double bonds are not adjacent, a molecular structural diagram of said compound is produced so that, defining as a principal chain a bond chain between a terminal atom pair including a largest number of bonds between two terminal atoms thereof out of all combinations of two terminal atoms of said compound, lengths of respective bonds constituting said principal chain and bond angles between the bonds both become equal and a line connecting middle points of the bonds becomes a straight line.

27. A molecular structural diagram producing method according to claim 26, wherein in said molecular structural diagram producing step, when there is a side chain being a bond chain branched from said principal chain, the molecular structural diagram of said compound is produced so as to locate said side chain in an external-angle-side region out of two regions defined by two bonds in said principal chain adjacent to an atom at a branch point between said principal chain and said side chain.

28. A molecular structural diagram producing method according to claim 26, wherein said computer system further comprises a display and indication control means for making the molecular structural diagram of said compound produced in said molecular structural diagram producing step, indicated on said display, and wherein said method further comprises an indication step for indicating said molecular structural diagram on said display by said indication control means so that said straight line connecting the middle points of the bonds extends in parallel with a horizontal frame of a screen of said display.

29. A computer program product for production of molecular structural diagram used together with a computer system comprising input means for accepting input of bonding atom pair data indicating the bond relation of each atom constituting a compound, storage means for storing at least said bonding atom pair data, and reading means for reading information out of a computer-usable medium;

said computer program product comprising a computer-usable medium having a program area for storing a program and having a computer-readable program embodied in said medium for efficiently producing a molecular structural diagram of said compound, based on said bonding atom pair data extracted from said storage means;

said computer program product having a computer-readable molecular structural diagram producing program for producing the molecular structural diagram of said compound, based on said bonding atom pair data extracted from said storage means, in said program area;

wherein said molecular structural diagram producing program comprises:

a computer-readable atom pair data extraction routine for extracting said bonding atom pair data from said storage means, a computer-readable classification routine for classifying each atom constituting said compound into either of a cyclic portion and a chain portion, based on said bonding atom pair data extracted in said atom pair data extraction routine, a computer-readable two-dimensional coordinates arithmetic routine for obtaining two-dimensional coordinates of each atom classified into said cyclic portion and/or into said chain portion in said classification routine, and a computer-readable structural diagram production process routine for producing a molecular structural diagram, based on said two-dimensional coordinates of each atom obtained in said two-dimensional coordinates arithmetic routine.

30. A computer program product for production of molecular structural diagram according to claim 29, wherein said two-dimensional coordinates arithmetic routine comprises:

a first step for, in the case where a ring comprised of atoms classified into said cyclic portion is a fused ring, separating said fused ring into a plurality of single rings, a second step for selecting a predetermined single ring out of the single rings separated in said first step and for, in the case of said single ring being an m-membered ring (m is a natural number not less than 3), obtaining two-dimensional coordinates of each atom as assuming said m-membered ring is a regular m-polygon, a third step for selecting a single ring fused with a specific single ring for which two-dimensional coordinates of atoms were already obtained, out of the single rings separated in said first step and for, in the case of said single ring being an n-membered ring (n is a natural number not less than 3), obtaining two-dimensional coordinates of each atom as assuming said n-membered ring is an n-polygon sharing k sides (k is a natural number) with said specific single ring, and a fourth step for repeating said third step until two-dimensional coordinates of all atoms in each single ring separated in said first step have been obtained.

31. A computer program product for production of molecular structural diagram according to claim 30, wherein in said second step, the predetermined single ring is selected in accordance with a priority order assigned to each single ring depending upon a number of atoms in each single ring separated in said first step.

32. A computer program product for production of molecular structural diagram according to claim 30, wherein in said third step, the two-dimensional coordinates of each atom are obtained as follows:

among sides of said n-polygon the k sides shared with said specific single ring are regarded as shared sides and the other sides as non-shared sides, a length of an auxiliary straight line connecting two ends of a line comprised of all said shared sides is let to be L (L is a known value), and a length of each side other than said shared sides is let to be r (r is a predetermined value), among internal angles of an (n–k+1) polygon comprised of said auxiliary straight line and all said non-shared sides internal angles between said auxiliary straight line and said non-shared sides are let to be α (radian) and internal angles between said non-shared sides are let to be β (radian), β to satisfy $$r\cdot\cos\{((n-k-1)\Pi-(n-k)\beta)/2\}=L\cdot\cos(\beta/2)$$

is calculated, and $$\alpha=(n-k-1)(\Pi-\beta)/2$$

is also calculated (where Π is the circle ratio), thereby obtaining the two-dimensional coordinates of each atom from values of these calculations.

33. A computer program product for production of molecular structural diagram according to claim 29, wherein said two-dimensional coordinates arithmetic routine comprises:

a first step for extracting all terminal atoms becoming ends of chain structure out of the atoms classified into said chain portion and for selecting out of pairs of said terminal atoms extracted a pair of said terminal atoms having a largest number of bonds contained between the pair of said terminal atoms, a second step for obtaining two-dimensional coordinates of each atom between said pair of terminal atoms selected in said first step, a third step for selecting out of said terminal atoms two-dimensional coordinates of which are not obtained yet, one said terminal atom having a largest number of bonds contained between said terminal atom and an atom two-dimensional coordinates of which were already obtained, and a fourth step for obtaining two-dimensional coordinates of each atom between said terminal atom selected in said third step and the atom two-dimensional coordinates of which were already obtained.

34. A computer program product for production of molecular structural diagram according to claim 33, wherein in said second step and said fourth step, while keeping a length between atoms constant and changing a bond angle depending upon a number of atoms bonded to each atom, two-dimensional coordinates of each atom are obtained in order from one end.

35. A computer program product for production of molecular structural diagram according to claim 29, wherein said computer system further comprises a display and comprises a pointing device as said input means, and wherein in said atom pair data extraction routine, said bonding atom pair data is extracted based on a molecular structural diagram drawn on said display using said pointing device.

36. A computer program product for production of molecular structural diagram according to claim 29, wherein said storage means stores a bond table file in which a table of said bonding atom pair data is recorded, and wherein in said atom pair data extraction routine, said bonding atom pair data is extracted by reading predetermined said bonding atom pair data out of said bond table file.

37. A computer program product for production of molecular structural diagram used together with a computer system comprising input means for accepting input of bonding atom pair data indicating the bond relation of each atom constituting a compound, storage means for storing at least said bonding atom pair data, and reading means for reading information out of a computer-usable medium;

said computer program product comprising a computer-usable medium having a program area for storing a program and having a computer-readable program embodied in said medium for efficiently producing a molecular structural diagram of said compound, based on said bonding atom pair data extracted from said storage means;

said computer program product having a computer-readable molecular structural diagram producing program for producing the molecular structural diagram of said compound, based on said bonding atom pair data extracted from said storage means, in said program area;

wherein in said molecular structural diagram producing program, when said bonding atom pair data extracted from said storage means is data of a compound comprised of only a fused ring, when the smallest set of smallest rings necessary and minimum to express all atoms and bonds constituting said fused ring is comprised of only one five-membered ring and one six-membered ring, and when said five-membered ring and said six-membered ring are fused as sharing three atoms, a molecular structural diagram of said compound is produced so that lengths of all bonds become equal.

38. A computer program product for production of molecular structural diagram used together with a computer system comprising input means for accepting input of bonding atom pair data indicating the bond relation of each atom constituting a compound, storage means for storing at least said bonding atom pair data, and reading means for reading information out of a computer-usable medium;

said computer program product comprising a computer-usable medium having a program area for storing a program and having a computer-readable program embodied in said medium for efficiently producing a molecular structural diagram of said compound, based on said bonding atom pair data extracted from said storage means;

said computer program product having a computer-readable molecular structural diagram producing program for producing the molecular structural diagram of said compound, based on said bonding atom pair data extracted from said storage means, in said program area;

wherein in said molecular structural diagram producing program, when said bonding atom pair data extracted from said storage means is data about a fused ring in which a number of bonds attaching to any atom therein is not more than 3, a molecular structural diagram of said compound is produced so that lengths of all bonds become equal.

39. A computer program product for production of molecular structural diagram used together with a computer system comprising input means for accepting input of bonding atom pair data indicating the bond relation of each atom constituting a compound, storage means for storing at least said bonding atom pair data, and reading means for reading information out of a computer-usable medium;

said computer program product comprising a computer-usable medium having a program area for storing a program and having a computer-readable program embodied in said medium for efficiently producing a molecular structural diagram of said compound, based on said bonding atom pair data extracted from said storage means;

said computer program product having a computer-readable molecular structural diagram producing program for producing the molecular structural diagram of said compound, based on said bonding atom pair data extracted from said storage means, in said program area;

wherein in said molecular structural diagram producing program, when said bonding atom pair data extracted from said storage means is data of a compound comprised of only a fused ring and when, in combinations of rings contained in the smallest set of smallest rings necessary and minimum to express all atoms and bonds constituting said fused ring an arbitrary pair of rings are fused with each other as sharing three or more atoms, a molecular structural diagram of said compound is produced so that, separating bonds in said pair of rings into bonds A atoms of which are shared by the pair of rings and bonds B atoms of which are not shared thereby, lengths of the bonds B and angles between the bonds B become equal respectively in each ring.

40. A computer program product for production of molecular structural diagram used together with a computer system comprising input means for accepting input of bonding atom pair data indicating the bond relation of each atom constituting a compound, storage means for storing at least said bonding atom pair data, and reading means for reading information out of a computer-usable medium;

said computer program product comprising a computer-usable medium having a program area for storing a program and having a computer-readable program embodied in said medium for efficiently producing a molecular structural diagram of said compound, based on said bonding atom pair data extracted from said storage means;

said computer program product having a computer-readable molecular structural diagram producing program for producing the molecular structural diagram of said compound, based on said bonding atom pair data extracted from said storage means, in said program area;

wherein in said molecular structural diagram producing program, when said bonding atom pair data extracted from said storage means is data of a compound which is comprised of only a chain structure, in which bonds between atoms are comprised of only single bonds and/or double bonds without designation of cis-configuration, and in which two double bonds are not adjacent, a molecular structural diagram of said compound is produced so that, defining as a principal chain a bond chain between a terminal atom pair including a largest number of bonds between two terminal atoms thereof out of all combinations of two terminal atoms of said compound, lengths of respective bonds constituting said principal chain and bond angles between the bonds both become equal and a line connecting middle points of the bonds become a straight line.

41. A computer program product for production of molecular structural diagram according to claim 40, wherein in said molecular structural diagram producing program, when there is a side chain being a bond chain branched from said principal chain, the molecular structural diagram of said compound is produced so as to locate said side chain in an external-angle-side region out of two regions defined by two bonds in said principal chain adjacent to an atom at a branch point between said principal chain and said side chain.

42. A computer program product for production of molecular structural diagram according to claim 40, wherein said computer system further comprises a display and said computer program product further has a computer-readable molecular structural diagram indication routine for making the molecular structural diagram of said compound produced in said molecular structural diagram producing program, indicated on said display, in said program area and wherein in said molecular structural diagram indication routine, said molecular structural diagram is indicated on said display so that said straight line connecting the middle points of bonds extends in parallel with a horizontal frame of a screen of said display.

* * * * *